US012625338B2

(12) United States Patent
Kiriyama et al.

(10) Patent No.: US 12,625,338 B2
(45) Date of Patent: May 12, 2026

(54) FAN-IN/FAN-OUT DEVICE

(71) Applicant: KOHOKU KOGYO CO., LTD., Nagahama (JP)

(72) Inventors: Tomoaki Kiriyama, Nagahama (JP); Katsuhiro Iwasaki, Nagahama (JP); Katsuya Kito, Nagahama (JP)

(73) Assignee: KOHOKU KOGYO CO., LTD., Nagahama (JP)

( * ) Notice: Subject to any disclaimer, the term of this patent is extended or adjusted under 35 U.S.C. 154(b) by 337 days.

(21) Appl. No.: 18/259,494

(22) PCT Filed: Dec. 22, 2021

(86) PCT No.: PCT/JP2021/047563
§ 371 (c)(1),
(2) Date: Jun. 27, 2023

(87) PCT Pub. No.: WO2022/145308
PCT Pub. Date: Jul. 7, 2022

(65) Prior Publication Data
US 2024/0061204 A1 Feb. 22, 2024

(30) Foreign Application Priority Data
Dec. 28, 2020 (JP) ................................. 2020-219279

(51) Int. Cl.
*G02B 6/44* (2006.01)
*G02B 6/32* (2006.01)

(52) U.S. Cl.
CPC .......... *G02B 6/44715* (2023.05); *G02B 6/32* (2013.01)

(58) Field of Classification Search
CPC ..... G02B 6/3898; G02B 6/425; G02N 6/4206
See application file for complete search history.

(56) References Cited

U.S. PATENT DOCUMENTS 6,215,555 B1 * 4/2001 Chivers ................ G02B 6/3885
356/73.1
7,218,811 B2 * 5/2007 Shigenaga ............... G02B 6/32
385/39
(Continued)

FOREIGN PATENT DOCUMENTS

JP 2015219424 A 12/2015
JP 2016206294 A 12/2016
(Continued)

OTHER PUBLICATIONS

International Search Report (PCT/ISA/210) with translation and Written Opinion (PCT/ISA/237) mailed on Mar. 8, 2022, by the Japan Patent Office as the International Searching Authority for International Application No. PCT/JP2021/047563. (12 pages).

*Primary Examiner* — Eric Wong
(74) *Attorney, Agent, or Firm* — BUCHANAN INGERSOLL & ROONEY PC

(57) ABSTRACT

The FIFO device includes an MCF, a first lens having a first optical axis parallel to a center axis of the MCF, a group of second lenses including the same number of second lenses having a second optical axis parallel to the first optical axis as cores of the MCF, and a group of single-core optical fibers including the same number of single-core optical fibers as the second lenses. An end face of each single-core optical fiber is obliquely polished so as to incline in a predetermined inclination direction with respect to a plane orthogonal to the center axis by a predetermined polishing angle. Oblique polishing directions of surrounding single-core optical fibers are set so that the corresponding second lenses are positioned closer to the first optical axis or to the first lens compared to their positions at the time when the surrounding single-core optical fibers are not obliquely polished.

13 Claims, 30 Drawing Sheets

(56) References Cited

U.S. PATENT DOCUMENTS

| 2016/0246012 A1* | 8/2016 | Burrow ................ G02B 6/3898 |
| 2019/0327000 A1 | 10/2019 | Kurokawa et al. |

FOREIGN PATENT DOCUMENTS

| JP | 6554891 | B2 | 8/2019 |
| JP | 2019191260 | A | 10/2019 |

* cited by examiner $(0° < \psi < 180°)$     $(180° < \psi < 360°)$ $(180° < \psi < 360°)$     $(0° < \psi < 180°)$

FAN-IN/FAN-OUT DEVICE

TECHNICAL FIELD

The present invention relates to a Fan-in/Fan-out device. Specifically, the present invention relates to a spatially coupled Fan-in/Fan-out device that includes a multi-core optical fiber and a plurality of single-core optical fibers, and optically couples them.

BACKGROUND ART

Internet communication traffic demands are increasing year by year, and optical communication has been desired to achieve higher speed and larger capacity. Hitherto, in order to respond to those demands, a wavelength division multiplexing (WDM) technology, a digital coherent technology, and other technologies have been used to promote an increase in transmission capacity.

In recent years, as a new multiplexing technology, a space division multiplexing (SDM) technology using a multi-core optical fiber is gathering attention. It is said that the SDM technology allows further higher speed and further larger capacity to be achieved. Along with the progress of research and development of the SDM technology, demands for a Fan-in/Fan-out device (hereinafter also referred to as "FIFO") have been increased. A FIFO device is an optical device that includes a multi-core optical fiber and a plurality of single-core optical fibers, and optically couples them.

As examples of FIFO devices, spatially coupled, fiber bundle, and fusion-drawn devices can be mentioned, for example. A spatially coupled FIFO device is characterized by optically coupling a multi-core optical fiber and a single-core optical fiber using a lens (including a glass block, and the like). Although the size of components in the spatially coupled FIFO device becomes larger compared to that in the fiber bundle device or the fusion-drawn FIFO device, there is an advantage of reducing insertion loss.

Patent Literature 1 discloses a spatially coupled FIFO device arranged along a certain axis. This FIFO device optically couples each core of a multi-core optical fiber with (cores) of the same number of single-core optical fibers as the cores of the multi-core optical fiber. The FIFO device includes a first optical system and a second optical system. The first optical system is composed of a GRIN (Gradient Index) lens and a glass block, and the second optical system is composed of a lens array. The lens array has the same number of lenses as the single-core optical fibers. The first optical system is positioned on a multi-core optical fiber side along the axis, and the second optical system is positioned on a single-core optical fiber side along the axis. The first optical system is configured to collimate (make parallel) and deflect light beams emitted from respective cores of the multi-core optical fiber. The second optical system is configured to deflect each of the light beams exiting from the first optical system, which have been emitted from the respective cores with each of the lenses corresponding to the respective cores (of the multi-core optical fiber), and converge each of the light beams onto an end face of each of the single-core optical filters corresponding to the respective lenses.

CITATION LIST

Patent Literature

[PTL 1] JP 6554891 B2

SUMMARY OF INVENTION

Technical Problem

When each single-core optical fiber is formed so that the end face thereof is orthogonal to the axis, there is a possibility that each light beam exiting from the second optical system through the first optical system is reflected by the end face of each single-core optical fiber, and a reflected light enters each core of the multi-core optical fiber via the FIFO device. Such reflected light is generally referred to as "reflected return light." The reflected return light has a possibility of entering a transmission-side communication device via the multi-core optical fiber or being reflected multiple times so that an optical characteristic of signal light is reduced.

In view of the above, hitherto, suppressing entry of the reflected return light into each core of the multi-core optical fiber (i.e., reduction of the reflected return light) has been performed by polishing the end faces of the single-core optical fibers so as to be tilted with respect to a plane orthogonal to the axis. Hereinafter, an action of polishing an end face of an optical fiber so as to be inclined with respect to a plane orthogonal to the axis is referred to as "obliquely polishing." In the FIFO device of Patent Literature 1, each end face of a plurality of single-core optical fibers is collectively obliquely polished under a state in which the plurality of single-core optical fibers are being bundled, thereby reducing the reflected return light.

However, according to the technique of Patent Literature 1, there is a problem that the size of a coupling portion (a portion of the FIFO device that optically couples the multi-core optical fiber and the single-core optical fibers) of the FIFO device further increases. That is, when an end face of an optical fiber is obliquely polished, it is generally necessary to deflect light beam by a lens in order to converge the light beam onto the end face (in other words, change an angle of the light beam exiting from the lens, the angle being formed with the axis). The angle of the light beam exiting from the lens depends on an incident position (distance from an optical axis of the lens) of the light beam entering the lens. In Patent Literature 1, since each end face of the plurality of single-core optical fibers is collectively obliquely polished, each end face is parallel to each other. Therefore, in order to converge the light beam onto each end face, it is necessary to make each angle of the light beam exiting from the lens the same, in other words, make each light beam enter the lens with the same incident position. This means moving each lens in the same direction (i.e., moving the lens array in a direction crossing the axis). With this configuration, the size of the coupling portion of the FIFO device increases as the second optical system (lens array) moves away from the axis.

The present invention has been made to solve the above-mentioned problem. That is, the present invention has one object to provide technique capable of downsizing a coupling portion of a Fan-in/Fan-out (FIFO) device while reducing reflected return light.

Solution to Problem

According to one embodiment of the present invention, there is provided a Fan-in/Fan-out device (10, 110, 210) including: a multi-core optical fiber (20, 120, 220) which has a pillar shape, and includes a plurality of first cores (C1 to C4, C1 to C7) extending along an axial direction, and a common cladding (CL) surrounding the plurality of first cores; a first lens (30) having a first optical axis parallel to a center axis of the multi-core optical fiber (20, 120, 220) and being arranged so as to correspond to the multi-core optical fiber, and from which light beams which have been emitted from the respective first cores (C1 to C4, C1 to C7) and whose principal rays (31 to B4, B1 to B7) are parallel to each other exit so that the principal rays incline in predetermined directions, respectively; a group of second lenses (40, 140, 240) including a plurality of second lenses (41 to 44, 141 to 144, 241 to 247) each having a second optical axis parallel to the first optical axis, the group of second lenses (40, 140, 240) being configured to converge each of the light beams exiting from the first lens (30), which have been emitted from the respective first cores with each of the corresponding second lenses (41 to 44, 141 to 144, 241 to 247); and a group of single-core optical fibers (50, 150, 250) including the same number of single-core optical fibers (51 to 54, 151 to 154, 251 to 257) as the number of the second lenses (41 to 44, 141 to 144, 241 to 247), each single-core optical fiber having a pillar shape, and including one second core (C) extending along the center axis and a cladding (CLs) surrounding the second core (C), end faces (51a to 54a, 151a to 154a, 251a to 257a) of the respective single-core optical fibers (51 to 54, 151 to 154, 251 to 257) being arranged at positions at which the light beams exiting from the corresponding second lenses (41 to 44, 141 to 144, 241 to 247), which have been emitted from the respective first cores (C1 to C4, C1 to C7) converge on the respective second cores (C).

The end face (51a to 54a, 151a to 154a, 251a to 257a) of each of the single-core optical fibers (51 to 54, 151 to 154, 251 to 257) is obliquely polished so as to incline in a first inclination direction with respect to a plane orthogonal to the center axis thereof by a first polishing angle, and oblique polishing directions of surrounding single-core optical fibers (51 to 54, 151 to 154, 251 to 253 and 255 to 257) of the single-core optical fibers, where center axes of the surrounding single-core optical fibers are positioned at positions separated away from the first optical axis, are set so that the corresponding second lenses (41 to 44, 141 to 144, 241 to 243 and 255 to 257) are positioned closer to the first optical axis or closer to the first lens (30) compared to positions of the corresponding second lenses at the time when the surrounding single-core optical fibers are not obliquely polished.

Here, the "surrounding single-core optical fiber" is a single-core optical fiber which each of the light beams emitted from corresponding cores extending along axes except the center axis of the multi-core optical fiber is to enter.

In addition, the "oblique polishing direction of an optical fiber" is a direction obtained when a direction directed along an "oblique polishing reference axis" from a distal end which is more separated away from the corresponding lens toward a proximal end which is more proximal to the corresponding lens is viewed along the center axis of the end face, the "oblique polishing reference axis" being a line segment in which a "plane passing through a center of the end face of this optical fiber, is orthogonal to this end face, and is parallel to a predetermined inclination direction" intersects with this end face. When the optical fiber is a single-core optical fiber, the "corresponding lens" is a second lens of the group of second lenses, and the "predetermined inclination direction" is the first inclination direction. When the optical fiber is a multi-core optical fiber, the "corresponding lens" is a first lens, and the "predetermined inclination direction" is a second inclination direction.

Further, in this specification, "collecting light" means that a lens collects light beams (strictly speaking, principal rays of the light beams) emitted from a plurality of light sources (for example, the first cores of the multi-core optical fiber) to one point, and "converging (focusing) light" means that a lens reduces a diameter of a light beam emitted from one light source (for example, each first core of the multi-core optical fiber) so as to focus the light beam to one point.

According to one embodiment of the present invention, there is provided another Fan-in/Fan-out device including: the group of single-core optical fibers (50, 150, 250) including the plurality of single-core optical fibers (51 to 54, 151 to 154, 251 to 257); the group of second lenses (40, 140, 240) including the same number of the second lenses (41 to 44, 141 to 144, 241 to 247) as the number of the single-core optical fibers; the first lens (30); and the multi-core optical fiber (20, 120, 220) including the first cores (C1 to C4, C1 to C7) whose number is at least more than or equal to the number of the single-core optical fibers, each being described above.

Light beams are propagated in a direction opposite to a direction in which light beams are propagated by the above-mentioned Fan-in/Fan-out device (10, 110, 10).

Advantageous Effects of Invention

According to the present invention, it is possible to downsize the coupling portion of an FIFO device while reducing reflected return light.

DESCRIPTION OF EMBODIMENTS

First Embodiment

FIG. 1 to FIG. 3B are diagrams for illustrating an FIFO device 10 being an example of an FIFO device according to a first embodiment of the present invention. FIG. 4 to FIG. 8 are diagrams for illustrating an FIFO device 310 serving as a comparative example of the FIFO device 10. In the following, a configuration of the FIFO device 310 is described first, followed by a description of a configuration of the FIFO device 10. Hereinafter, "FIFO device" may also be simply referred to as "device."

Figure 4:
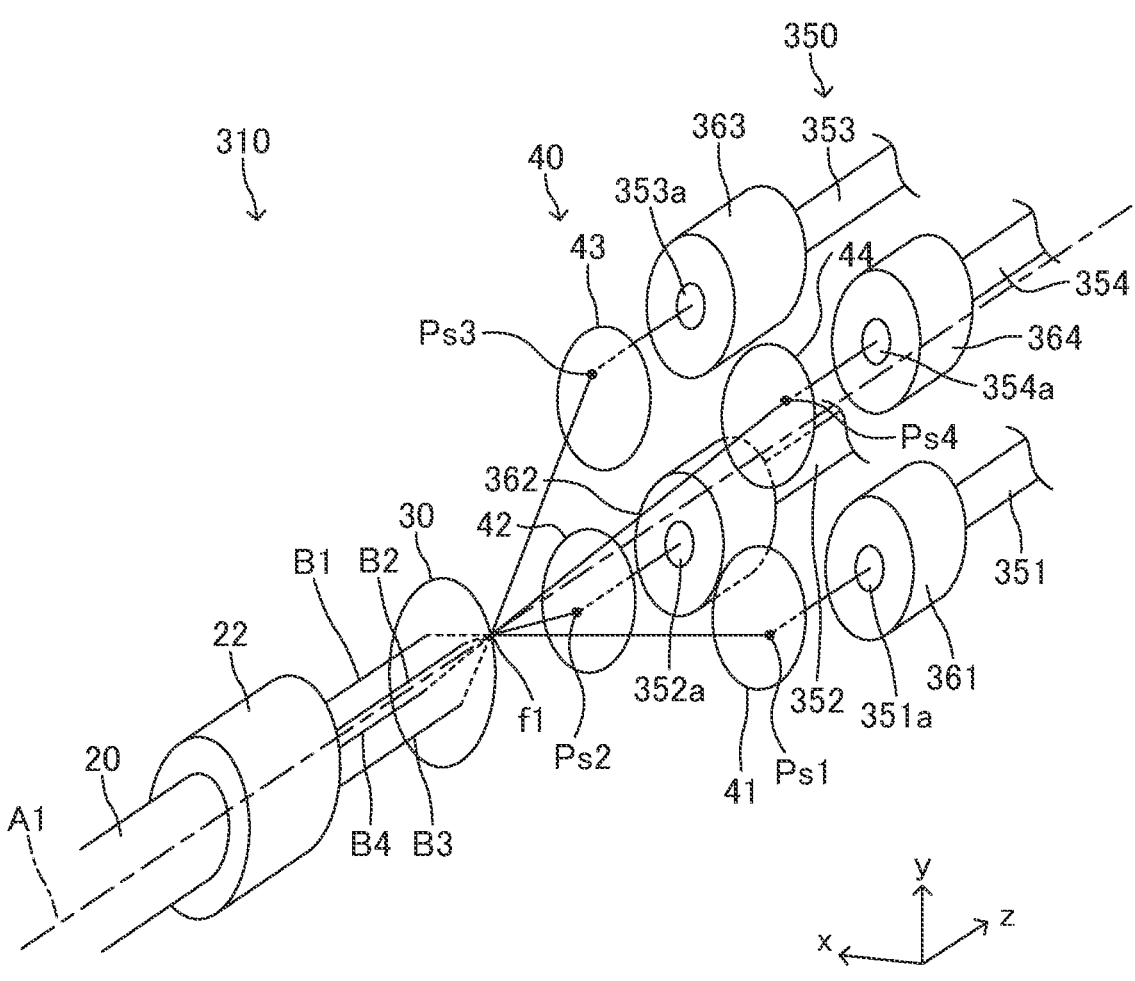
FIG. 4 is a perspective view of a comparative device serving as a comparative example of the FIFO device of FIG. 1.
Figure 5:
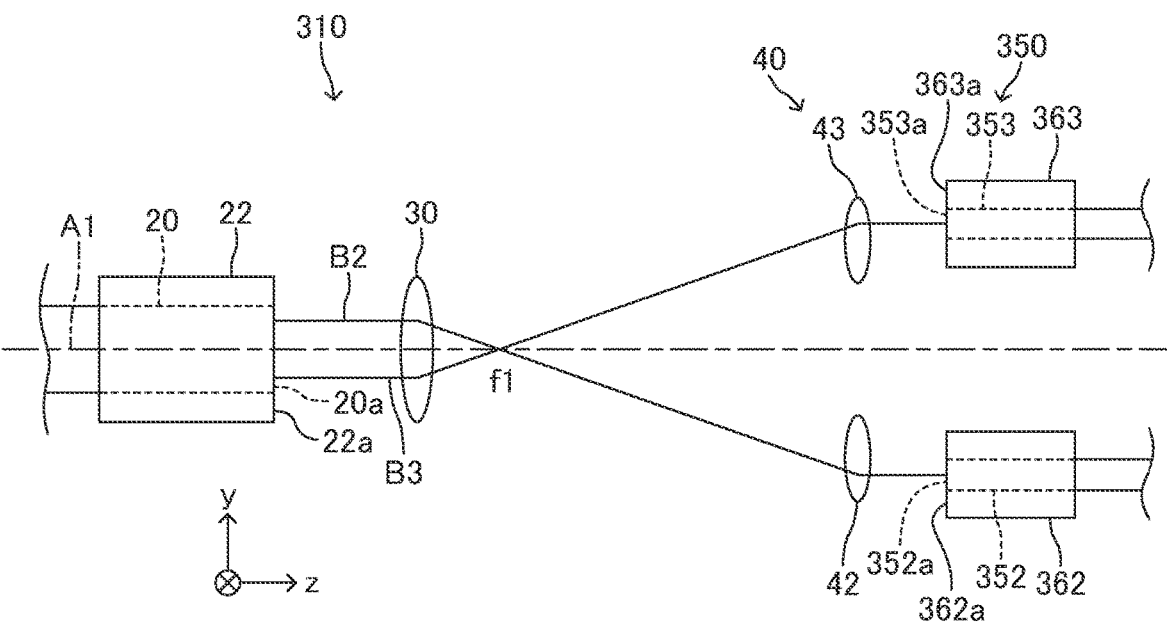
FIG. 5 is a side view of the comparative device.

FIG. 4 is a perspective view of the device 310, and FIG. 5 is a side view of the device 310. As shown in FIG. 4 and FIG. 5, the device 310 includes a multi-core optical fiber 20, a first lens 30, a group of second lenses 40, and a group of single-mode optical fibers 350. These members are arranged in the aforementioned order along an axis A1. An orthogonal coordinate system is set in the device 310 (and the device 10 mentioned later). The z-axis extends parallel to the axis A1 so that a direction directed from the multi-core optical fiber 20 toward the first lens 30 corresponds to a positive direction. The y-axis is orthogonal to the z-axis and extends so that an upper direction of the drawing sheet corresponds to a positive direction. The x-axis is orthogonal to the z-axis and the y-axis. Hereinafter, the multi-core optical fiber and the single-mode optical fiber are also referred to as "MCF" and "SMF," respectively. In this specification, in order to make the drawings easily visible, specific members (for example, the MCF 20 and a group of the SMF 350) are illustrated with their dimensions, angles of light beams, and the like being changed.

Figure 6:
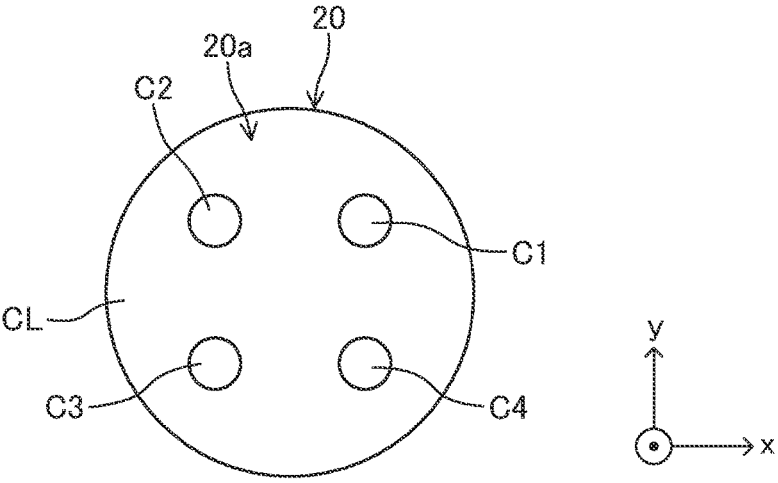
FIG. 6 is a diagram for illustrating an end face of a multi-core optical fiber included in the comparative device.

The MCF 20 has a columnar/cylindrical shape, and a center axis of at least an end portion of the MCF 20 in the +z-axis direction matches the axis A1. An end face 20a (see FIG. 5) of the MCF 20 is parallel to a plane (xy plane) orthogonal to the axis A1. FIG. 6 is a diagram of the end face 20a seen along the center axis of the MCF 20. As illustrated in FIG. 6, the MCF 20 includes four cores C1 to C4, and a common cladding CL surrounding those cores C1 to C4. The cores C1 to 4 are positioned at vertices of a square having a center of the end face 20a as a center, and extend along an axial direction. A distance (core pitch) between adjacent cores is 50 μm. The cores C1 to C7 and the cladding CL are both made of glass containing quartz as a main component. A refractive index of each of the cores C1 to C4 is larger than a refractive index of the cladding CL. The MCF 20 is a single-mode optical fiber. The material of the cores C1 to C4 and the cladding CL is not limited to glass containing quartz as a main component, and the cores C1 to C4 and the cladding CL may be made of other materials. Further, in this specification, a column/cylinder includes one having a curved axis.

As illustrated in FIG. 4 and FIG. 5, an end portion of the MCF 20 in the +z-axis direction is inserted into and held by a ferrule 22 having a cylindrical shape. An end face 22a of the ferrule 22 is positioned on the same plane as the end face 20a of the MCF 20. The reason therefor is because, under a state in which the MCF 20 is inserted into the ferrule 22, the end face 20a of the MCF 20 is collectively polished together with the end face 22a of the ferrule 22. In FIG. 5, the MCF 20 inside of the ferrule 22 is indicated by the broken line, but illustration of the cores C1 to C4 is omitted.

Light beams propagated through the respective cores C1 to C4 of the MCF 20 are emitted from the end face 20a toward the first lens 30. That is, the MCF 20 functions as an emission member. In FIG. 4, only principal rays B1 to B4 of the light beams emitted from the respective cores C1 to C4 (see FIG. 6) are illustrated, and in FIG. 5, only principal rays B2 and B3 of the light beams emitted from the cores C2 and C3 are illustrated. The principal rays of the emission light beams emitted from the respective cores C1 to C4 are parallel to each other, but each emission light beam is divergent light which diverges as the light progresses.

The first lens 30 is a collimator lens having a focal length of 1.3 mm, and in more detail, is an aspherical lens having a rotationally symmetric curved surface. The first lens 30 collimates (make parallel) a light beam diverging after being emitted from the respective cores C1 to C4. The optical axis of the first lens 30 is positioned on the center axis (i.e., the axis A1) of the MCF 20. The first lens 30 deflects the light beams which are emitted from the respective cores C1 to C4 and whose principal rays B1 to B4 are parallel to each other, and the light beams exit from the first lens 30 (in more detail, the light beams exit from the first lens 30 so that the principal rays B1 to B4 thereof incline in predetermined directions, respectively). In other words, the first lens 30 collects the light beams emitted from the respective cores C1 to C4 to a focal point f1. That is, the first lens 30 is a lens arranged so as to correspond to the multi-core optical fiber. It should be noted that curved surfaces of the first lens 30 may be rotationally asymmetric as long as they can emit the light beams emitted from the respective cores C1 to C4 so as to deflect the light beams. Additionally, the first lens 30 may be a spherical lens, a GRIN lens, or a lens with one flat surface.

The group of the second lenses 40 include the same number of second lenses 41 to 44 as the number of the cores of the MCF 20 (in this example, four) (see FIG. 4). The second lenses 41 to 44 are all collimator lenses each having a focal length of 2.5 mm, and in more detail, aspherical lenses each having a rotationally symmetric curved surface. Hereinafter, the second lenses 41 to 44 are simply referred to as "lenses 41 to 44". An optical axis of each of the lenses 41 to 44 is parallel to the optical axis of the first lens 30. Principal points of the lenses 41 to 44 are positioned on the same plane, which is orthogonal to the axis A1. In FIG. 5, among the lenses 41 to 44, only the lenses 42 and 43 which the principal rays B2 and B3 enter are illustrated.

Figure 7A:
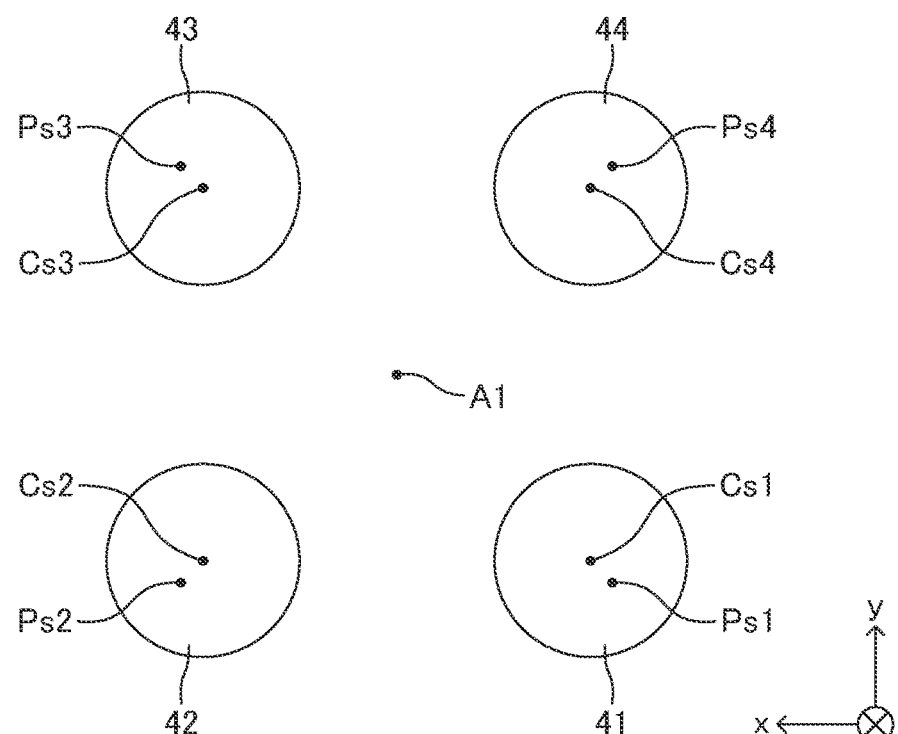
FIG. 7A is a front view of second lenses included in the comparative device.

FIG. 7A is a diagram for illustrating the lenses 41 to 44 as viewed along the axis A1 (i.e., along the optical axis of the first lens 30). As shown in FIG. 7A, principal points Cs1 to Cs4 of the lenses 41 to 44 are positioned at vertices of a square having the axis A1 as a center. More specifically, the lenses 41 to 44 are arranged so that the "principal rays B1 to B4 of the light beams exiting from the first lens 30, which have been emitted from the respective cores C1 to C4 of the MCF 20" pass through focal points f2 (described later) of the corresponding lenses 41 to 44.

Figure 7B:
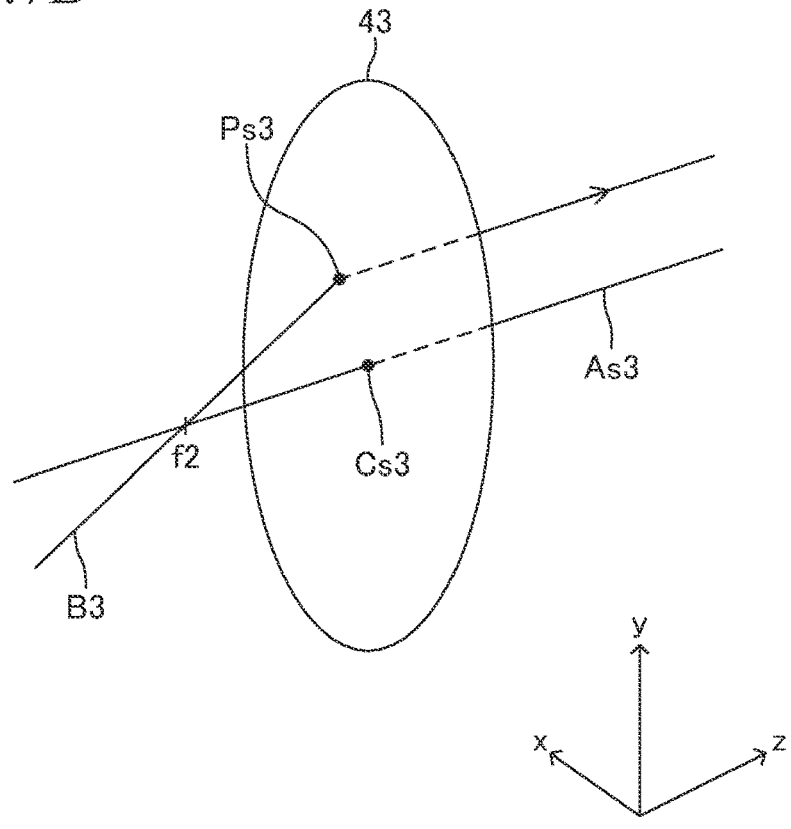
FIG. 7B is a diagram for illustrating a manner in which a principal ray of light beam emitted from a certain core of the multi-core optical fiber in the comparative device passes through a corresponding second lens.

A specific description is given with reference to FIG. 7B. FIG. 7B is a diagram for illustrating a manner in which the principal ray B3 of the emission light beam from the core C3 passes through the corresponding lens 43. As shown in FIG. 4, FIG. 5, and FIG. 7B, the light beam exiting from the first lens 30, which has been emitted from the core C3 of the MCF 20, passes through the focal point f1. The principal ray B3 of the light beam that has passed through the focal point f1 progresses to pass through the focal point f2 of the lens 43 (see FIG. 7B) and enters the lens 43 at a predetermined incident angle (in this example, 1.6° at a position Ps3 (described later) of the lens 43. The principal ray B3 that has entered the position Ps3 exits from the lens 43 as a ray parallel to an optical axis As3 of the lens 43 (see FIG. 7B).

Here, as shown in FIG. 7A, when the lens 43 is viewed along the axis A1, the incident position Ps3 of the principal ray B3 is positioned on a "half-line connecting the axis A1 and the principal point Cs3 of the lens 43." In more detail, the incident position Ps3 is located at a position apart away from the principal point Cs3 by equal distances in the +x-axis direction and the +y-axis direction, respectively. This is because, as shown in FIG. 6, the core C3 of the MCF 20 corresponding to the lens 43 is provided at a position apart away from a center thereof by equal distances (in this example, 25 μm) in the −x-axis direction and the −y-axis direction, respectively.

Similarly, as shown in FIG. 4, the principal rays B1, B2, and B4 of the light beams that have passed through the focal point f1 progress to pass through the focal points f2 (not shown) of the lenses 41, 42, and 44, respectively, and enter the lenses 41, 42, and 44 at predetermined incident angles (in this example, 1.6°) at positions Ps1, Ps2, and Ps4, respectively. The principal rays B1, B2, and B4 that have entered the positions Ps1, Ps2, and Ps4 exit from the lenses 41, 42, and 44, respectively, as rays parallel to optical axes of the lenses 41, 42, and 44. As shown in FIG. 7A, when the lenses 41, 42, and 44 are viewed along the axis A1, the incident positions Ps1, Ps2, and Ps4 of the principal rays 131, B2, and B4 are each positioned on the remaining three vertices of a square, having the axis A1 as a center, with one vertex on the incident position Ps3. This is due to a core arrangement of the MCF 20 (refer to FIG. 6). That is, the incident positions Ps1 to Ps4 are symmetric with respect to the axis A1.

As shown in FIG. 4 and FIG. 5, the group of the second lenses 40 converge the light beams exiting from the first lens 30, which have been emitted from the respective cores C1 to C4 by the corresponding lenses 41 to 44, respectively (only the principal rays are illustrated in FIG. 4 and FIG. 5). Note that curved surfaces of each of the lenses 41 to 44 may be rotationally asymmetric as long as they can emit the light beam emitted from the corresponding respective cores C1 to C4 so as to deflect the light beam. Additionally, each lens 41 to 44 may be a spherical lens, a GRIN lens, or a lens with one flat surface.

Figure 8:
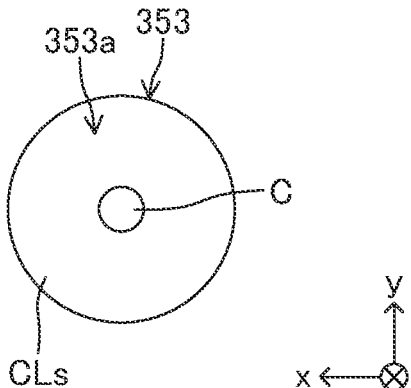
FIG. 8 is a diagram for illustrating an end face of a single-mode optical fiber included in the comparative device.

The group of the SMFs 350 include the same number of SMFs 351 to 354 as the number of the lenses 41 to 44 (in this example, four) (see FIG. 4). Each of the SMFs 351 to 354 is an optical fiber that propagates light beam with a single propagation mode. Since the SMFs 351 to 354 have the same configuration with each other, a configuration of the SMF 353 is described below. SMF 353 has a columnar/cylindrical shape, and a center axis of at least an end portion of the SMF 353 in the −z-axis direction is parallel to the optical axis As3 (refer to FIG. 7B) of the corresponding lens 43. Additionally, the SMF 353 is positioned at a position apart from the optical axis of the first lens 30. An end face 353a of the SMF 353 is parallel to the xy plane. FIG. 8 is a diagram of the end face 353a viewed along the center axis of the SMF 353. As shown in FIG. 8, the SMF 353 includes one core C extending along the center axis thereof, and a cladding CLs surrounding the core C. The core C and the cladding CLs are both made of glass containing quartz as a main component. A refractive index of the core C is larger than a refractive index of the cladding CLs. The material of the core C and the cladding CLs is not limited to glass containing quartz as a main component, and the core C and the cladding CLs may be made of other materials.

As illustrated in FIG. 4 and FIG. 5, an end portion of the SMF 353 in the −z-axis direction is inserted into and held by a ferrule 363 having a cylindrical shape. The end face 353a of the SMF 353 is collectively polished together with an end face 363a of the ferrule 363 under a state in which the SMF 353 is inserted into the ferrule 363. Accordingly, the end face 353a of the SMF 353 and the end face 363a of the ferrule 363 are positioned on the same plane (xy plane). In FIG. 5, the SMF 353 inside of the ferrule 363 is indicated by the broken line.

The end face 353a of the SMF 353 is arranged at a position at which the light beam exiting from the lens 43, which has been emitted from the core C3 converges on the core C (more strictly, on a center of the core C). That is, the SMF 353 is arranged so that the principal ray B3 enters the center of the core C. As a result, the emission light beam from the core C3 enters the core C of the SMF 353 with low loss.

Similarly, the SMFs 351, 352, and 354 are positioned at positions each apart from the optical axis of the first lens 30, and their end faces 351a, 352a, and 354a (refer to FIG. 4) are arranged at positions at which the light beams exiting from the lenses 41, 42, and 44, which have been emitted from the cores C1, C2, and C4 converge on the cores C (more strictly, on centers of the cores C), respectively. That is, the SMFs 351, 352, and 354 are arranged so that the principal rays B1, B2, and B4 enter the centers of the cores C, respectively. As a result, the emission light beams from the cores C1, C2, and C4 enter the cores C of the SMFs 351, 352, and 354 with low loss.

In this way, the first lens 30 and the group of the second lenses 40 optically couple the MCF 20 and the group of the SMFs 350. In other words, the first lens 30 and the group of the second lenses 40 function as a coupling portion of the device. The above is the description on the configuration of the device 310 serving as a comparative example.

Figure 1:
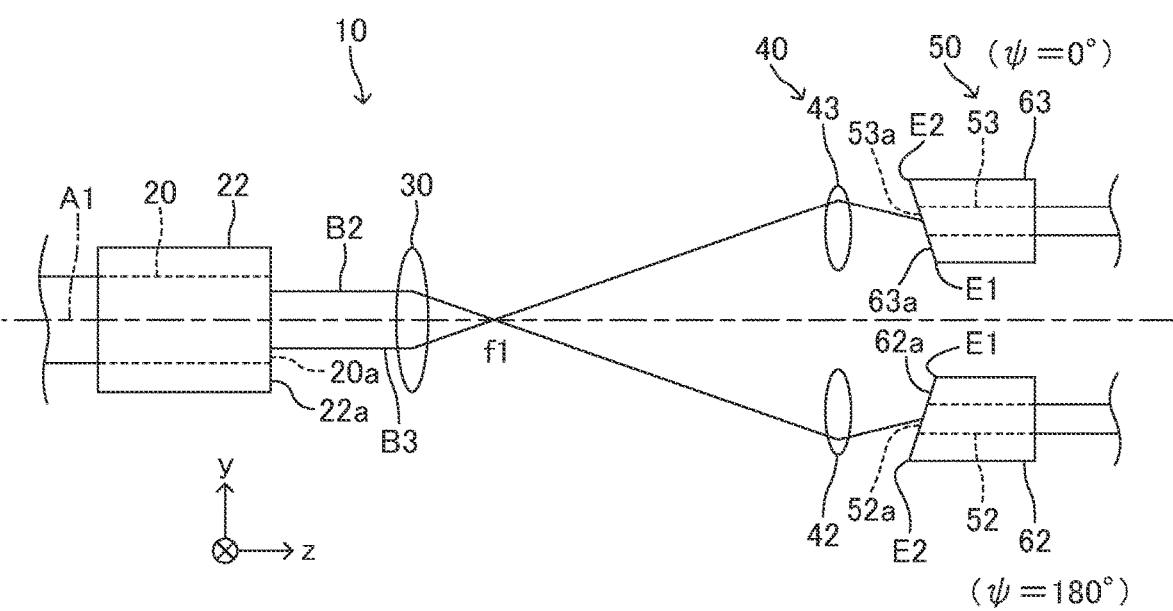
FIG. 1 is a side view for illustrating an example of an FIFO device according to a first embodiment of the present invention.

Next, the configuration of the device 10 is described with reference to FIG. 1 to FIG. 3B. FIG. 1 is a side view of the device 10. As shown in FIG. 1, the device 10 includes the MCF 20, the first lens 30, the group of the second lenses 40, and a group of SMFs 50. These members are arranged in the aforementioned order along the axis A1. That is, the device 10 uses the same members as those used in the device 310 except the group of the SMFs 50. Additionally, a positional relationship between the MCF 20 and the first lens 30 is the same as a positional relationship therebetween in the device 310. In contrast, a positional relationship between "the MCF 20 and the first lens 30" and "the group of the second lenses 40" differs from a positional relationship therebetween in the device 310. The following primarily describes differences from the device 310. The cores C1 to C4 of the MCF 20 correspond to an example of "first cores." The optical axis of the first lens 30 and the optical axes of the lenses 41 to 44 correspond to examples of a "first optical axis" and a "second optical axis," respectively.

The group of the SMFs 50 include the same number of SMFs 51 to 54 as the number of the lenses 41 to 44 (in this example, four). The SMFs 51 to 54 differ from the SMFs 351 to 354 in that their end faces 51a to 54a (only end faces 52a and 53a are illustrated in FIG. 1) are obliquely polished. Here, oblique polishing means that each end face 51a to 54a is polished obliquely/diagonally so as to be inclined in a predetermined inclination direction (described later) with respect to a plane (in this embodiment, the xy plane) orthogonal to its center axis by a predetermined polishing angle (in this example, 8°). By obliquely polishing the SMFs 51 to 54, the reflected return light at each of the end faces 51a to 54a is reduced. End portions of the SMFs 51 to 54 in the −z-axis direction are inserted into and held by ferrules 61 to 64 each having a cylindrical shape. The end faces 51a to 54a of the SMFs 51 to 54 are collectively obliquely polished together with end faces 61a to 64a of the ferrules 61 to 64. The group of the SMFs 50 and the SMFs 51 to 54 correspond to examples of a "group of single-core optical fibers" and "peripheral single-core optical fibers," respectively. Additionally, the cores C of the SMFs 51 to 54 correspond to an example of "second cores." Furthermore, the above-mentioned inclination direction and polishing angle correspond to examples of a "first inclination direction" and a "first polishing angle," respectively.

11

Figure 2:
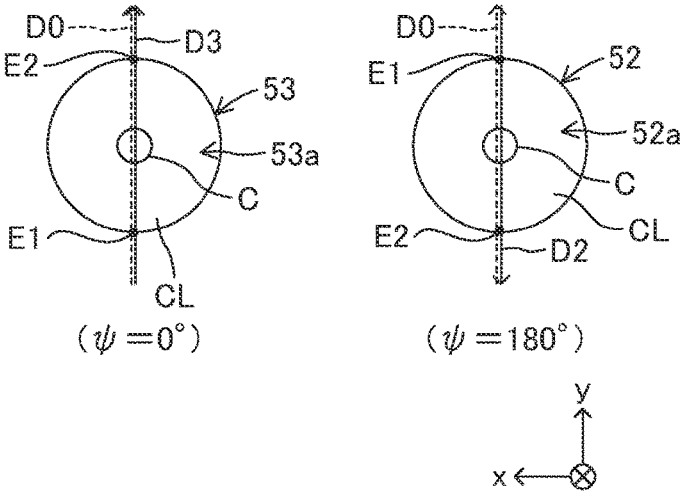
FIG. 2 is a diagram for illustrating an end face of a single-mode optical fiber included in the FIFO device and is used to describe an oblique polishing rotation angle.

Here, a line segment in which a "plane which passes through a center of each of the end faces 51a to 54a of the SMFs 51 to 54, is orthogonal to each of the end faces 51a to 54a, and is parallel to the above-mentioned inclination direction" intersects with each of the end faces 51a to 54a is defined as an "oblique polishing reference axis." In this case, the oblique polishing direction of each of the SMFs 51 to 54 is defined as a direction obtained when a "direction directed along the oblique polishing reference axis from a distal end E1 which is more separated away from the corresponding lens 41 to 44 toward a proximal end which is more proximal to the corresponding lens 41 to 44" is viewed along the center axis of each of the end faces 51a to 54a. In this embodiment, the SMFs 51 to 54 are columnar/cylindrical. Therefore, the obliquely polished end faces 51a to 54a become elliptical when viewed from a direction perpendicular to them. Thus, the oblique polishing reference axis is a major axis of each of the end faces 51a to 54a. A direction obtained when a direction directed from, among both ends of this major axis, one end (distal end E1) which is more separated away from the corresponding lens 41 to 44 toward the other end (proximal end E2) which is more proximal to the corresponding lens 41 to 44 is viewed along the center axis of each end face 51a to 54a is the "oblique polishing direction of each SMF 51 to 54." Hereinafter, viewing an any member along its center axis is also referred to as "front view of the member" or "view from its front." FIG. 2 is a front view of the end faces 53a and 52a of the SMFs 53 and 52. As shown in FIG. 1 and FIG. 2, an oblique polishing direction D3 of the end face 53a is a direction (+y-axis direction) directed from the distal end E1 towards the proximal end E2 of the oblique polishing reference axis, and an oblique polishing direction D2 of the end face 52a is a direction (−y-axis direction) directed from the distal end E1 towards the proximal end E2 of the oblique polishing reference axis. It should be noted that the oblique polishing direction can also be understood as a polishing direction in which a z-axis component of each of the end faces 51a to 54a decreases.

Hereinafter, an angle which any oblique polishing direction forms counterclockwise with a "reference direction DO which passes through the center of each end face 51a to 54a and points to the +y-axis direction" when each of the end faces 51a to 54a of the SMFs 51 to 54 is viewed from its front is defined as an "oblique polishing rotation angle Ψ with a positive value". In the example of FIG. 2, the oblique polishing direction D3 of the SMF 53 coincides with the reference direction DO. Therefore, an oblique polishing rotation angle LP of the SMF 53 is 0°. On the other hand, an oblique polishing direction D2 of the SMF 52 is opposite to the reference direction DO. Therefore, an oblique polishing rotation angle Ψ of the SMF 52 is 180°. Additionally, although an illustration is omitted in FIG. 1, in this example, oblique polishing rotation angles Ψ of the SMFs 54 and 51 are 0° and 180°, respectively. Hereinafter, the oblique polishing rotation angle Ψ is also referred to simply as a "rotation angle Ψ."

When each of the SMFs 51 to 54 is obliquely polished, in order to have the light beam enter each of the end faces 51a to 54a with low loss, it is necessary to control the emission light beam exiting from the corresponding lens 41 to 44 such that each of the principal rays B1 to B4 thereof is positioned on a "major axis orthogonal plane which is a plane passing through the major axis of each of the end faces 51a to 54a, and is orthogonal to each end face 51a to 54a" as well as a light beam angle θ1 (angle forming with the optical axis of the corresponding lens 41 to 44) of each of the principal rays B1 to B4 becomes a predetermined angle. When a polishing angle of each end face 51a to 54a is 8°, it is desirable for a light beam angle θ1 at a wavelength of the light beam of 1.55 μm to be 3.8°. In more detail, it is desirable that an angle formed by each of the "principal rays B1 to B4 entering the end faces 51a to 54a" and each of "line segments connecting the incident positions on the end faces 51a to 54a and the corresponding proximal end 62" is 78.2°.

Now, according to well-known light beam matrices, a light beam angle θ1 of emission light beam exiting from any one of lenses depends on an incident position p and an incident angle θ of incident light beam entering the lens. The incident position p is defined as a relative position with respect to a principal point of the lens, and the incident angle θ is defined as an angle formed by the incident light beam and an optical axis of the lens. In this example, optical paths of the incident light beams (the principal rays B1 to B4) to the lenses 41 to 44 remain unchanged. Therefore, the incident angle θ of each of the incident light beams is constant. Hence, in order for the principal rays B1 to B4 of the emission light beams exiting from the lenses 41 to 44 to be positioned on the major axis orthogonal plane and to have desired light beam angles θ1, it is necessary to control the incident positions p of the incident light beams to the lenses 41 to 44.

Figure 3A:
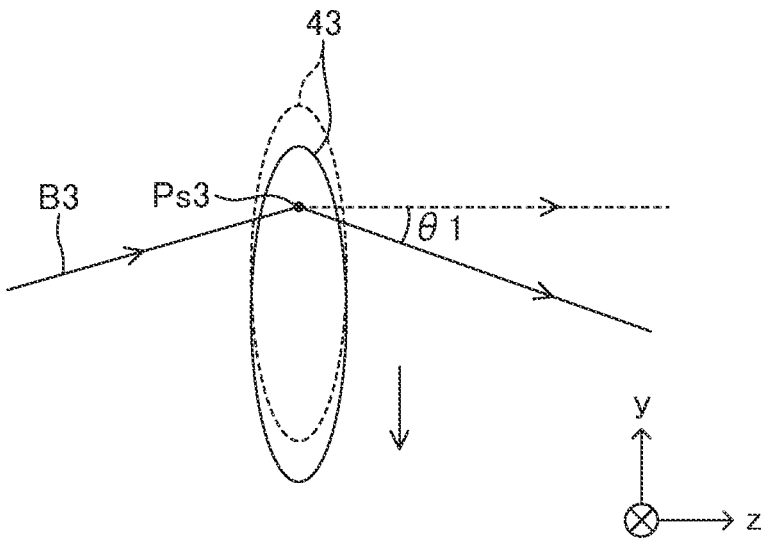
FIG. 3A is a side view for illustrating a moving direction of a second lens included in the FIFO device.
Figure 3B:
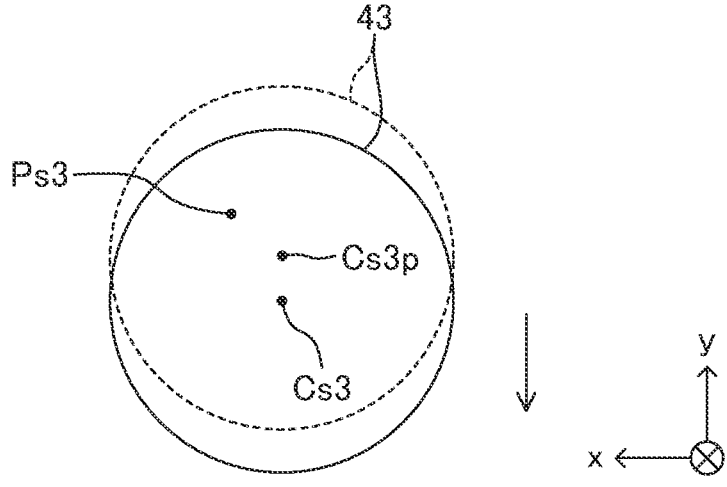
FIG. 3B is a front view for illustrating the moving direction of the second lens of FIG. 3A.

FIG. 3A and FIG. 3B are enlarged views of the lens 43 in FIG. 1. In FIG. 3A and FIG. 3B, the lens 43 of the device 10 is shown by the solid line, while the lens 43 of the device 310 is shown by the broken line. As shown in FIG. 3A and FIG. 3B, the lens 43 of the device 10 is moved in the −y-axis direction relative to the lens 43 of the device 310 (hereinafter, a layout of the device 310 may be also simply referred to as "pre-movement layout"). As a result, the incident position Ps3 of the principal ray B3 on the lens 43 is relatively moved in the +y-axis direction compared to the pre-movement layout, causing the principal ray B3 exiting from the lens 43 to incline in the −y-axis direction compared to the pre-movement layout (see FIG. 3A). In this example, the lens 43 is moved to ensure that the light beam angle θ1 of the principal ray B3 is 3.8° (i.e., the incident position Ps3 is moved). Therefore, with this configuration, as shown in FIG. 1, the emission light beam exiting from the lens 43 (only the principal ray B3 is illustrated in FIG. 1) appropriately enters the end face 53a of the SMF 53. It should be noted that the SMF 53 also moves in the −y-axis direction to ensure that the principal ray B3 enters the center of the core C, in accordance with a change in the light beam angle θ1 of the incident light beam incident on the SMF 53.

On the other hand, as apparent by comparing FIG. 1 and FIG. 5, the lens 42 of the device 10 is moved in the +y-axis direction relative to the lens 42 of the device 310. As a result, the incident position Ps2 (see FIG. 7A) of the principal ray B2 on the lens 42 is relatively moved in the −y-axis direction compared to the pre-movement layout, causing the principal ray B2 exiting from the lens 42 to incline in the +y-axis direction compared to the pre-movement layout (see FIG. 1). When the lens 42 is moved by the same distance as the lens 43, due to the symmetry of the principal rays B2 and B3, the light beam angle θ1 of the principal ray B2 becomes 3.8°. Therefore, with this configuration, as shown in FIG. 1, the emission light beam exiting from the lens 42 (only the principal ray B2 is illustrated in FIG. 1) appropriately enters the end face 52a of the SMF 52. It should be noted that the SMF 52 also moves in the +y-axis direction to ensure that the principal ray B2 enters the center of the core C, in accordance with a change in the light beam angle θ1 of the incident light beam incident on the SMF 52.

Although an illustration is omitted in FIG. 1, the lenses 44 and 41 are moved in a similar manner. In other words, as mentioned above, since the oblique polishing rotation angle Ψ of the SMF 54 is 0°, the lens 44 (and the SMF 54) is also moved in the −y-axis direction relative to the lens 44 (and the SMF 54) of the device 310. Additionally, since the oblique polishing rotation angle Ψ of the SMF 51 is 180°, the lens 41 (and the SMF 51) is moved in the +y-axis direction relative to the lens 41 (and the SMF 51) of the device 310. The moving distance of the lenses 44 and 41 is equal to the moving distance of the lenses 43 and 42. With this configuration, the emission light beams exiting from the lenses 44 and 41 also appropriately enter the end faces 54$a$ and 51$a$ of the SMFs 54 and 51, respectively.

According to the device 10 in FIG. 1, it is possible to reduce the reflected return light compared to the device 310 in FIG. 5. In addition, it is possible to move the lenses 41 to 44 and the SMFs 51 to 54 in a direction approaching the axis A1 along the y-axis direction. Therefore, it is possible to realize the device 10 with a downsized coupling portion compared to prior-art devices.

As apparent from the above description, there is a correlation between the oblique polishing direction of the SMFs 51 to 54 and the moving direction of the lenses 41 to 44. Therefore, the inventors of the present application investigated an angle range of the oblique polishing rotation angles W that can downsize the coupling portion of the device 10 in the radial direction by calculating a movement amount Δr of each of the lenses 41 to 44 in the radial direction (described later) obtained by varying the oblique polishing rotation angle Ψ of each of the SMFs 51 to 54 within the range of 0°≤Ψ≤360°.

Furthermore, the incident positions Ps1 to Ps4 on the lenses 41 to 44 can be controlled not only when the lenses 41 to 44 are moved on the xy plane but also when they are moved at least in the z-axis direction. Therefore, the inventors of the present application investigated an angle range of the oblique polishing rotation angles W that can downsize the device 10 in the z-axis direction (i.e, in the axis A1 direction) by also calculating a movement amount Δz of each of the lenses 41 to 44 in the z-axis direction obtained by varying the oblique polishing rotation angle Ψ of each of the SMFs 51 to 54 within the range of 0°≤Ψ≤360°.

Note that the above-mentioned "radial direction" is a direction along a half-line connecting the "axis A1" and "each of the principal points Cs1 to Cs4 (see FIG. 7A) of the lenses 41 to 44." Additionally, the "radial direction" can be also said as a direction along a half-line connecting the "axis A1" and "each of the centers of the end faces 51$a$ to 54$a$ of the SMFs 51 to 54." Furthermore, "the lenses 41 to 44 move in the radial direction" means "each of the moving directions of the lenses 41 to 44 has at least a radial component," and does not imply "each of the moving directions has only the radial component." Moreover, although the lenses 41 to 44 and the SMFs 51 to 54 are accommodated in non-illustrated members, these accommodating members do not interfere with each other due to the movement of the lenses 41 to 44 and the like.

Figure 9A:
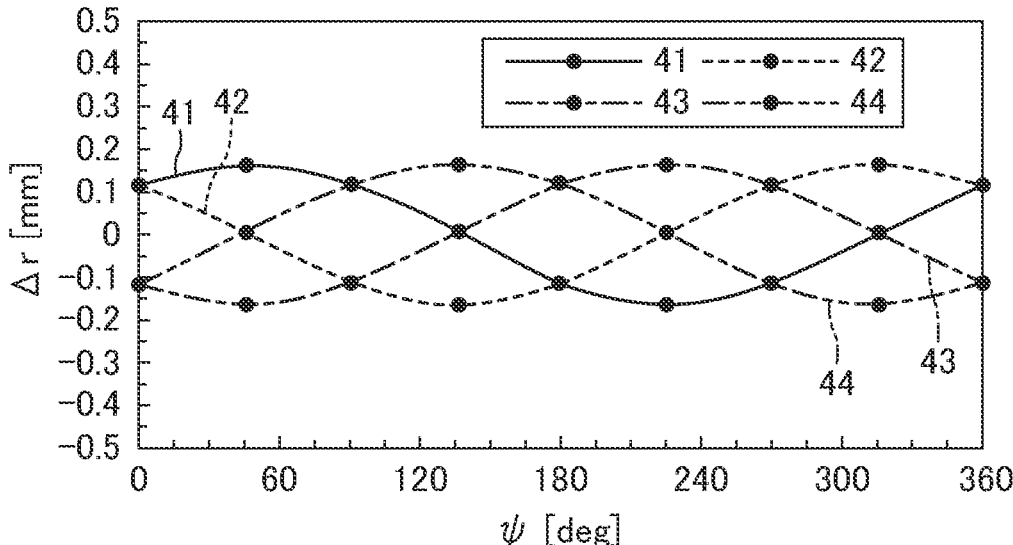
FIG. 9A is a graph for defining a relationship between the oblique polishing rotation angle and an amount of movement in a radial direction in the FIFO device of FIG. 1.
Figure 9B:
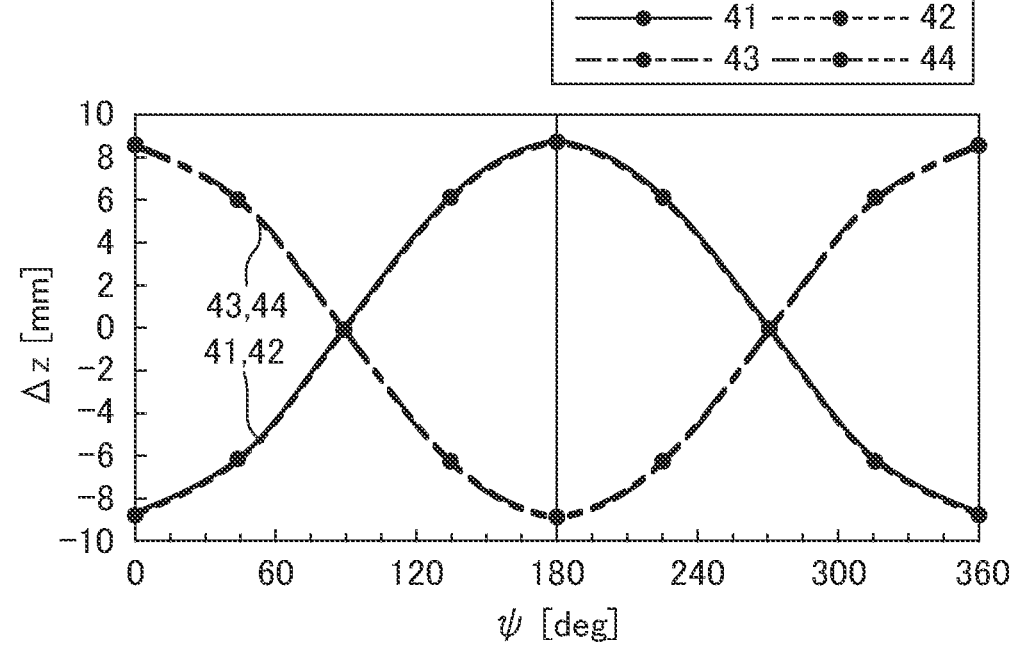
FIG. 9B is a graph for defining a relationship between the oblique polishing rotation angle and an amount of movement in a z-axis direction in the FIFO device of FIG. 1.

FIG. 9A is a graph for defining a relationship between the oblique polishing rotation angle Ψ and the radial movement amount Δr in the device 10, while FIG. 9B is a graph for defining a relationship between the oblique polishing rotation angle Ψ and the z-axis movement amount Δz in the device 10. Δz has a positive value when the lenses 41 to 44 move radially outward (the coupling portion of the device 10 increases in size) and has a negative value when the lenses 41 to 44 move radially inward (the coupling portion of the device 10 is downsized). Note that "radially outward" refers to a direction away from the axis A1 in the radial direction, while "radially inward" refers to a direction approaching the axis A1 in the radial direction. On the other hand, Δz has a positive value when the lenses 41 to 44 move in the +z-axis direction (the coupling portion of the device 10 increases in size) and has a negative value when the lenses 41 to 44 move in the −z-axis direction (the coupling portion of the device 10 is downsized).

Figure 10:
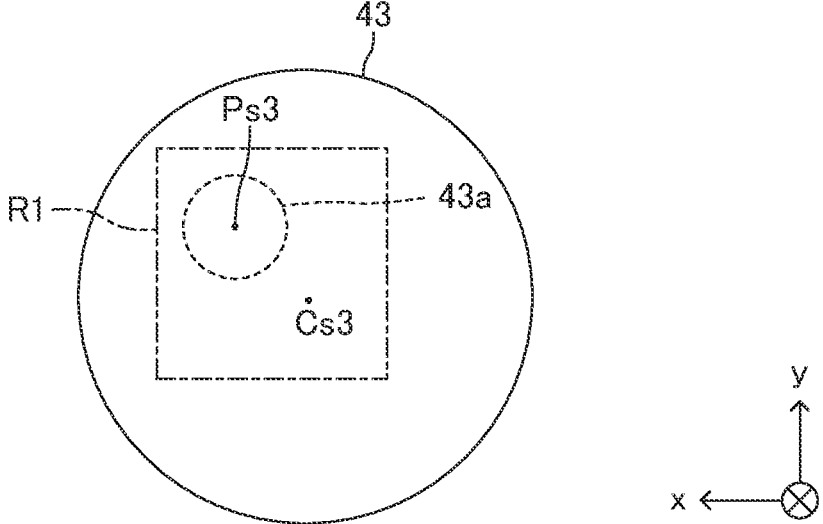
FIG. 10 is a front view of one of the second lenses.
Figure 11A:
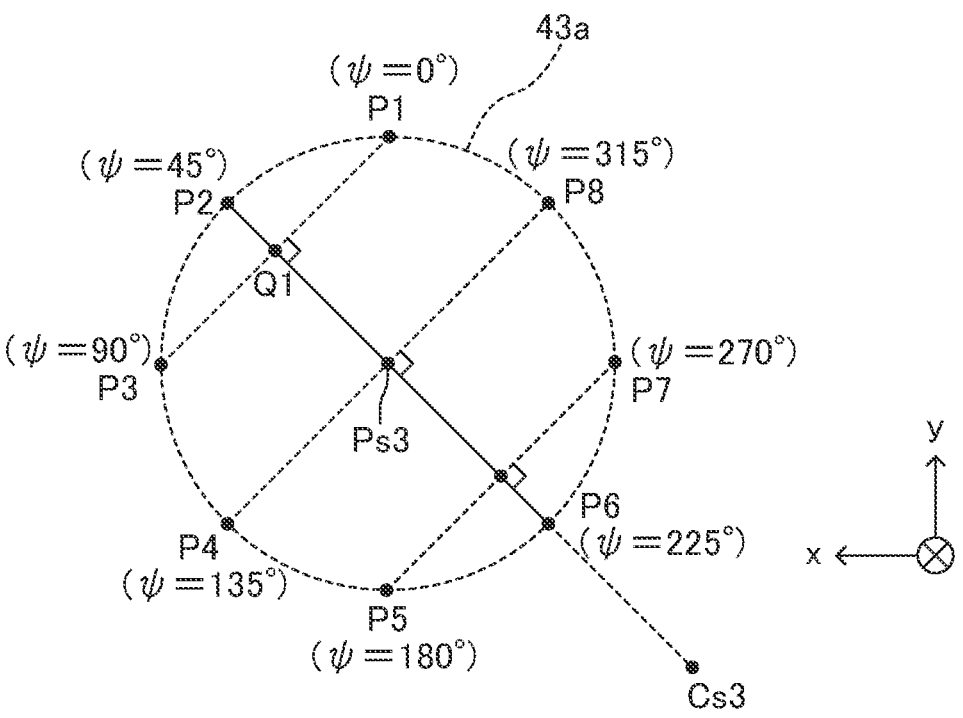
FIG. 11A is a partially enlarged view of a region R1 in FIG. 10 and for illustrating moving directions in the radial direction of the second lens, an incident position of a principal ray entering/onto the second lens, and a correspondence relationship with the oblique polishing rotation angles.
Figure 11B:
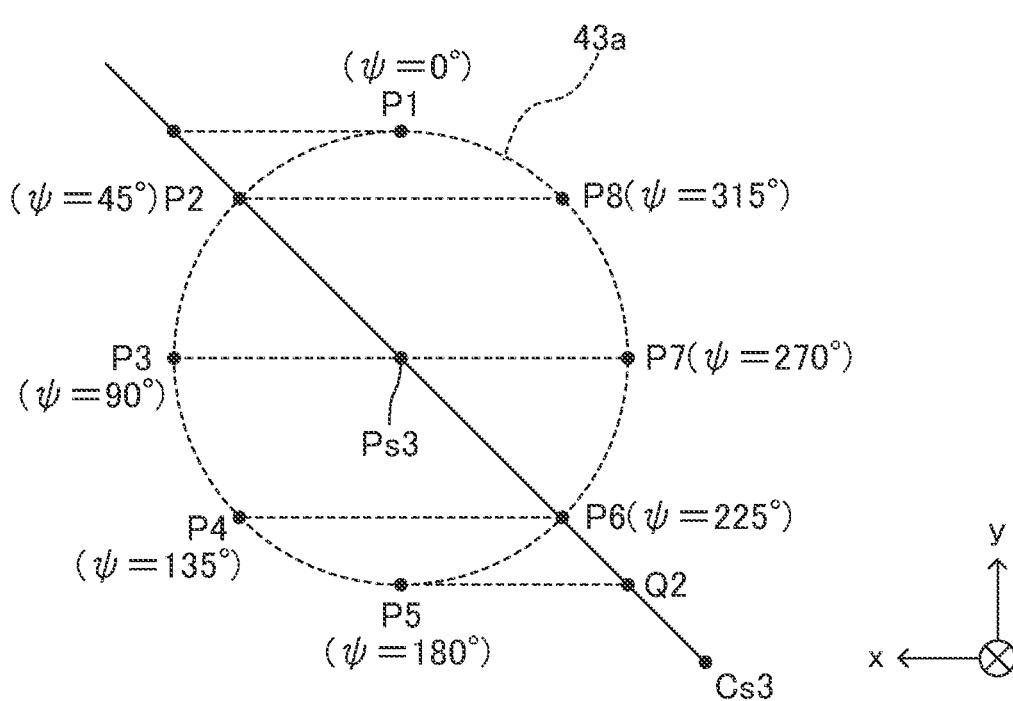
FIG. 11B is a partially enlarged view of the region R1 in FIG. 10 and for illustrating moving directions in the z-axis direction of the second lens, the incident position of the principal ray entering/onto the second lens, and a correspondence relationship with the oblique polishing rotation angles.

Before describing on the graphs of FIG. 9A and FIG. 9B, a relationship between the oblique polishing rotation angle Ψ and the moving direction of the lenses 41 to 44 is described using the lens 43 as an example. FIG. 10 is a front view of the lens 43. FIG. 11A and FIG. 11B are partially enlarged views of a region R1 in FIG. 10. A circle 43$a$ shown in each of FIG. 10 to FIG. 11B is a circle with a radius of 0.16 mm having the incident position Ps3 as a center. The incident position Ps3 in each of these figures is an incident position at which the principal ray B3 enters the lens 43 of the device 310 serving as the comparative example (that is, a position at which the principal ray B3 which has passed the focal point f2 of the lens 43 enters (see FIG. 7B)). As mentioned above, the optical path of the incident light beam to the lens 43 remains unchanged. Therefore, when the lens 43 is moved, the incident position Ps3 is relatively moved/shifted. Based on the calculations mentioned above, the following findings were obtained:

By moving the lens 43 so that the incident position Ps3 is located at any point on the circle 43$a$, the light beam angle θ1 of the principal ray B3 of the emission light beam can be controlled to be 3.8°.

When the lens 43 is moved on the xy plane, the principal ray B3 of the emission light beam is refracted in the same direction as the moving direction of the lens 43 (by 3.8°).

Figure 12:
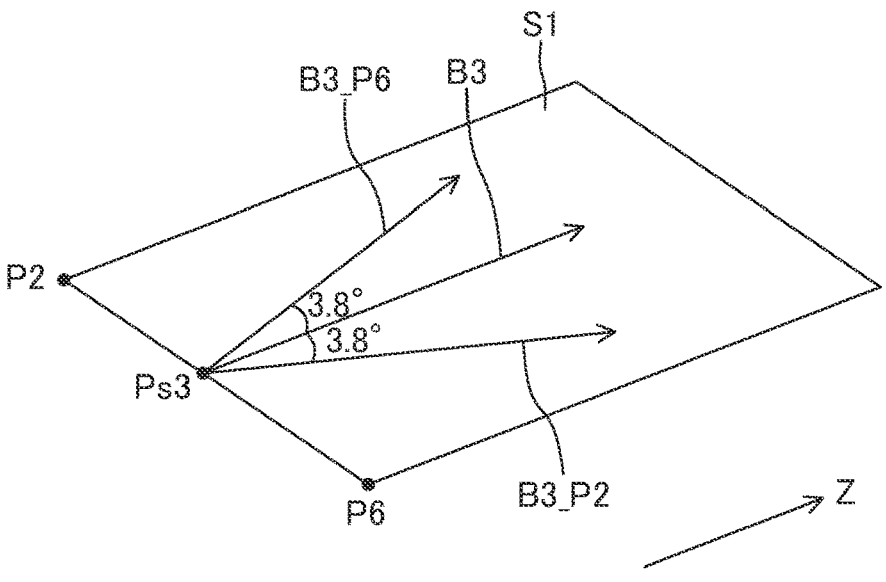
FIG. 12 is a diagram for illustrating how a principal ray of light beam exiting from the second lens refracts due to a movement of the second lens.

A specific description on these findings is given. As shown in FIG. 11A and FIG. 11B, on the circle 43$a$, eight points P1 to P8 are arranged counterclockwise in this order at an even interval. The point P1 is located in the +y-axis direction from the incident position Ps3. The points P1 to P8 are fixed points on the lens 43. FIG. 12 is a diagram for illustrating how the principal ray B3 of the emission light beam is refracted when the lens 43 is moved by a predetermined distance in a predetermined direction described later. The principal ray B3 in FIG. 12 represents the principal ray of the emission light beam exiting from the lens 43 of the device 310, and hence this principal ray B3 is traveling in the +z-axis direction (in other words, traveling in parallel with the optical axis As3 (see FIG. 7B) of the lens 43).

First, referring to FIG. 10 and FIG. 11A, a case of moving the lens 43 on the xy plane is described. For example, when the lens 43 is moved by 0.16 mm in a radially inward direction, the incident position Ps3 moves to the point P2. At this time, as shown in FIG. 12, a principal ray B3_P2 of the emission light beam is refracted on a virtual plane S1 (a plane passing a line segment P2P6 and expanding in the z-axis direction) by 3.8° toward the point P6 compared to the principal ray B3 before the movement. Here, "toward the point P6" refers to the radially inward direction, that is, the moving direction of the lens 43. As a result, a light beam angle θ1 of the principal ray B3_P2 becomes 3.8°.

Besides, for example, when the lens 43 is moved by 0.16 mm in a radially outward direction, the incident position Ps3 moves to the point P6. At this time, as shown in FIG. 12, a principal ray B3_P6 of the emission light beam is refracted on the virtual plane S1 by 3.8° toward the point P2 compared to the principal ray B3 before the movement. Here, "toward the point P2" refers to the radially outward direction, that is, the moving direction of the lens 43. As a result, a light beam angle θ1 of the principal ray B3_P6 becomes 3.8°.

Similarly, when the lens 43 is moved on the xy plane so that the incident position Ps3 is located at the points P1, P3, P4, P5, P7, or P8, the principal ray B3 of the emission light beam after the movement is refracted by 3.8° in the moving direction of the lens 43 compared to the principal ray B3 before the movement. As a result, a light beam angle θ1 of the principal ray B3 after the movement becomes 3.8°.

As apparent from the above description, when moving the lens 43 on the xy plane, an actual moving distance is constant (in this example, 0.16 mm) regardless of the moving direction. However, in this calculation, attention is focused on a moving distance of the lens 43 in the radial direction, and thus the moving amount Δr is defined as a "radial component of the actual moving distance of the lens 43". That is, a "component orthogonal to the radial direction" of the actual moving distance is ignored. For example, when moving the lens 43 so that the incident position Ps3 is located at the points P1 or P3, the moving amount Δr becomes equal to a length of a line segment Ps3Q1 (in this example, 0.11 mm). Note that a point Q1 is a foot of a perpendicular dropped from the point P1 onto the line segment P2P6. Besides, when moving the lens 43 so that the incident position Ps3 is located at the point P4 or P8, there is no radial component in the moving distance, and hence the moving amount Δr becomes 0.

Next, referring to FIG. 10 and FIG. 11B, a case of moving the lens 43 at least in the z-axis direction is described. When the lens 43 is moved in the −z-axis direction, the incident position Ps3 moves in the radially inward direction, and when the lens 43 is moved in the +z-axis direction, the incident position Ps3 moves in the radially outward direction. In this calculation, further, by moving the lens 43 in the x-axis direction, the incident position Ps3 is caused to move to any point on the circle 43*a*.

For example, when the lens 43 is moved by 6.2 mm in the −z-axis direction, the incident position Ps3 moves to the point P6. The direction of refraction of the principal ray B3_P6 of the emission light beam in this case is as described above (refer to FIG. 12). From this state, when the lens 43 is further moved by 0.23 mm in the +x-axis direction, the incident position Ps3 moves to the point P4.

Besides, for example, when the lens 43 is moved by 8.7 mm in the −z-axis direction, the incident position Ps3 moves to a point Q2. The point Q2 is an intersection of a straight line P2P6 and a tangent to the circle 43*a* at the point P5. From this state, when the lens 43 is further moved by 0.16 mm in the +x-axis direction, the incident position Ps3 moves to the point P5.

That is, in this calculation, when moving the lens 43 so that the incident position Ps3 is located at the point P2 or P6, the lens 43 is moved only in the z-axis direction. On the other hand, when moving the lens 43 so that the incident position Ps3 is located at "any point on the circle 43*a* except the points P2 and P6," the lens 43 is moved in the z-axis and x-axis directions. The principal ray B3 of the emission light beam after the movement refracts in the same direction as "when moving the lens 43 on the xy plane", compared to the principal ray B3 before the movement. As a result, the light beam angle θ1 of the principal ray B3 after the movement becomes 3.8°. Note that the lens 43 may be moved in the y-axis direction instead of being moved in the x-axis direction.

As apparent from the above description, when moving the lens 43 at least in the z-axis direction, depending on the moving direction, there may be a case in which the lens 43 is moved in the x-axis direction. However, in this calculation, attention is focused on a moving distance of each of the second lenses in the z-axis direction, and thus the moving amount Δz is defined as a "moving distance of the lens 43 in the z-axis direction." Therefore, when moving the lens 43 so that the incident position Ps3 is located at the point P3 or P7, the moving amount Δz becomes zero.

Furthermore, the moving distance in the x-axis direction (e.g., 0.23 mm) is extremely short compared to the moving distance in the z-axis direction (e.g., 6.2 mm). Therefore, even when the lens 43 moves along the −x-axis direction (i.e., moves away from the axis A1), a change in the size of the coupling portion of the device 10 caused by this movement is extremely small. Therefore, in this calculation, the moving distance of the lens 43 in the x-axis direction is ignored (in other words, downsizing of the coupling portion of the device 10 in the z-axis direction is prioritized).

Based on the above findings, it can be understood that by setting the oblique polishing direction of the SMF 53 in accordance with the refraction direction of the principal ray B3 of the emission light beam exiting from the lens 43 after the movement, the emission light beam can be properly incident on the end face 53*a* of the SMF 53. Specifically, as shown in FIG. 11A and FIG. 11B, when moving the lens 43 so that the incident position Ps3 is located at the point P2 (refer to FIG. 12), the oblique polishing rotation angle Ψ of the SMF 53 can be set to 45°. When moving the lens 43 so that the incident position Ps3 is located at the point P6 (refer to FIG. 12), the oblique polishing rotation angle Ψ of the SMF 53 can be set to 225°. Likewise, when moving the lens 43 so that the incident position Ps3 is located at the points P1, P3, P4, P5, P7, and P8, the oblique polishing rotation angle Ψ of the SMF 53 can be set to 0°(=360°, 90°, 135°, 180°, 270°, and 315°, respectively.

The same concept can be applied to the lenses 41, 42, and 44 and the SMFs 51, 52, and 54. The above is the description on the relationship between the oblique polishing rotation angle Ψ and the moving direction of the lenses 41 to 44.

Next, calculation results of the moving amount Δr is described with reference to FIG. 9A. According to FIG. 9A, for the lens 41, when the oblique polishing rotation angle Ψ of the SMF51 satisfies 135°<Ψ<315°, Δr becomes negative, and Δr is minimized when Ψ=225°. For the lens 42, when the oblique polishing rotation angle Ψ of the SMF52 satisfies 45°<Ψ<225°, Δr becomes negative, and Δr is minimized when Ψ=135°. For the lens 43, when the oblique polishing rotation angle Ψ of the SMF 53 satisfies 315°<Ψ<135° (i.e., 315°<Ψ<360°, 0°Ψ<135°), Δr becomes negative, and Δr is minimized when Ψ=45°. For the lens 44, when the oblique polishing rotation angle Ψ of the SMF54 satisfies 225°<Ψ <45° (i.e., 225°<Ψ<360°, 0°Ψ<45°), Δr becomes negative, and Δr is minimized when Ψ=315°.

Figure 13:
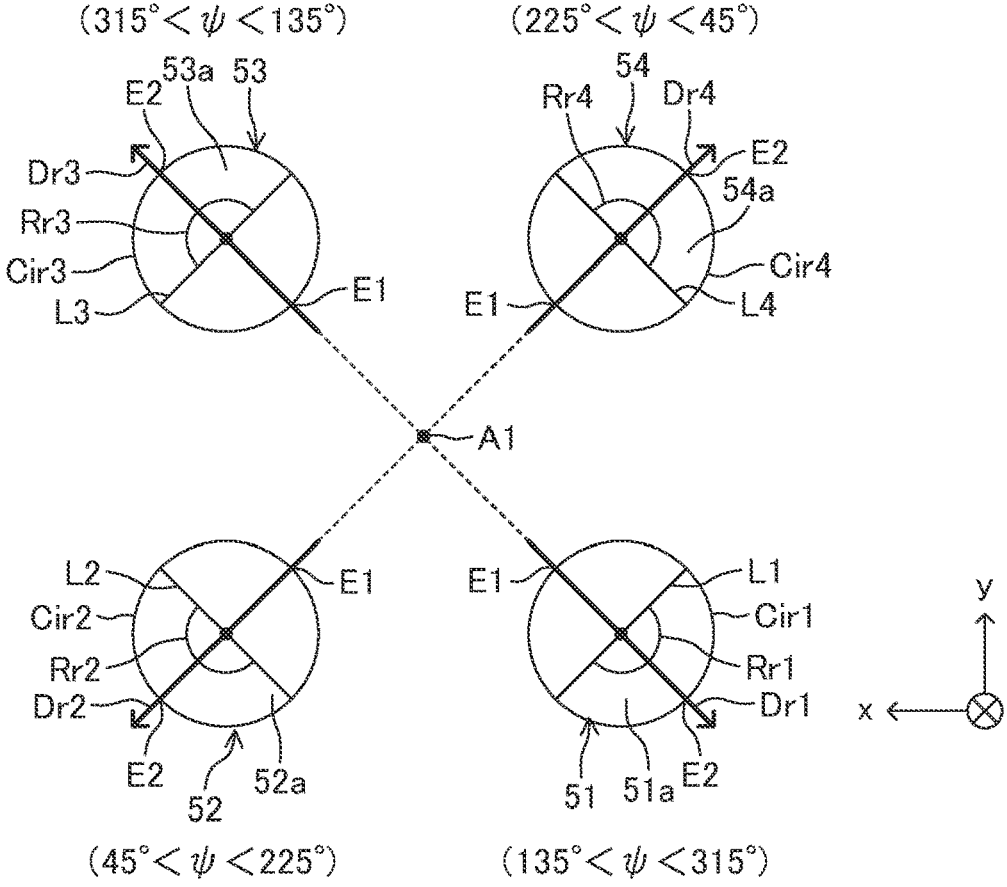
FIG. 13 is a front view of single-mode optical fibers and is used to describe angle ranges of the oblique polishing rotation angles and the like at the time when a radial direction condition is satisfied.

FIG. 13 is a diagram for illustrating, in a front view of the end faces 51*a* to 54*a* of the SMFs 51 to 54, angle ranges Rr1 to Rr4 of the oblique polishing rotation angle Ψ at the time when a radial direction condition that Δr becomes negative is satisfied, and the oblique polishing directions Dr1 to Dr4 at the time when Δr is minimized (that is, maximized in the radially inward direction). In FIG. 13, illustration of the cores C is omitted. As shown in FIG. 13, the angle ranges Rr1 to Rr4 are angle ranges corresponding to outer circumferences Cir1 to Cir4. Here, the outer circumferences Cir1 to Cir4 are outer circumferences of the portions on a radially outward side with respect to line segments L1 to L4, respectively. The line segments L1 to L4 are line segments passing through the centers of the end faces 51*a* to 54*a* and is orthogonal to the radial direction, respectively. The radial direction condition is satisfied when the oblique polishing rotation angles $\Psi$ of the SMFs 51 to 54 are included in the angle ranges Rr1 to Rr4, respectively. In other words, the radial direction condition is satisfied when the oblique polishing directions are set such that the proximal ends E2 of the major axes of the end faces 51a to 54a are located on the outer circumferences Cir1 to Cir4, respectively.

Furthermore, the oblique polishing directions Dr1 to Dr4 point to the radially outward direction, respectively, and are point-symmetric with respect to the axis A1. In other words, the orientations of the oblique polishing directions Dr1 to Dr4 are set such that the proximal ends E2 of the major axes of the end faces 51a to 54a are located at middle points of the respective outer circumferences Cir1 to Cir4.

In other words, the line segments L1 to L4 are "line segments passing through the centers of the end faces 51a to 54a, and are orthogonal to line segments connecting the axis A1 and the centers", respectively. Besides, the outer circumferences Cir1 to Cir4 are "out of the outer circumferences of the end faces 51a to 54a, outer circumferences of the portions on a side opposite to a side at which the axis A1 is positioned with respect to the line segments L1 to L4", respectively. The line segments L1 to L4 and the outer circumferences Cir1 to Cir4 correspond to examples of "first orthogonal lines" and "first outer circumferences," respectively.

Next, calculation results of the moving amount $\Delta z$ is described with reference to FIG. 9B. According to FIG. 9B, for the lenses 41 and 42, when the oblique polishing rotation angles $\Psi$ of the SMFs 51 and 52 satisfies $270°<\Psi<90°$ (i.e., $270°<\Psi<360°$, $0°\Psi<90°$), $\Delta z$ becomes negative, and $\Delta z$ is minimized when $\Psi=0°(360°)$. For the lenses 43 and 44, when the oblique polishing rotation angles $\Psi$ of the SMFs 53 and 54 satisfies $90°<\Psi<270°$, $\Delta z$ becomes negative, and $\Delta z$ is minimized when $\Psi=180°$.

Figure 14:
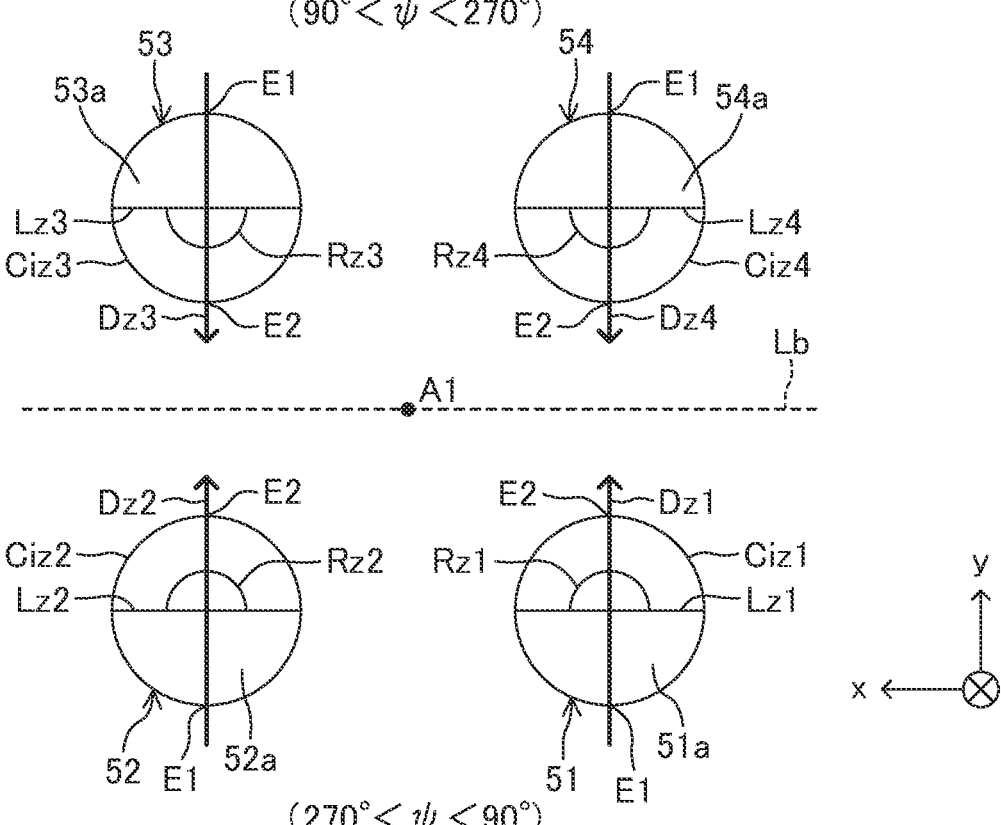
FIG. 14 is a front view of the single-mode optical fibers and is used to describe angle ranges of the oblique polishing rotation angles and the like at the time when a z-axis direction condition is satisfied.

FIG. 14 is a diagram for illustrating, in a front view of the end faces 51a to 54a of the SMFs 51 to 54, angle ranges Rz1 to Rz4 of the oblique polishing rotation angle $\Psi$ at the time when a z-axis direction condition that $\Delta z$ becomes negative is satisfied, and the oblique polishing directions Dz1 to Dz4 at the time when $\Delta z$ is minimized (that is, maximized in the −z-axis direction). Illustration of the cores C is omitted in FIG. 14. As shown in FIG. 14, the angle ranges Rz1 to Rz4 are angle ranges corresponding to outer circumferences Ciz1 to Ciz4, respectively. Here, the outer circumferences Ciz1 to Ciz4 are outer circumferences of the portions on a side at which the axis A1 is located with respect to line segments Lz1 to Lz4, respectively. Furthermore, when a straight line perpendicular to the axis A1 and extending in the x-axis direction is defined as a "reference line Lb," the line segments Lz1 to Lz4 are line segments passing through the centers of the end faces 51a to 54a and are parallel to the reference line Lb, respectively. The z-axis direction condition is satisfied when the oblique polishing rotation angles $\Psi$ of the SMFs 51 to 54 are included in the angle ranges Rz1 to Rz4, respectively. In other words, the z-axis direction condition is satisfied when the oblique polishing direction is set such that the proximal ends E2 of the major axes of the end faces 51a to 54a are positioned on the outer circumferences Ciz1 to Ciz4.

Furthermore, oblique polishing directions Dz1 and Dz2 point to the +y-axis direction (i.e., a direction extending perpendicularly toward the reference line Lb), respectively, while oblique polishing directions Dz3 and Dz4 point to the −y-axis direction (i.e., a direction extending perpendicularly toward the reference line Lb). That is, the oblique polishing directions Dz1 to Dz4 are point-symmetric with respect to the axis A1. In other words, the oblique polishing directions Dz1 to Dz4 are set such that the proximal ends E2 of the major axes of the end faces 51a to 54a are positioned at middle points of the respective outer circumferences Ciz1 to Ciz4.

The line segments Lz1 to Lz4 and the outer circumferences Ciz1 to Ciz4 correspond to examples of "parallel lines" and "second outer circumferences," respectively. Furthermore, the reference line Lb does not pass through the centers of the SMFs 51 to 54. Therefore, the case where "each of the SMFs 51 to 54 is arranged as exemplified in the device 10" corresponds to an example of a "first case." Moreover, the reference line Lb is not limited to a straight line extending in the x-axis direction. The reference line Lb may be a straight line extending in any direction orthogonal to the axis A1. In this case, in order to move the lenses 41 to 44 at least in the z-axis direction, it is sufficient to first move the lenses 41 to 44 in the z-axis direction and then further move them in parallel with the reference line Lb.

The inventors of the present application conducted further detailed investigations on angle ranges of the oblique polishing rotation angle $\Psi$ which allows the coupling portion of the device to downsize in the radial or z-axis direction, by performing similar calculations by changing the MCF 20 (refer to FIG. 1 and FIG. 6) to other MCFs 120 and 220 with different core numbers and/or core arrangements.

Figure 15:
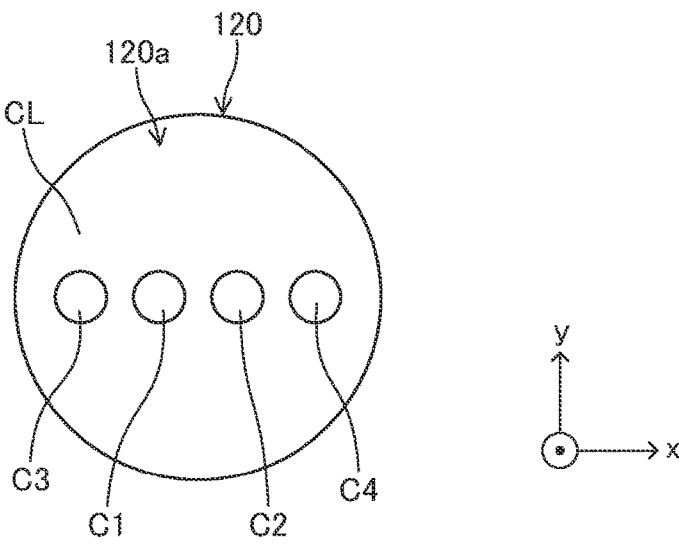
FIG. 15 is a diagram for illustrating an end face of a multi-core optical fiber included in another example of the FIFO device according to the first embodiment of the present invention.

FIG. 15 is a diagram for illustrating an end face 120a of the MCF 120 used for the investigation. The MCF 120 is an MCF with only a different core arrangement compared to the MCF 20. As shown in FIG. 15, the MCF 120 includes four cores C1 to C4 and a common cladding CL surrounding these cores C1 to C4. The cores C1 to C4 are linearly arranged in the x-axis direction so as to satisfy two-fold symmetry, having a center of the end face 120a as a center. The core pitch is 50 μm. The cores C1 to C4 of the MCF 120 correspond to an example of the "first core."

Figure 16:
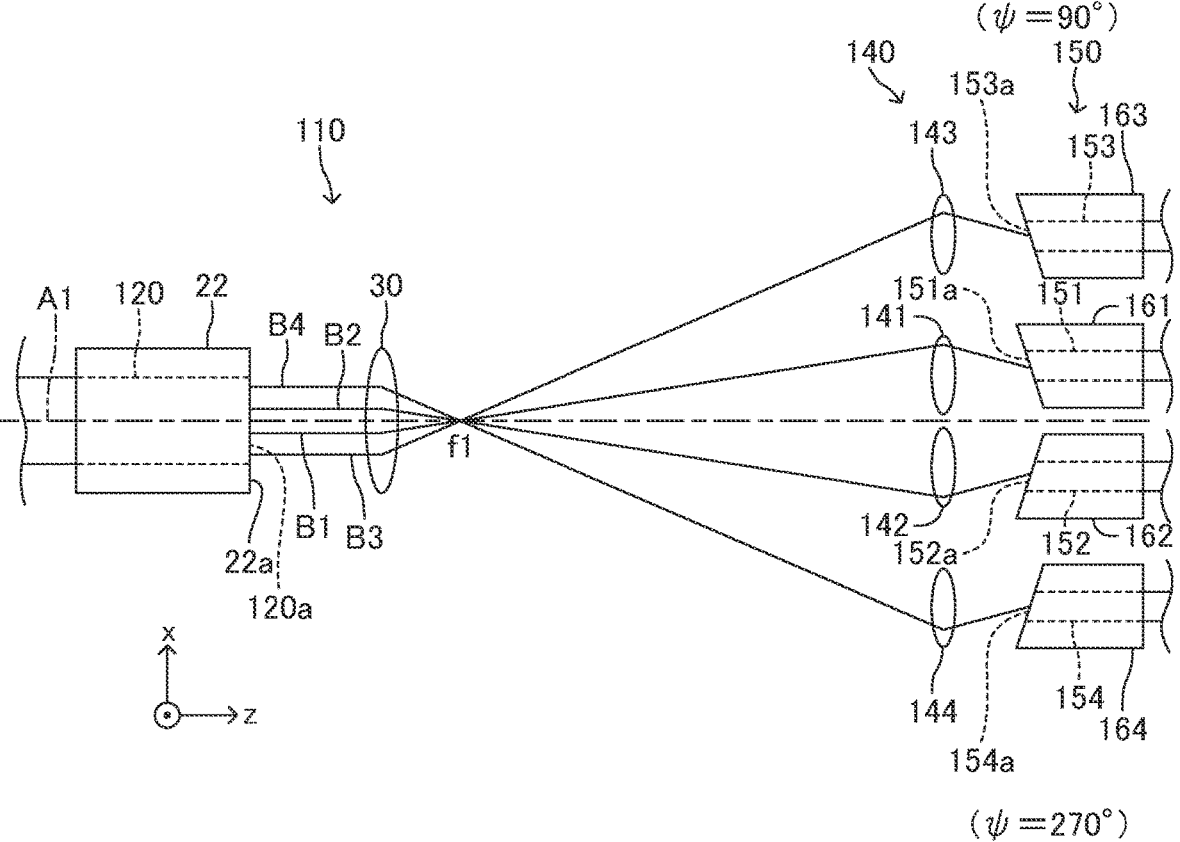
FIG. 16 is a plan view for illustrating the FIFO device including the multi-core optical fiber of FIG. 15.
Figure 17:
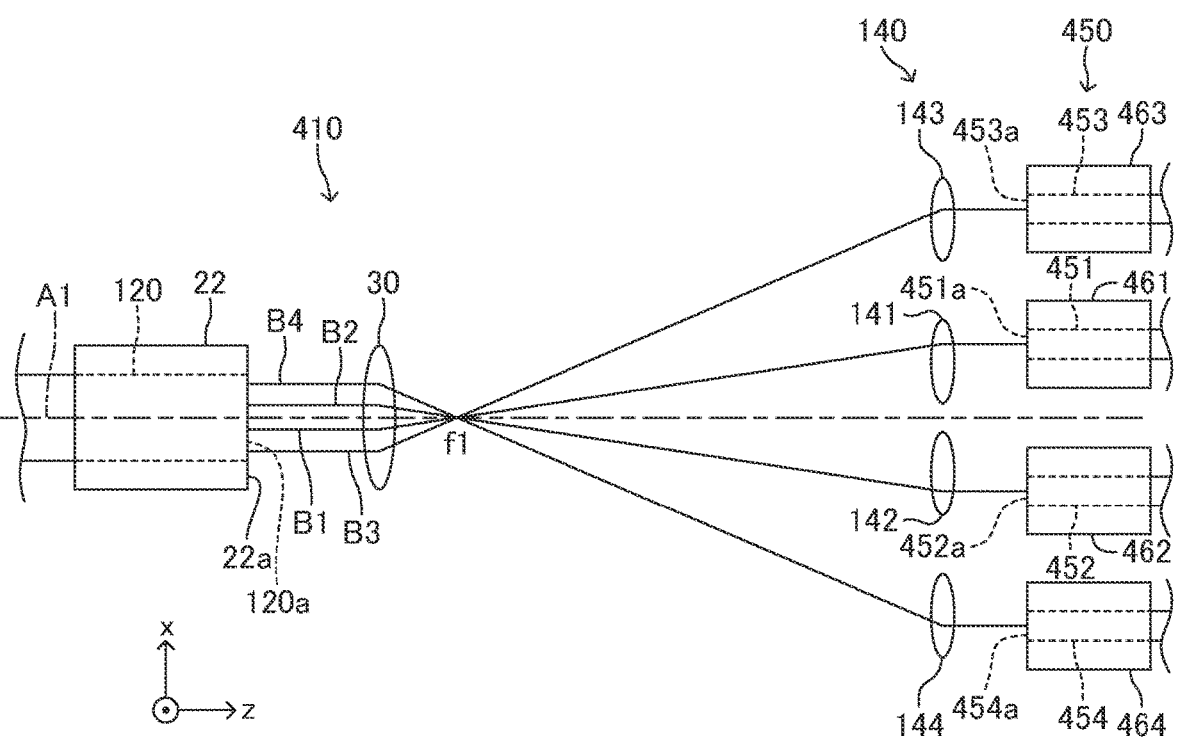
FIG. 17 is a plan view of a comparative device serving as a comparative example of the FIFO device in FIG. 16.

FIG. 16 is a plan view of a device 110 using the MCF 120. FIG. 17 is a plan view of a device 410 serving as a comparative example of the device 110. Below, a description on a configuration of the device 410 is given, focusing on differences from the device 310 (refer to FIG. 4 and FIG. 5), followed by a description on a configuration of the device 110.

As shown in FIG. 17, the device 410 includes the MCF 120, the first lens 30, a group of second lenses 140, and a group of the SMFs 450. The group of the second lenses 140 include lenses 141 to 144. The lenses 141 to 144 are collimator lenses identical to the lenses 41 to 44, respectively, but with different positions. Specifically, the principal points Cs1 to Cs4 (not shown) of the lenses 141 to 144 are located on a straight line orthogonal to the axis A1 and extending in the x-axis direction. Furthermore, the lenses 141 to 144 are arranged such that the "principal rays B1 to B4 of the light beams exiting from the first lens 30, which have been emitted from the respective cores C1 to C4 of the MCF 120" pass through focal points (not shown) of the corresponding respective lenses 141 to 144. Accordingly, the principal rays B1 to B4 incident on the lenses 141 to 144 exit as rays parallel to optical axes of the lenses 141 to 144, respectively. Incident positions Ps11 to Ps14 (not shown) of the incident light beams on the lenses 141 to 144 are also located on the aforementioned straight line (a straight line on which the principal points Cs1 to Cs4 are positioned.)

The group of the SMFs 450 include SMFs 451 to 454. The SMFs 451 to 454 are identical to the SMFs 351 to 354, respectively. End faces 451a to 454a of the SMFs 451 to 454 are arranged at positions where the light beams exiting from the corresponding lenses 141 to 144, which have been emitted from the cores C1 to C4 converge on centers of the cores C, respectively. In other words, the SMFs 451 to 454 are arranged such that the principal rays B1 to B4 enter the centers of the cores C, respectively. Centers of the end faces 451a to 454a are located on a straight line orthogonal to the axis A1 and extending in the x-axis direction. That is, the principal rays B1 to B4 are all positioned on the xz plane passing through the axis A1. End portions of the SMFs 451 to 454 in the −z-axis direction are inserted into and held by ferrules 461 to 464 each having a cylindrical shape, respectively.

The first lens 30 and the group of the second lenses 140 optically couple the MCF 120 and the group of the SMFs 450, and function as a coupling portion of the device. The above is the description on the configuration of the device 410 as the comparative example.

Next, the configuration of the device 110 is described. As shown in FIG. 16, the device 110 uses the same members as the members used in the device 410, except for a group of the SMFs 150.

The group of the SMFs 150 include the SMFs 151 to 154. The SMFs 151 to 154 differ from the SMFs 451 to 454 in that their end faces 151a to 154a are obliquely polished. The SMFs 151 to 154 are identical to the SMFs 51 to 54, respectively, and have a polishing angle of 8°. The end portions of the SMFs 151 to 154 in the −z-axis direction are inserted into and held by ferrules 161 to 164, each having a cylindrical shape, respectively. The SMFs 151 to 154 correspond to an example of "peripheral single-core optical fiber."

In the example of FIG. 16, a rotation angle $\Psi$ of the SMFs 153 and 151 is 90°, and a rotation angle $\Psi$ of the SMFs 152 and 154 is 270°. As shown in FIG. 16 and FIG. 17, lenses 143 and 141 of the device 110 are moved in the −x-axis direction (i.e., a direction approaching the axis A1) relative to the lenses 143 and 141 of the device 410. As a result, the principal rays B3 and B1 exiting from the lenses 143 and 141, respectively, are inclined in the −x-axis direction on the xz plane compared to the rays B3 and B before the movement.

Furthermore, lenses 142 and 144 of the device 110 are moved in the +x-axis direction (i.e., a direction approaching the axis A1) relative to the lenses 142 and 144 of the device 410. As a result, the principal rays B2 and B4 exiting from the lenses 142 and 144, respectively, are inclined in the +x-axis direction on the xz plane compared to the rays B2 and B4 before the movement. That is, the principal rays B1 to B4 are all positioned on the xz plane passing through the axis A1. In this example, the lenses 141 to 144 are moved so that the light beam angles θ1 of the principal rays B1 to B4 of the emission light beams exiting from the lenses 141 to 144 are all 3.8° (i.e., the incident positions Ps11 to Ps14 are moved). Therefore, with this configuration, as shown in FIG. 16, the emission light beams exiting from the lenses 141 to 144 (only the principal rays B1 to B4 are shown in FIG. 16) appropriately enter the end faces 151a to 154a of the SMF 151 to 154.

Figure 18A:
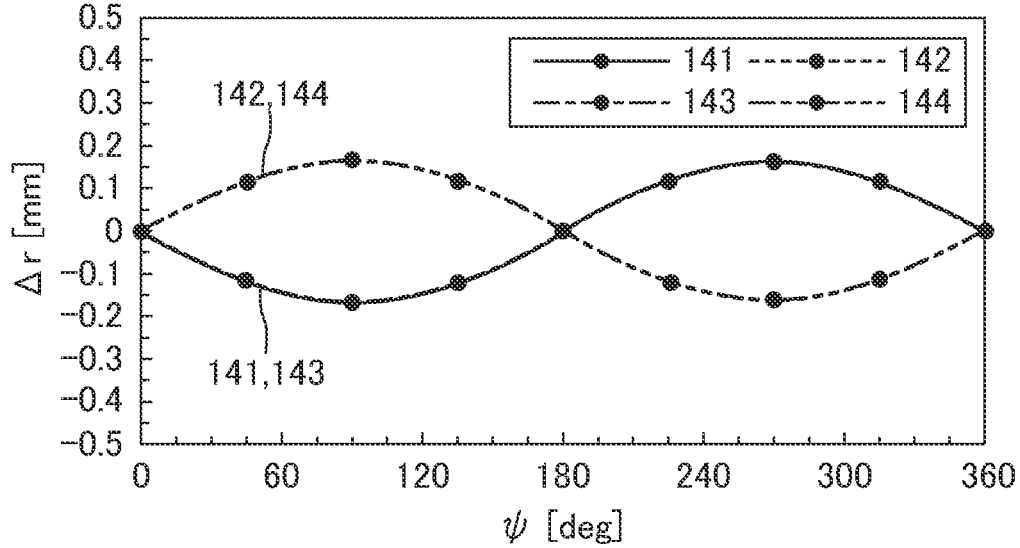
FIG. 18A is a graph for defining a relationship between the oblique polishing rotation angle and an amount of movement in the radial direction in the FIFO device of FIG. 16.
Figure 18B:
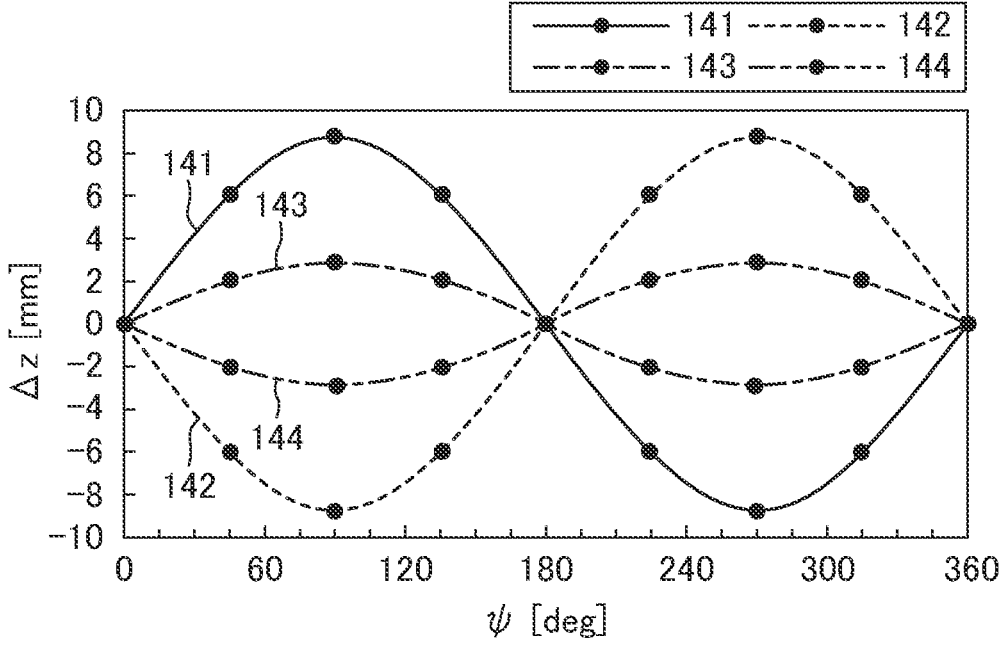
FIG. 18B is a graph for defining a relationship between the oblique polishing rotation angle and an amount of movement in the z-axis direction in the FIFO device of FIG. 16.
Figure 19:
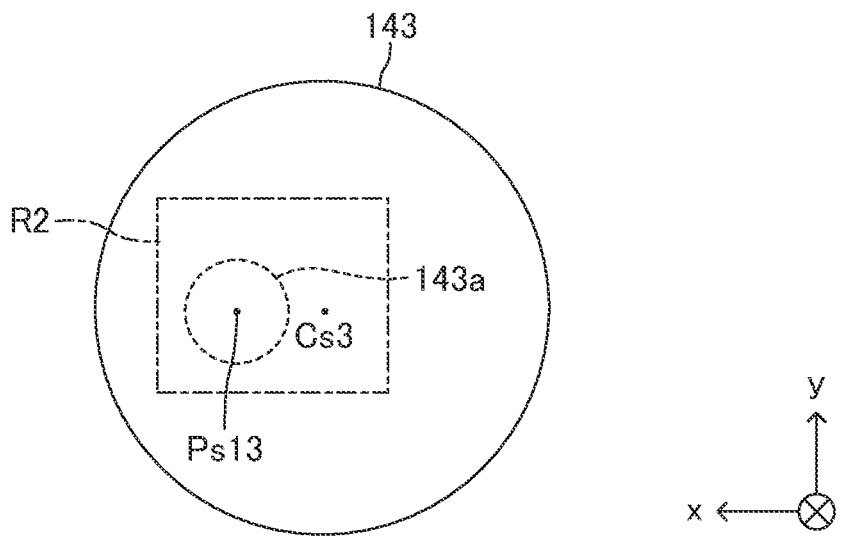
FIG. 19 is a front view of one of the second lenses.
Figure 20:
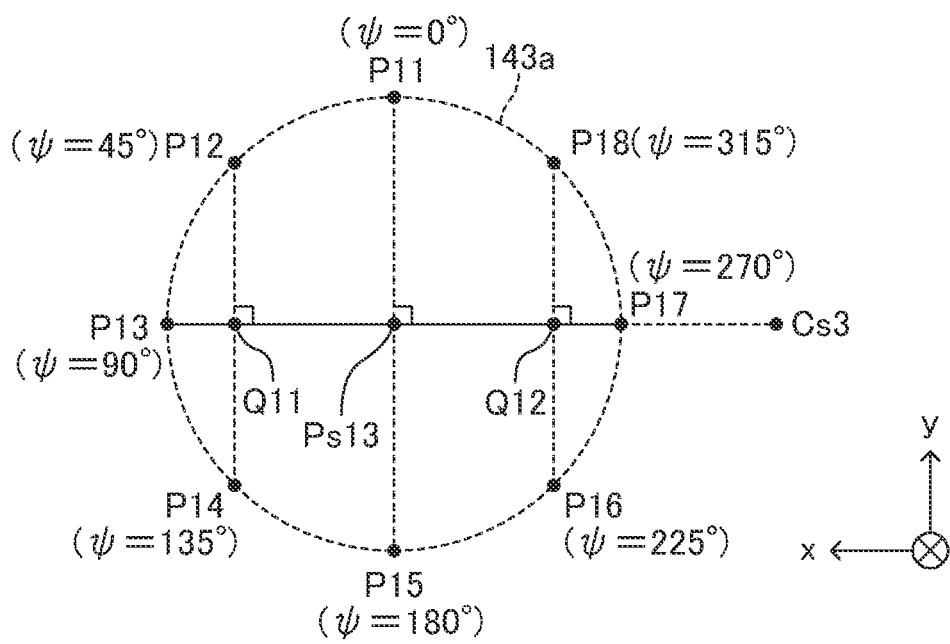
FIG. 20 is a partially enlarged view of a region R2 in FIG. 19 and for illustrating moving directions in the radial direction and the z-axis direction of the second lens, an incident position of a principal ray entering/onto the second lens, and a correspondence relationship with the oblique polishing rotation angles.

FIG. 18A is a graph for defining a relationship between the rotation angle $\Psi$ and the moving amount $\Delta r$ in the device 110, and FIG. 18B is a graph for defining a relationship between the rotation angle $\Psi$ and the moving amount $\Delta z$ in the device 110. Before describing the graphs of FIG. 18A and FIG. 18B, the moving directions of the lenses 141 to 144 are described using the lens 143 as an example. FIG. 19 is a front view of the lens 143. FIG. 20 is a partially enlarged view of a region R2 in FIG. 19. A circle 143a shown in each of FIG. 19 and FIG. 20 is a circle with a radius of 0.16 mm having the incident position Ps13 as a center. The incident position Ps13 in each of these figures is an incident position at which the principal ray B3 enters the lens 43 of the device 410 serving as the comparative example. As mentioned above, the incident position Ps13 and the principal point Cs3 are located on a straight line passing through the axis A1 (not shown in FIG. 19) and extending in the x-axis direction. Therefore, in this example, the x-axis direction corresponds to the radial direction.

As shown in FIG. 20, on the circle 143a, eight points P11 to P18 are arranged at positions corresponding to the points P1 to P8 (see FIG. 11A and FIG. 11B). First, a description is given on a case where the lens 143 is moved on the xy plane. For example, when the lens 143 is moved by 0.16 mm in the radially inward direction, the incident position Ps13 moves to the point P13. At this time, the principal ray B3 of the emission light beam after the movement refracts by 3.8° (on the xz plane) toward the point P17 (i.e., in the radially inward direction) compared to the principal ray B3 before the movement. The moving amount $\Delta r$ in this case is equal to a length of a line segment Ps13P13 (0.16 mm).

Besides, for example, when the lens 143 is moved so that the incident position Ps13 is located at the point P12 or the point P14, the principal ray B3 of the emission light beam after the movement refracts by 3.8° toward the point P16 or the point P18, respectively, compared to the principal ray B3 before the movement. The moving amount $\Delta r$ in this case is equal to a length of a line segment Ps13Q11 (0.12 mm). Note that a point Q11 is a foot of a perpendicular dropped from the point P12 or P14 onto a line segment P13P17.

Next, a description is given on a case where the lens 143 is moved at least in the z-axis direction. When the lens 143 is moved in the −z-axis direction, the incident position Ps13 moves in the radially inward direction (−x-axis direction), and when the lens 143 is moved in the +z-axis direction, the incident position Ps3 moves in the radially outward direction (+x-axis direction).

For example, when the lens 143 is moved by 2.8 mm in the −z-axis direction, the incident position Ps13 moves to the point P17. At this time, the principal ray B3 of the emission light beam after the movement refracts by 3.8° (on the xz plane) toward the point P13 (i.e., in the radially outward direction) compared to the principal ray B3 before the movement. The moving amount $\Delta z$ is 2.8 mm. Besides, for example, when the lens 143 is moved by 2.0 mm in the −z-axis direction, the incident position Ps13 moves to a point Q12. The point Q12 is an intersection of a line segment P18P16 and the line segment P13P17. From this state, when the lens 143 is further moved by 2.0 mm in the +y-axis direction, the incident position Ps13 moves to the point P18. At this time, the principal ray B3 of the emission light beam after the movement refracts by 3.8° toward the point P16 compared to the principal ray B3 before the movement. The moving amount $\Delta z$ is 2.0 mm. That is, in this calculation, when the lens 143 is moved so that the incident position Ps13 is located at the point P13 or the point P17, the lens 143 is only moved in the z-axis direction. On the other hand, when the lens 143 is moved so that the incident position Ps13 is located at "any point on the circle 143a excluding the points P13 and P17," the lens 143 is moved in the z-axis and y-axis directions.

The same concept can be applied to the lenses 141, 142, and 144. The above is the description on the moving directions of the lenses 141 to 144.

According to FIG. 18A, for the lenses 141 and 143, when the rotation angles $\Psi$ of the SMFs 151 and 153 satisfy $0°<\Psi<180°$ for, $\Delta r$ becomes negative, and $\Delta r$ is minimized when $\Psi=90°$. For the lenses 142 and 144, when the rotation angles $\Psi$ of the SMFs 152 and 154 satisfy $180°<\Psi<360°$, $\Delta r$ becomes negative, and $\Delta r$ is minimized when $\Psi=270°$.

Figure 21:
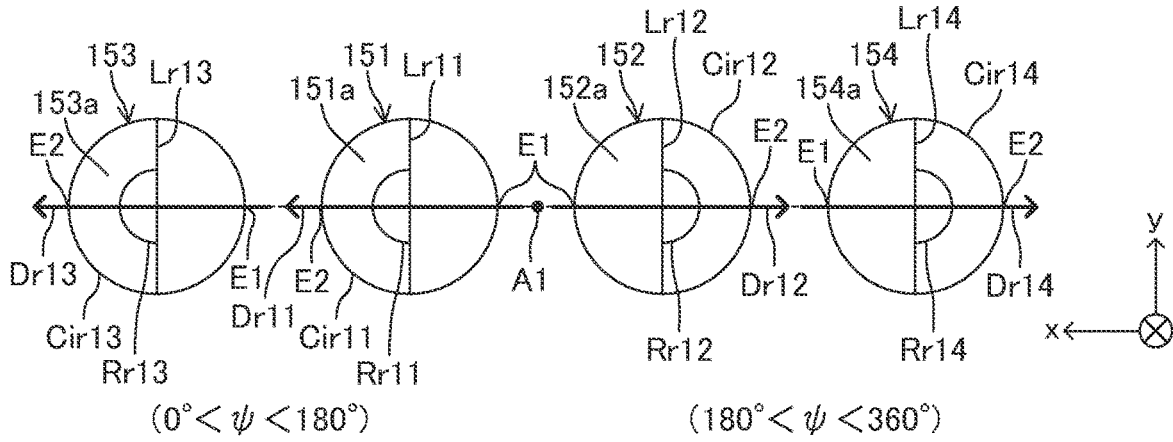
FIG. 21 is a front view of the single-mode optical fibers and is used to describe angle ranges of the oblique polishing rotation angles and the like at the time when a radial direction condition is satisfied.

FIG. 21 is a diagram for illustrating, in a front view of the end faces 151$a$ to 154$a$ of the SMFs 151 to 154, angle ranges Rr11 to Rr14 of the rotation angle $\Psi$ at the time when the radial direction condition is satisfied, and the oblique polishing directions Dr11 to Dr14 at the time when $\Delta r$ is minimized. In FIG. 21, illustration of the cores C is omitted. As shown in FIG. 21, the angle ranges Rr11 to Rr14 are angle ranges corresponding to outer circumferences Cir11 to Cir14. Here, the outer circumferences Cir11 to Cir14 are outer circumferences of the portions on the radially outward side with respect to line segments Lr11 to Lr14, respectively. The line segments Lr11 to Lr14 are line segments passing through the centers of the end faces 151$a$ to 154$a$ and are orthogonal to the radial direction. The radial direction condition is satisfied when the rotation angles $\Psi$ of the SMFs 151 to 154 are included in the angle ranges Rr11 to Rr14, respectively. In other words, the radial direction condition is satisfied when the oblique polishing directions are set such that the proximal ends E2 of the major axes of the end faces 151$a$ to 154$a$ are located on the outer circumferences Cir11 to Cir14.

Furthermore, the oblique polishing directions Dr11 to Dr14 point to the radially outward direction, respectively, and are point-symmetric with respect to the axis A1. In other words, the orientations of the oblique polishing directions Dr11 to Dr14 are set such that the proximal ends E2 of the major axes of the end faces 151$a$ to 154$a$ are located at middle points of the respective outer circumferences Cir11 to Cir14.

In other words, the line segments Lr11 to Lr14 are "line segments passing through the centers of the end faces 151$a$ to 154$a$ and are orthogonal to line segments connecting the axis A1 and the centers", respectively. Besides, the outer circumferences Cir11 to Cir14 are "out of the outer circumferences of the end faces 151$a$ to 154$a$, outer circumferences of the portions on a side opposite to a side at which the axis A1 is located with respect to the line segments Lr11 to Lr14", respectively. The line segments Lr11 to Lr14 and the outer circumferences Cir11 to Cir14 correspond to examples of the "first orthogonal lines" and the "first outer circumferences," respectively.

On the other hand, according to FIG. 18B, for the lenses 141 and 143, when the rotation angles $\Psi$ of the SMFs 151 and 153 satisfy $180°<\Psi<360°$, $\Delta z$ becomes negative, and $\Delta z$ is minimized when $\Psi=270°$. Furthermore, within the above-mentioned angle range, $\Delta z$ of the lens 141 is smaller than $\Delta z$ of the lens 143 (the moving amount in the $-z$-axis direction is larger). This is because an incident angle of an incident light beam on the lens 141 is smaller than an incident angle of an incident light beam on the lens 143 (see FIG. 16), and thus in order to move the incident position Ps11 (an incident position of the incident light beam on the lens 141) by the same distance as the incident position Ps13 (an incident position of the incident light beam on the lens 143), it is necessary to move the lens 141 further in the $-z$-axis direction than the lens 143. In contrast, for the lenses 142 and 144, when the rotation angles $\Psi$ of the SMFs 152 and 154 satisfy $0°<\Psi<180°$, $\Delta z$ becomes negative, and $\Delta z$ is minimized when $\Psi=90°$. Furthermore, within the above-mentioned angle range, $\Delta z$ of the lens 142 is smaller than $\Delta z$ of the lens 144. This is due to the same reason as mentioned above.

Figure 22:
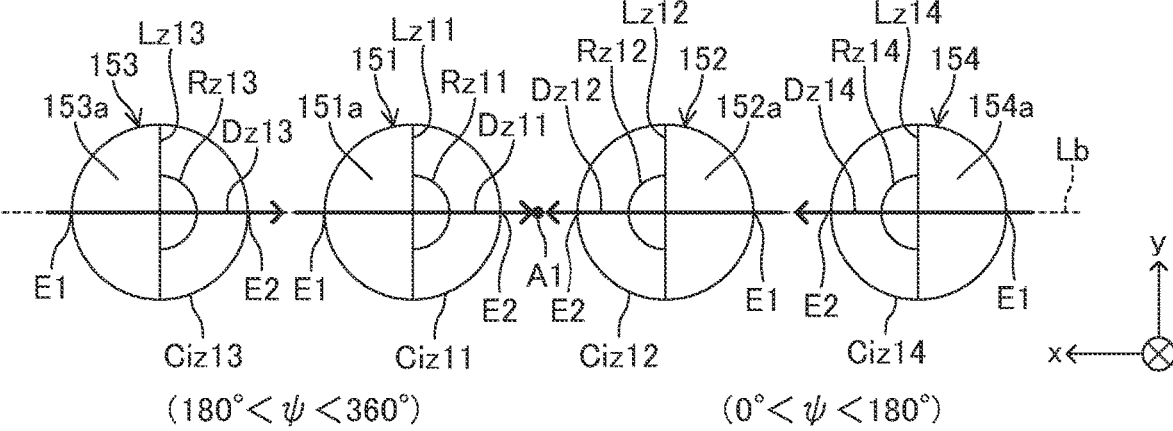
FIG. 22 is a front view of the single-mode optical fibers and is used to describe angle ranges of the oblique polishing rotation angles and the like at the time when a z-axis direction condition is satisfied.

FIG. 22 is a diagram for illustrating, in a front view of the end faces 151$a$ to 154$a$ of the SMFs 151 to 154, the angle ranges Rz11 to Rz14 of the rotation angle $\Psi$ at the time when the z-axis direction condition is satisfied, and the oblique polishing directions Dz11 to Dz14 at the time when $\Delta z$ is minimized (maximized in the $-z$-axis direction). In FIG. 22, illustration of the cores C is omitted. As shown in FIG. 22, the angle ranges Rz11 to Rz14 are angle ranges corresponding to outer circumferences Ciz11 to Ciz14, respectively. Here, the outer circumferences Ciz11 to Ciz14 are outer circumferences of the portions on the radially inward side (a side at which the axis A1 is located) with respect to line segments Lz11 to Lz14, respectively. The z-axis direction condition is satisfied when the rotation angles $\Psi$ of the SMFs 151 to 154 are included in the respective angle ranges Rz11 to Rz14. In other words, the z-axis direction condition is satisfied when the oblique polishing directions are set such that the proximal ends E2 of the major axes of the end faces 151$a$ to 154$a$ are located on the outer circumferences Ciz11 to Ciz14. Note that the line segments Lz11 to Lz14 can also be described as line segments that pass through the centers of the end faces 151$a$ to 154$a$ and are orthogonal to the reference line Lb, respectively.

Furthermore, the oblique polishing directions Dz11 and Dz13 point to the $-x$-axis direction (i.e., a direction heading to the axis A1 along the reference line Lb), while the oblique polishing directions Dz12 and Dz14 point to the $+x$-axis direction (i.e., a direction heading to the axis A1 along the reference line Lb). In other words, the oblique polishing directions Dz11 to Dz14 are point-symmetric with respect to the axis A1. In other words, the orientations of the oblique polishing directions Dz11 to Dz14 are set such that the proximal ends E2 of the major axes of the end faces 151$a$ to 154$a$ are positioned at middle points of the respective outer circumferences Ciz11 to Ciz14.

The line segments Lz11 to Lz14 and the outer circumferences Ciz11 to Ciz14 correspond to examples of "second orthogonal lines" and the "third outer circumferences," respectively. Furthermore, the reference line Lb passes through the centers of the respective SMFs 151 to 154. Therefore, the case where "each of the SMFs 151 to 154 is arranged as illustrated in the device 110" corresponds to an example of a "second case."

Figure 23:
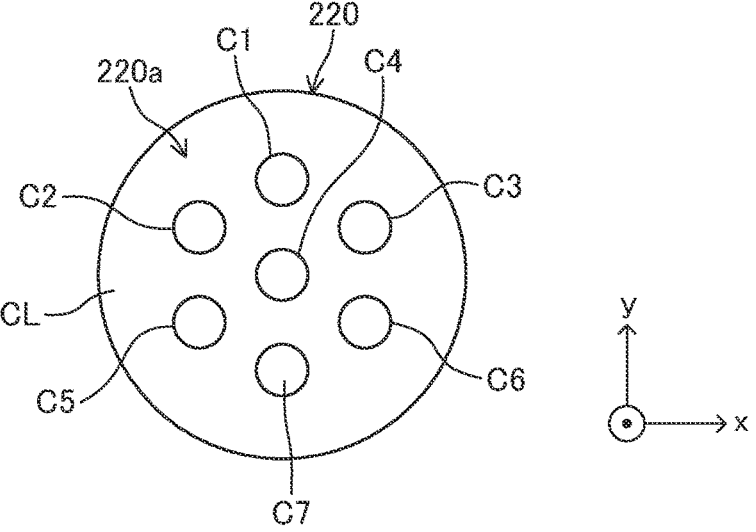
FIG. 23 is a diagram for illustrating an end face of a multi-core optical fiber included in further another example of the FIFO device according to the first embodiment of the present invention.

FIG. 23 is a diagram for illustrating an end face 220$a$ of the MCF 220 used for the investigation. The MCF 220 is an MCF that differs only in the number and arrangement of cores. As shown in FIG. 23, the MCF 220 includes seven cores C1 to C7 and a common cladding CL surrounding these cores C1 to C7. The core C4 extends along the center axis of the MCF 220 (hereinafter also referred to as "center core C4"). The cores C1 to C3 and C5 to C7 are positioned at vertices of a regular hexagon having the center core C4 as a center, and extend along the axial direction (hereinafter may be also referred to as "surrounding cores C1 to C3 and C5 to C7"). The core pitch is 38 μm. The cores C1 to C7 of the MCF 220 correspond to an example of the "first cores."

Figure 24:
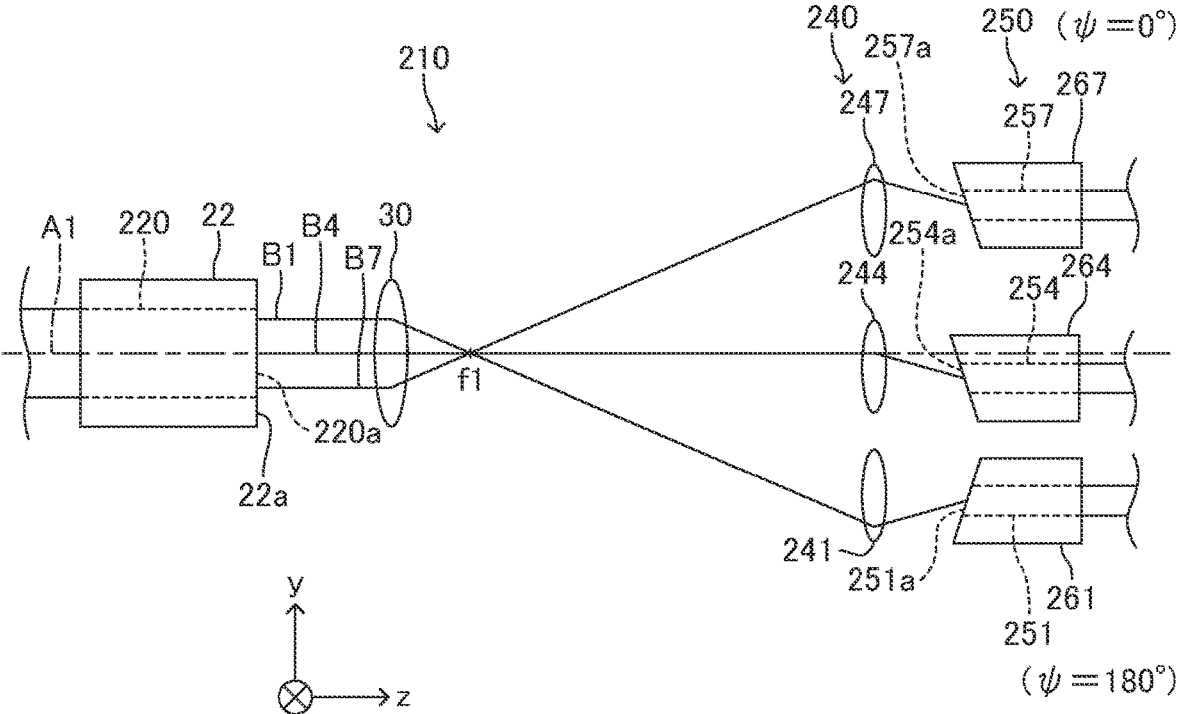
FIG. 24 is a side view for illustrating the FIFO device including the multi-core optical fiber of FIG. 23.
Figure 25:
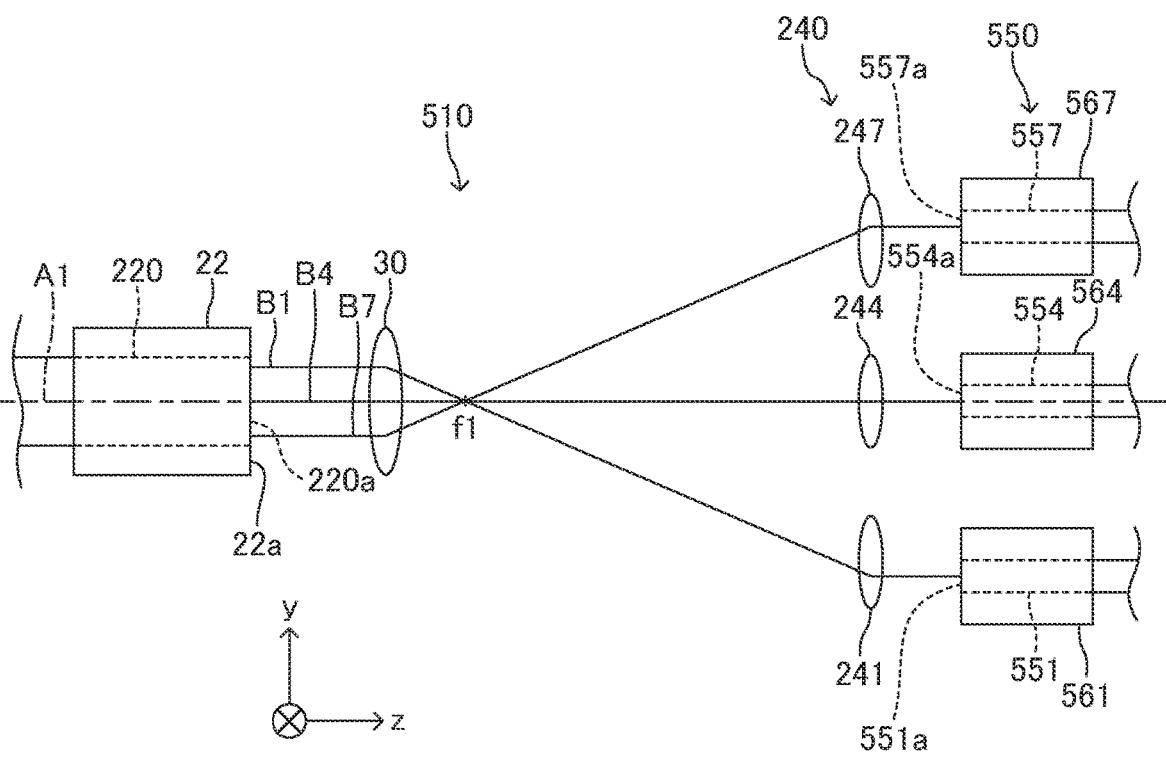
FIG. 25 is a plan view of a comparative device serving as a comparative example of the FIFO device in FIG. 24.

FIG. 24 is a side view of a device 210 using the MCF 220. FIG. 25 is a side view of a device 510 as a comparative example of the device 210. Below, a description on a configuration of the device 510 is given, focusing on differences from the device 310 (refer to FIG. 4 and FIG. 5), followed by a description on a configuration of the device 210.

As shown in FIG. 25, the device 510 includes the MCF 220, the first lens 30, a group of second lenses 240, and a group of the SMFs 550. In FIG. 25, only the principal rays B1, B4, and B7 of the light beams emitted from the cores C1, C4, and C7 of the MCF 220 are illustrated. The group of the second lenses 240 include lenses 241 to 247 (only the lenses 241, 244, and 247 are illustrated in FIG. 25). Although the lenses 241 to 247 are all collimator lenses identical to the lenses 41 to 44, their positions are different.

Specifically, principal points Cs1 to Cs7 (not shown) of the lenses 241 to 247 are located on the same plane perpendicular to the axis A1. The principal point Cs4 is located on the axis A1. The principal points Cs1 to Cs3 and Cs5 to Cs7 are positioned at vertices of a regular hexagon having the axis A1 (principal point Cs4) as a center. More specifically, the lenses 241 to 247 are arranged such that the "principal rays B1 to B7 of the light beams exiting from the first lens 30, which have been emitted from the respective cores C1 to C7 of the MCF 220" pass through focal points (not shown) of the corresponding lenses 241 to 247. Accordingly, the principal rays B1 to B7 incident on the lenses 241 to 247 exit as rays parallel to optical axes of the lenses 241 to 247, respectively. Moreover, incident positions Ps21 to Ps27 (not shown) of the principal rays B1 to B7 on the lenses 241 to 247 have a positional relationship where the incident positions Ps21 to 23 and 25 to 27 are located at vertices of a regular hexagon having the incident position Ps24 as a center. This is due to the core arrangement of the MCF 220 (see FIG. 23). That is, the incident positions Ps21 to 23 and 25 to 27 are symmetric with respect to the axis A1 (incident position Ps24).

The group of the SMFs 550 include SMFs 551 to 557 (only the SMFs 551, 554, and 557 are illustrated in FIG. 25). The SMFs 551 to 557 are all identical to the SMFs 351 to 354. End faces 551*a* to 557*a* of the SMFs 551 to 557 are arranged at positions where the light beams exiting from the corresponding lenses 241 to 247, which have been emitted from the cores C1 to C7 converge on the centers of the cores C, respectively. In other words, the SMFs 551 to 557 are arranged such that the principal rays B1 to B7 enter the centers of the cores C. The end portions of the SMFs 551 to 557 in the −z-axis direction are inserted into and held by ferrules 561 to 567 each having a cylindrical shape, respectively (only ferrules 561, 564, and 567 are illustrated in FIG. 25).

The first lens 30 and the group of the second lenses 240 optically couple the MCF 220 and the group of the SMFs 550, functioning as a coupling portion of the device. The above is the description on the configuration of the device 510 as the comparative example.

Next, the configuration of the device 210 is described. As shown in FIG. 24, the device 210 uses the same members as those used in the device 510, except for a group of SMFs 250.

The group of the SMFs 250 include SMFs 251 to 257 (only the SMFs 251, 254, and 257 are illustrated in FIG. 24). The SMFs 251 to 257 differ from the SMFs 551 to 557 in that their end faces 251*a* to 257*a* are obliquely polished. The SMFs 251 to 257 are all identical to the SMFs 51 to 54. End portions of the SMFs 251 to 257 in the −z-axis direction are inserted into and held by cylindrical ferrules 261 to 267, respectively (only ferrules 261, 264, and 267 are illustrated in FIG. 24). The SMF 254 is an SMF which the light beam which has passed through the first lens 30 and the group of the second lenses 240 after being emitted from the center core C4 of the MCF 220 enters. Therefore, hereinafter, the SMF 254 may be referred to as a "center SMF," and the other SMFs 251 to 253 and 255 to 257 may be referred to as "surrounding SMFs".

In the example of FIG. 24, the rotation angle Ψ of the SMF 257 is 0°, and the rotation angle Ψ of the SMF 251 is 180° (for the SMF 254, described later). Additionally, although not shown in FIG. 24, the rotation angles Ψ of the SMFs 255 and 256 are 0°, and the rotation angles Ψ of the SMFs 252 and 253 are 180°. As shown in FIG. 24 and FIG. 25, the lens 247 (as well as the lenses 245 and 246) of the device 210 are moved in the −y-axis direction (i.e., a direction approaching the axis A1) relative to the lens 247 (as well as the lenses 245 and 246) of the device 510. As a result, the principal rays B5 to B7 exiting from the lenses 245 to 247, respectively, incline in the −y-axis direction on the yz plane compared to these rays before the movement. Besides, the lens 241 (as well as the lenses 242 and 243) of the device 210 are moved in the +y-axis direction (i.e., a direction approaching the axis A1) relative to the lens 241 (as well as the lenses 242 and 243) of the device 510. Consequently, the principal rays B1 to B3 exiting from the lenses 241 to 243, respectively, incline in the +y-axis direction on the yz plane compared to these rays before the movement. Meanwhile, the rotation angle Ψ of the SMF 254 is 0°. The lens 244 of the device 210 is moved in the −y-axis direction relative to the lens 244 of the device 510. Consequently, the principal ray B4 exiting from the lens 244 inclines in the −y-axis direction on the yz plane compared to the ray B4 before the movement.

In this example, the lenses 241 to 247 are moved so that the light beam angles θ12 of the principal rays B1 to B7 of the emission light beams exiting from the lenses 241 to 247 are all 3.8° (i.e., incident positions Ps21 to Ps27 are moved). Therefore, with this configuration, as shown in FIG. 24, the emission light beams exiting from the lenses 241 to 247 (only the principal rays are shown in FIG. 24) appropriately enter the end faces 251*a* to 257*a* of the SMFs 251 to 257, respectively.

Figure 26A:
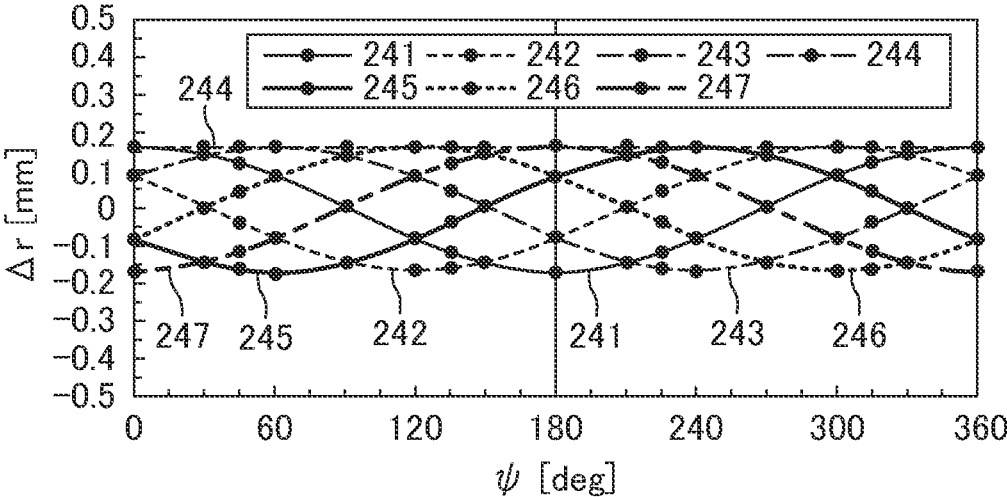
FIG. 26A is a graph for defining a relationship between the oblique polishing rotation angle and an amount of movement in the radial direction in the FIFO device of FIG. 24.
Figure 26B:
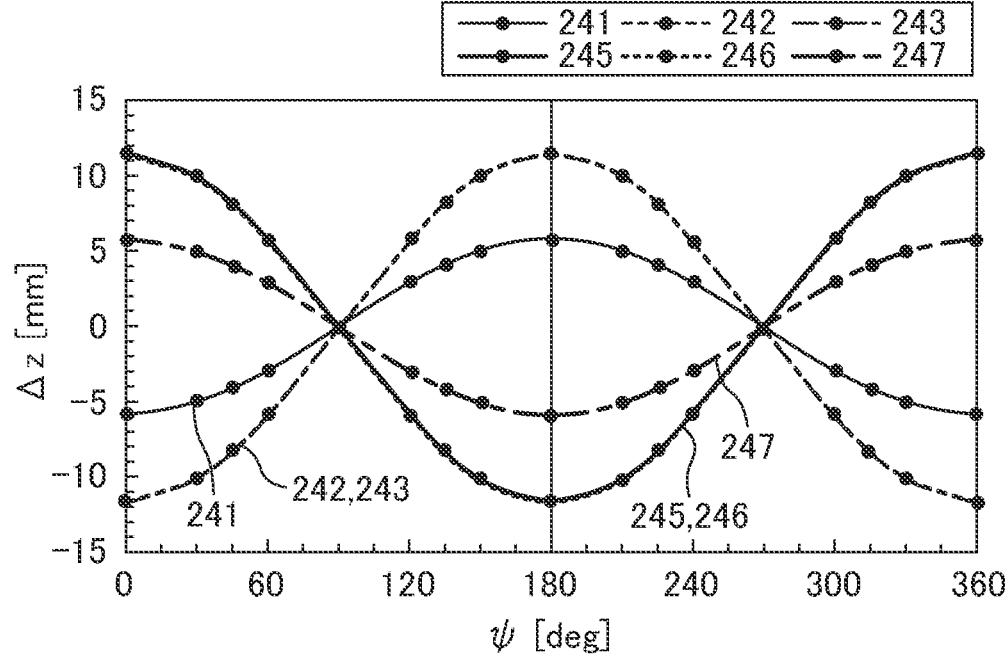
FIG. 26B is a graph for defining a relationship between the oblique polishing rotation angle and an amount of movement in the z-axis direction in the FIFO device of FIG. 24.
Figure 27:
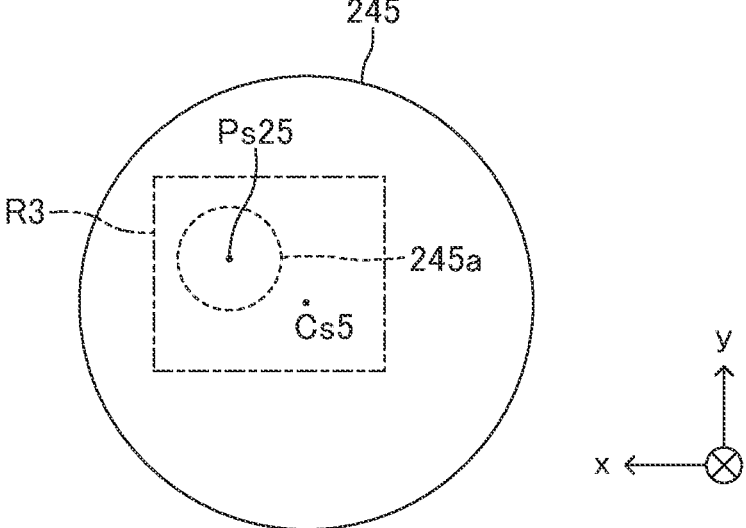
FIG. 27 is a front view of one of the second lenses.
Figure 28A:
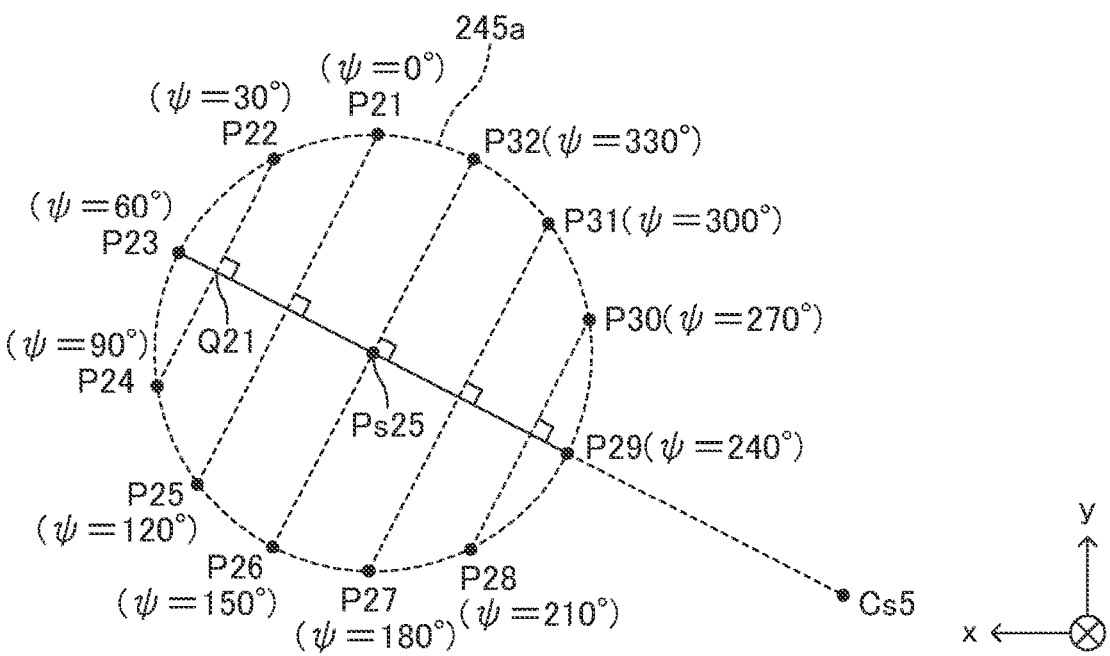
FIG. 28A is a partially enlarged view of a region R3 in FIG. 27 and for illustrating moving directions in the radial direction of the second lens, an incident position of a principal ray entering/onto the second lens, and a correspondence relationship with the oblique polishing rotation angles.
Figure 28B:
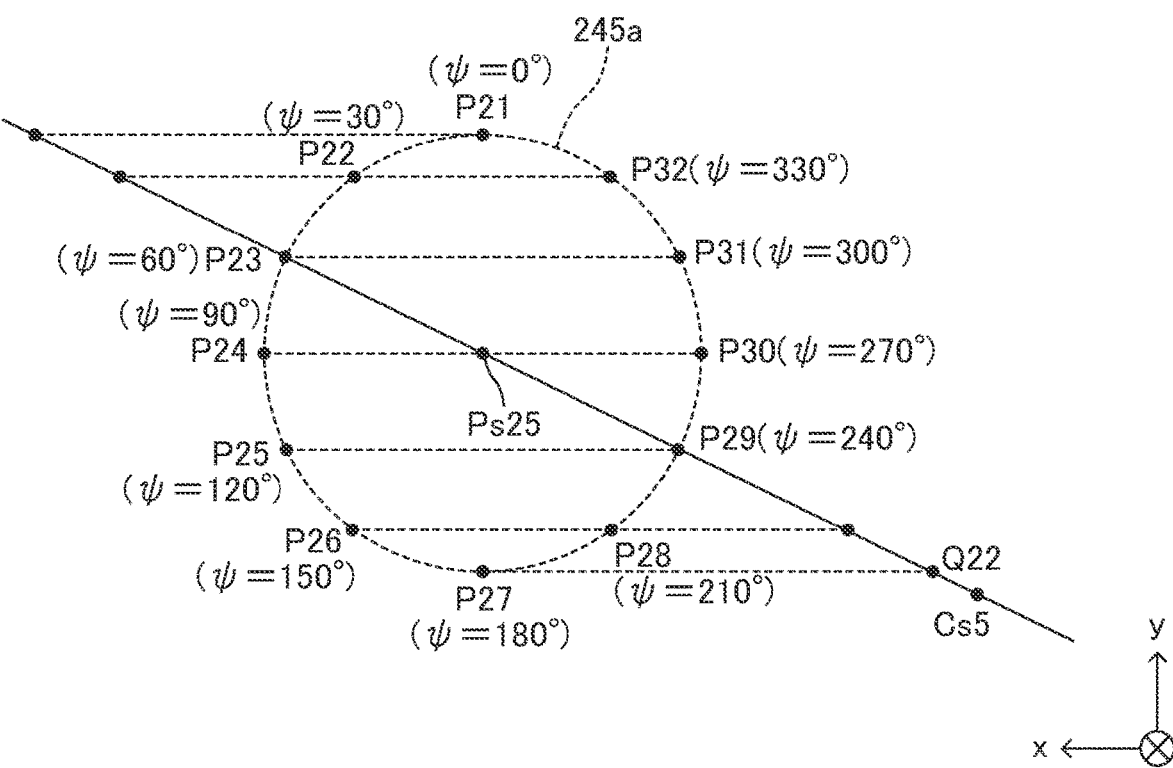
FIG. 28B is a partially enlarged view of the region R3 in FIG. 27 and for illustrating moving directions in the z-axis direction of the second lens, the incident position of the principal ray entering/onto the second lens, and a correspondence relationship with the oblique polishing rotation angles.

FIG. 26A is a graph for defining a relationship between the rotation angle Ψ and the moving amount Δr in the device 210, and FIG. 26B is a graph for defining a relationship between the rotation angle Ψ and the moving amount Δz in the device 210. Before describing the graphs of FIG. 26A and FIG. 26B, the rotation angle Ψ and the moving directions of the lenses 241 to 247 are described using the lens 245 as an example. FIG. 27 is a front view of the lens 245. FIG. 28A and FIG. 28B are partially enlarged views of a region R3 in FIG. 27. A circle 245*a* shown in each of FIG. 27 to FIG. 28B is a circle with a radius of 0.16 mm having the incident position Ps25 as a center. Note that the incident position Ps25 in these figures is an incident position at which the principal ray B5 enters the lens 245 of the device 510 serving as a comparative example. The incident position Ps25 is located on a half-line connecting the axis A1 (not shown) and the principal point Cs5.

As shown in FIG. 28A and FIG. 28B, on the circle 245*a*, 12 points P21 to P32 are arranged counterclockwise in this order at an even interval. The point P21 is located in the +y-axis direction from the incident position Ps25. The points P21 to P32 are fixed points on the lens 245. First, referring to FIG. 27 and FIG. 28A, a case in which the lens 245 is moved on the xy plane is described. For example, when the lens 245 is moved by 0.16 mm in the radially inward direction, the incident position Ps25 moves to the point P23. At this time, the principal ray B5 of the emission light beam after the movement refracts by 3.8° towards the point P29 (i.e., the radially inward direction) compared to the principal ray B5 before the movement. The moving amount $\Delta r$ in this case is equal to a length of a line segment Ps25P23 (0.16 mm).

Moreover, for example, when the lens 245 is moved so that the incident position Ps25 is located at the point P22 or the point P24, the principal ray B5 of the emission light beam after the movement refracts by 3.8° toward the point P28 or the point P30, respectively, compared to the principal ray B5 before the movement. The moving amount $\Delta r$ in this case is equal to a length of a line segment Ps25Q21 (0.14 mm). A point Q21 is a foot of a perpendicular dropped from the point P22 or P24 onto a line segment P23P29.

Next, referring to FIG. 27 and FIG. 28B, a case in which the lens 245 is moved at least in the z-axis direction is described. When the lens 245 is moved in the −z-axis direction, the incident position Ps25 moves in the radially inward direction, and when the lens 245 is moved in the +z-axis direction, the incident position Ps25 moves in the radially outward direction.

For example, when the lens 245 is moved in the −z-axis direction by 6.0 mm, the incident position Ps25 moves to the point P29. At this time, the principal ray B5 of the emission light beam after the movement refracts by 3.8° toward the point P23 (i.e., in the radially outward direction) compared to the principal ray B5 before the movement. The moving amount $\Delta z$ in this case is 6.0 mm. From this state, when the lens 245 is further moved in the +x-axis direction by 0.28 mm, the incident position Ps25 moves to the point P25. At this time, the principal ray B5 of the emission light beam after the movement refracts by 3.8° toward the point P31 compared to the principal ray B5 before the movement. The moving amount $\Delta z$ in this case is also 6.0 mm (because the moving distance in the x-axis direction is ignored).

Moreover, for example, when the lens 245 is moved in the −z-axis direction by 12 mm, the incident position Ps25 moves to a point Q22. The point Q22 is an intersection of the straight line P23P29 and a tangent to the circle 245a at the point P27. From this state, when the lens 245 is further moved in the +x-axis direction by 0.28 mm, the incident position Ps3 moves to the point P27. At this time, the principal ray B5 of the emission light beam after the movement refracts by 3.8° towards the point P21 compared to the principal ray B5 before the movement. The moving amount $\Delta z$ in this case is 12 mm. That is, in this calculation, when moving the lens 245 so that the incident position Ps25 is located at the point 23 or the point 29, the lens 245 is moved only in the z-axis direction. On the other hand, when moving the lens 245 so that the incident position Ps25 is located at "any point on the circle 245a except the points P23 and P29," the lens 245 is moved in the z-axis and x-axis directions.

The oblique polishing direction of the SMF255 can be set in accordance with the refraction direction of the principal ray B5 of the emission light beam exiting from the lens 245 after the movement. Specifically, when moving the lens 245 so that the incident position Ps25 is located at a point Pj (j: integer from 21 to 32) (see FIG. 28A and FIG. 28B), the rotation angle $\Psi$ of the SMF255 can be set to 30×(j−21°).

The same concept can be applied to the lenses 241 to 243 as well as the lenses 246 and 247. In contrast, the concept for the lens 244 is slightly different. Namely, when moving the lens 244 on the xy plane, the same concept can be basically applied. However, as shown in FIG. 25, the incident position Ps24 (not shown) of the principal ray B4 on the lens 244 before the movement coincides with the principal point Cs4 in a front view of the lens 244, making it impossible to define a radial direction. Therefore, in this calculation, a "moving distance (i.e., a radius of a circle mentioned later) of the lens 244 at the time when the lens 244 is moved so that the incident position Ps24 is positioned at any point on a circle with a radius of 0.16 mm having the incident position Ps24 as a center" is calculated as $\Delta r$ for convenience. In other words, for the lens 244, $\Delta r$ remains constant regardless of the rotation angle $\Psi$. On the other hand, when moving the lens 244 in the z-axis direction, as shown in FIG. 24, the principal ray B4 of the incident light beam on the lens 244 is parallel to the optical axis A1. Therefore, even when the lens 244 is moved in the z-axis direction, the incident position Ps24 onto the lens 244 remains unchanged (does not move). That is, it is not possible to uniquely determine $\Delta z$. Therefore, in this calculation, calculation of $\Delta z$ for the lens 244 is not performed. The above is the description on the relationship between the oblique polishing rotation angle $\Psi$ and the moving directions of the lenses 241 to 247.

According to FIG. 26A, for the lens 241, $\Delta r$ becomes negative when the rotation angle $\Psi$ of the SMF 251 satisfy 90°<$\Psi$<270°, and $\Delta r$ is minimized when $\Psi$=180°. For the lens 242, $\Delta r$ becomes negative when the rotation angle $\Psi$ of the SMF 252 satisfy 30°<$\Psi$<210°, and $\Delta r$ is minimized when $\Psi$=120°. For the lens 243, $\Delta r$ becomes negative when the rotation angle $\Psi$ of the SMF 253 satisfy 150°<$\Psi$<330°, and $\Delta r$ is minimized when $\Psi$=240°. For the lens 244, $\Delta r$ has a positive constant value regardless of the rotation angle $\Psi$. For the lens 245, $\Delta r$ becomes negative when the rotation angle $\Psi$ of the SMF 255 satisfy 330°<$\Psi$<150° (i.e., 330°<$\Psi$<360°, 0°$\Psi$<150°), and $\Delta r$ is minimized when $\Psi$=60°. For the lens 246, $\Delta r$ becomes negative when the rotation angle $\Psi$ of the SMF 256 satisfy 210°<$\Psi$<30° (i.e., 210°<$\Psi$<360°, 0°$\Psi$<30°), and $\Delta r$ is minimized when $\Psi$=300°. For the lens 247, $\Delta r$ becomes negative when the rotation angle $\Psi$ of the SMF 257 satisfy 270°<$\Psi$<90°, and $\Delta r$ is minimized when $\Psi$=360°.

Figure 29:
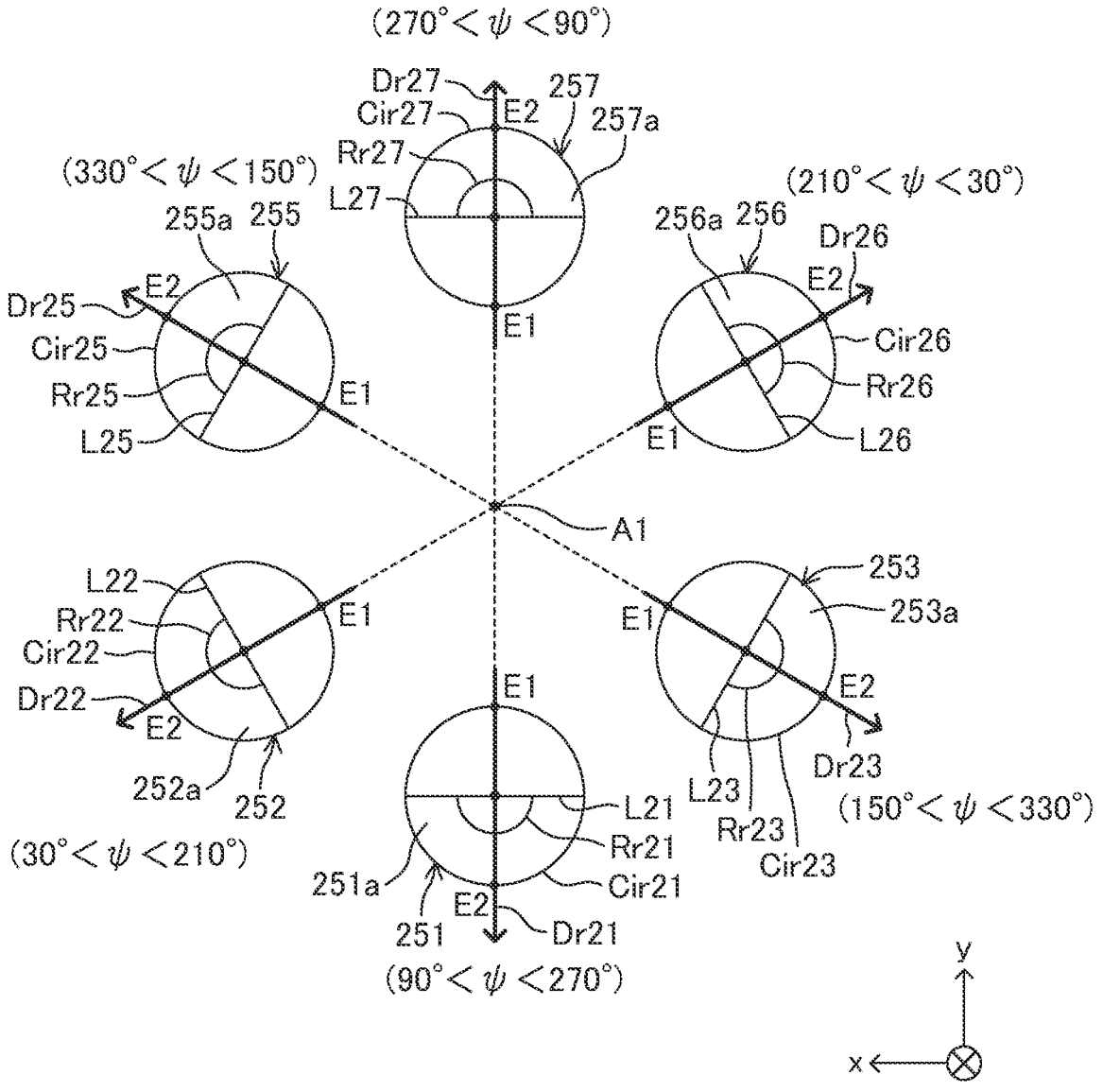
FIG. 29 is a front view of the single-mode optical fibers and is used to describe angle ranges of the oblique polishing rotation angles and the like at the time when a radial direction condition is satisfied.

FIG. 29 is a diagram for illustrating, in a front view of the end faces 251a to 253a and 255a to 257a of the respective SMFs 251 to 253 and 255 to 257 (surrounding SMFs), angle ranges Rr21 to Rr23 and Rr25 to Rr27 of the rotation angle $\Psi$ at the time when the radial direction condition is satisfied, and the oblique polishing directions Dr21 to Dr23 and Dr25 to Dr27 at the time when $\Delta r$ is minimized. Illustration of the cores C of the surrounding SMFs is omitted in FIG. 29. Note that illustration of the SMF 254 (center SMF) is omitted in FIG. 29 since the radial direction condition is not satisfied for the lens 244. As shown in FIG. 29, the angle ranges Rr21 to Rr23 and Rr25 to Rr27 are angle ranges corresponding to outer circumferences Cir21 to Cir23 and Cir25 to Cir27, respectively. Here, these outer circumferences are outer circumferences of the portions on the radially outward side with respect to line segments L21 to L23 and L25 to L27, respectively. These line segments are line segments that pass through the centers of the end faces 251a to 253a and 255a to 257a and are perpendicular to the radial direction, respectively. The radial direction condition is satisfied when the rotation angles $\Psi$ of the surrounding SMFs are included in the angle ranges Rr21 to Rr23 and Rr25 to Rr27, respectively. In other words, the radial direction condition is satisfied when the oblique polishing directions are set such that the proximal ends E2 of the major axes of the end faces 251a to 253a and 255a to 257a are positioned on the respective outer circumferences Cir21 to Cir23 and Cir25 to Cir27.

Furthermore, the oblique polishing directions Dr21 to Dr23 and Dr25 to Dr27 point to the radially outward direction, respectively, and are point-symmetric with respect to the axis A1. In other words, the oblique polishing directions are set such that the proximal ends E2 of the major axes of the end faces 251*a* to 253*a* and 255*a* to 257*a* are positioned at middle points of the respective outer circumferences Cir21 to Cir23 and Cir25 to Cir27.

In other words, the line segments L21 to L23 and L25 to L27 are "line segments passing through the centers of the end faces 251*a* to 253*a* and 255*a* to 257*a*, and are orthogonal to line segments connecting the axis A1 and the centers", respectively. Furthermore, the outer circumferences Cir21 to Cir23 and Cir25 to Cir27 are "out of the outer circumferences of the end faces 251*a* to 253*a* and 255*a* to 257*a*, outer circumferences of the portions on a side opposite to a side at which the axis A1 is positioned with respect to the line segments L21 to L23 and L25 to L27", respectively. The aforementioned line segments and outer circumferences of the surrounding SMFs correspond to examples of the "first orthogonal lines" and the "first outer circumferences," respectively.

On the other hand, according to FIG. 26B, for the lenses 241 to 243, when the rotation angles Ψ of the SMFs 251 to 253 satisfy 270°<Ψ<90°, Δz becomes negative, and Δz is minimized when Ψ=0°(360°). Furthermore, within the aforementioned angle range, Δz for the lenses 242 and 243 is smaller than Δz for the lens 241 (the moving amount in the −z-axis direction is larger). This is because incident angles of incident light beams on the lenses 242 and 243 are smaller than an incident angle of an incident light beam on the lens 241, and thus in order to move the incident positions Ps22 and Ps23 (incident positions of the incident light beams on the lenses 242 and 243) by the same distance as the incident position Ps21 (an incident position of the incident light beam on the lens 241), it is necessary to move the lenses 242 and 243 further in the −z-axis direction than the lens 241. In contrast, for the lenses 245 to 247, when the rotation angles Ψ of the SMFs 255 to 257 satisfy 90°<Ψ<270°, Δz becomes negative, and when Ψ=180°, Δz is minimized. Furthermore, within the aforementioned angle range, Δz for the lenses 245 and 246 is smaller than Δz for the lens 247. This is due to the same reason as mentioned above.

Figure 30:
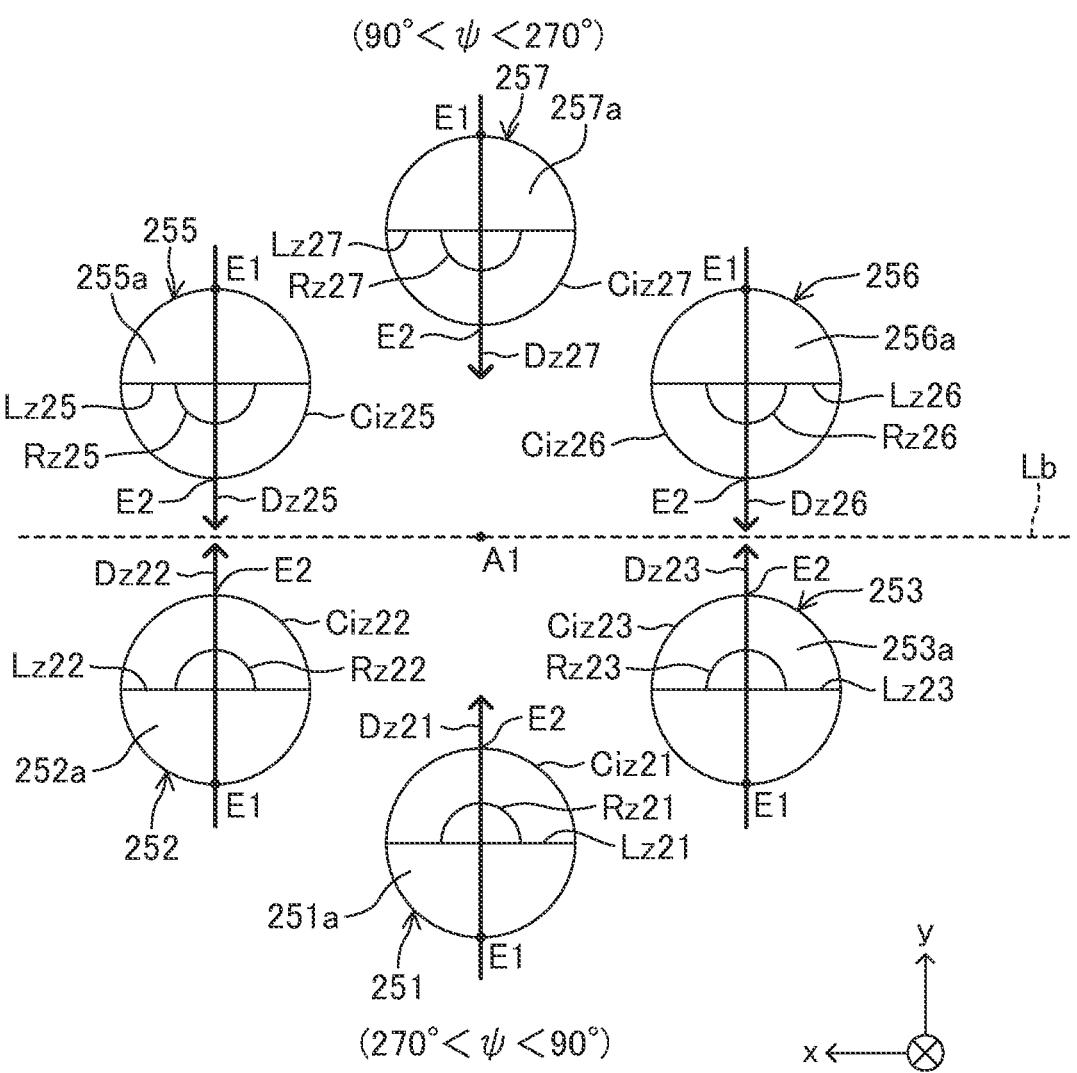
FIG. 30 is a front view of the single-mode optical fibers and is used to describe angle ranges of the oblique polishing rotation angles and the like at the time when a z-axis direction condition is satisfied.

FIG. 30 is a diagram for illustrating, in a front view of the end faces 251*a* to 253*a* and 255*a* to 257*a* of the surrounding SMFs, angle ranges Rz21 to Rz23 and Rz25 to Rz27 of the rotation angle Ψ at the time when the z-axis direction condition is satisfied, and the oblique polishing directions Dz21 to Dz23 and Dz25 to Dz27 at the time when Δz is minimized (maximized in the −z-axis direction). Illustration of the cores C of the surrounding SMFs is omitted in FIG. 30. Note that illustration of the SMF 254 (center SMF) is omitted in FIG. 30 since Δz is not calculated for the lens 244. As shown in FIG. 30, the angle ranges Rz21 to Rz23 and Rz25 to Rz27 are angle ranges corresponding to outer circumferences Ciz21 to Ciz23 and Ciz25 to Ciz27, respectively. Here, these outer circumferences are outer circumferences of the portions on a side at which the axis A1 is positioned with respect to line segments Lz21 to Lz23 and Lz25 to Lz27, respectively. These line segments are line segments that pass through the centers of the end faces 251*a* to 253*a* and 255*a* to 257*a* and are parallel to the reference line Lb, respectively. The z-axis direction condition is satisfied when the rotation angles Ψ of the surrounding SMFs are included in the angle ranges Rz21 to Rz23 and Rz25 to Rz27, respectively. In other words, the z-axis direction condition is satisfied when the oblique polishing directions are set such that the proximal ends E2 of the major axes of the end faces 251*a* to 253*a* and 255*a* to 257*a* are positioned on the respective outer circumferences Ciz21 to Ciz23 and Ciz25 to Ciz27.

Furthermore, the oblique polishing directions Dz21 to Dz23 point to the +y-axis direction (i.e., a direction extending perpendicularly toward the reference line Lb), respectively, while the oblique polishing directions Dz25 to Dz27 point to the −y-axis direction (i.e., a direction extending perpendicularly toward the reference line Lb), respectively. That is, the oblique polishing directions Dz21 to Dz23 and Dz25 to Dz27 are point-symmetric with respect to the axis A1. In other words, the orientations of the oblique polishing directions Dz21 to Dz23 and Dz25 to Dz27 are set such that the proximal ends E2 of the major axes of the end faces 251*a* to 253*a* and 255*a* to 257*a* are positioned at middle points of the respective outer circumferences Ciz21 to Ciz23 and Ciz25 to Ciz27.

Note that the above-mentioned line segments and outer circumferences of the surrounding SMFs correspond, respectively, to examples of the "parallel lines" and the "second outer circumferences." Furthermore, the reference line Lb does not pass through the center of each surrounding SMF. Therefore, the case where "each surrounding SMF is arranged as exemplified in the device 210" corresponds to an example of the "first case."

According to the above calculation results, in an FIFO device including an MCF with any number of cores and core arrangements and the same number of the SMFs as the second lenses, in a front view of each surrounding SMF, by setting the oblique polishing direction such that "the oblique polishing rotation angle Ψ falls within the angle range corresponding to the outer circumference of the portion on the radially outward side with respect to the first orthogonal line, which is a line segment passing through the center of the end face of each surrounding SMF and is orthogonal to the radial direction (direction along the half-line connecting the axis A1 and the principal point of each second lens)", a coupling portion of the FIFO device can be downsized in the radial direction. Furthermore, by setting the oblique polishing direction so as to point to the radially outward direction, the coupling portion can be minimized in the radial direction.

On the other hand, in the case where the second lens is moved at least in the z-axis direction according to the method described in this embodiment, when the reference line Lb does not pass through the center of each surrounding SMF (see FIG. 14 and FIG. 30) in a front view of each surrounding SMF, by setting the oblique polishing direction such that "the oblique polishing rotation angle Ψ falls within the angle range corresponding to the outer circumference of the portion on the side at which the axis A1 is positioned with respect to the parallel line, which is a line segment passing through the center of the end face of each surrounding SMF and is parallel to the reference line Lb", the coupling portion of the FIFO device can be downsized in the z-axis direction. Furthermore, by setting the oblique polishing direction so as to extend perpendicularly toward the reference line Lb, the coupling portion can be minimized in the z-axis direction.

Alternatively, in the case where the second lens is moved at least in the z-axis direction according to the method described in this embodiment, when the reference line Lb passes through the center of each surrounding SMF in a front view of each surrounding SMF (see FIG. 22), by setting the oblique polishing direction such that "the oblique polishing rotation angle Ψ falls within the angle range corresponding to the outer circumference of the portion on the side at which the axis A1 is positioned with respect to the second orthogonal line, which is a line segment passing through the center of the end face of each surrounding SMF and is orthogonal to the reference line Lb", the coupling portion of the FIFO device can be downsized in the z-axis direction. Furthermore, by setting the oblique polishing direction so as to point toward the axis A1 along the reference line Lb, the coupling portion can be minimized in the z-axis direction.

As described above, with the FIFO device according to the first embodiment, it is possible to downsize the FIFO device while reducing reflected return light by setting the oblique polishing directions of the respective surrounding SMF so that the emission light beams exiting from the respective second lenses at the time when the respective second lenses are moved in the "direction approaching the axis A1" or the "direction approaching the first lens 30" appropriately enter the corresponding surrounding SMFs.

MODIFICATION EXAMPLE

Figure 31A:
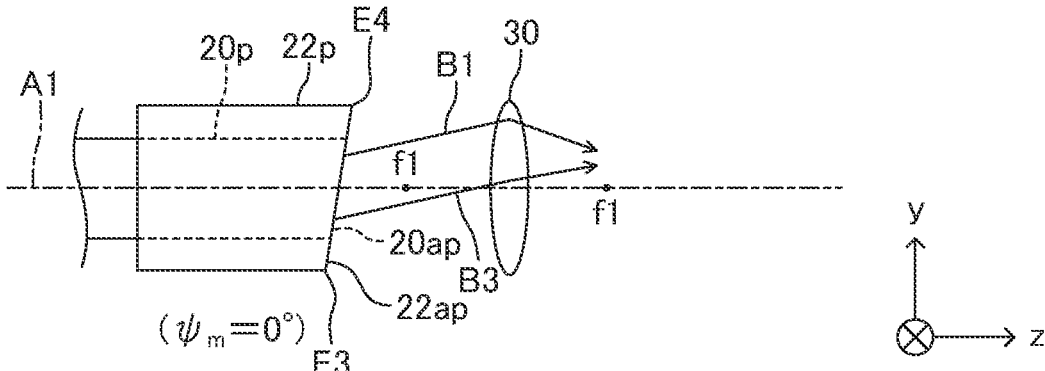
FIG. 31A is a side view for illustrating a multi-core optical fiber and a first lens of an FIFO device according to a modification example of the present invention.
Figure 31B:
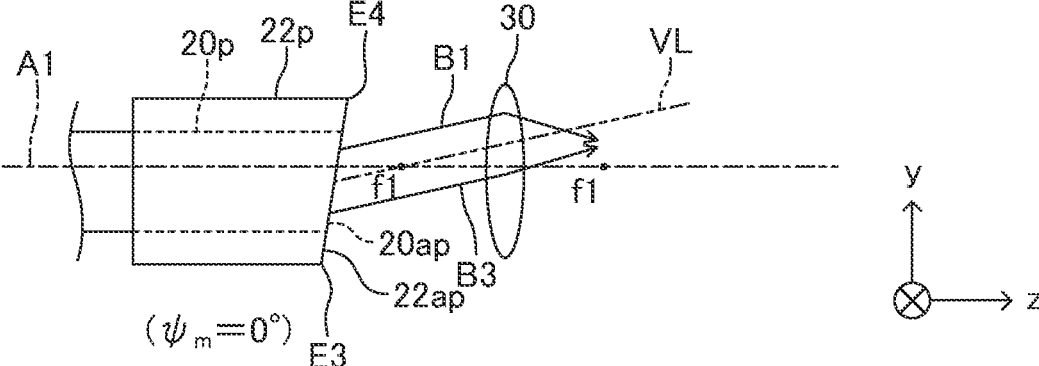
FIG. 31B is a side view for illustrating a state in which the multi-core optical fiber of the FIFO device in FIG. 31A has been moved in a −y-axis direction.

Next, an FIFO device according to a modification example is described with reference to FIG. 31A and FIG. 31B. FIG. 31A and FIG. 31B illustrate only an MCF 20$p$ and the first lens 30 of the FIFO device. As shown in FIG. 31A, the MCF 20$p$ is obliquely polished such that an end face 20$ap$ inclines in a predetermined inclination direction (described later) with respect to a plane (xy plane) orthogonal to the center axis thereof by a predetermined polishing angle (in this example, 8°). More specifically, the end face 20$a$ f the MCF 20$p$ is collectively obliquely polished together with an end face 22$ap$ of a ferrule 22$p$. By obliquely polishing the MCF 20$p$, the reflected return light caused by the reflected light at the end face 20$ap$ of the MCF 20$p$ is reduced. The number of cores and a core arrangement of the MCF 20$p$ are the same as those of the MCF 20. The aforementioned inclination direction and polishing angle correspond, respectively, to examples of a "second inclination direction" and a "second polishing angle."

In this embodiment, the MCF 20$p$ is columnar/cylindrical. Therefore, the end face 20$ap$ of the obliquely polished MCF 20$p$ has, when viewed from a direction perpendicular to the end face 20$ap$, an elliptical shape. Accordingly, an oblique polishing reference axis is a major axis of the end face 20$ap$, and a direction obtained when a direction directed from one end (distal end E3) which is more separated away from the corresponding first lens 30 toward an other end (proximal end E4) which is more proximal to the corresponding first lens 30 is viewed along a center axis of the end face 20$ap$ is an "oblique polishing direction of the MCF 20$p$." Hereinafter, an angle which any oblique polishing direction forms counterclockwise with the "reference direction Dm0 which passes through a center of the end face 20$ap$ and points to the +y-axis direction" when the end face 20$ap$ is viewed from its front is defined as an "oblique polishing rotation angle $\Psi$ m with a positive value." In this example, Wm of the MCF 20$p$ is 0°.

When the MCF 20$p$ is obliquely polished, the principal rays of the light beams from the respective cores C1 to C4 (not shown) each emitted from the end face 20$ap$ (only the principal rays B1 and B3 are illustrated in this modification) incline in a predetermined direction with respect to the axis by a predetermined angle. Here, as shown in FIG. 31A, when the MCF 20$p$ is arranged such that its center axis coincides with the axis A1, there arises a variation in light beam angles θ1 of the principal rays B1 to B4 of the light beams exiting from the first lens 30, which may cause the emission light beams exiting from the first lens 30 to not properly enter the group of the second lenses (not shown). In other words, there is a possibility that the FIFO device may not function properly.

In view of the above, in this modification, as shown in FIG. 31B, the MCF 20$p$ is moved in the −y-axis direction by a predetermined distance. Specifically, the MCF 20$p$ is moved such that a virtual line VL extending from the center of the end face 20$ap$ of the MCF 20$p$ which is parallel to the principal rays B1 and B3 passes through the focal point f1 of the first lens 30. As a result, the light beam angles θ1 of the principal rays B1 to B4 of the light beams exiting from the first lens 30, which have been emitted from the respective cores C1 to C4 become equal to each other. With this configuration, it is possible to downsize the coupling portion of the FIFO device while reducing the reflected return light. Note that this configuration may also be applied to MCFs other than the MCF 20$p$ (for example, an MCF obtained by obliquely polishing the end face of the MCF 120 or the MCF 220).

Second Embodiment

Next, referring to FIG. 32A to FIG. 33B, an FIFO device according to a second embodiment is described. In the second embodiment, a method of "moving the second lens at least in the z-axis direction" differs from the first embodiment. In this embodiment, the lens 43 of the FIFO device 10 and the lens 245 of the FIFO device 210 are exemplified for description.

Figure 32A:
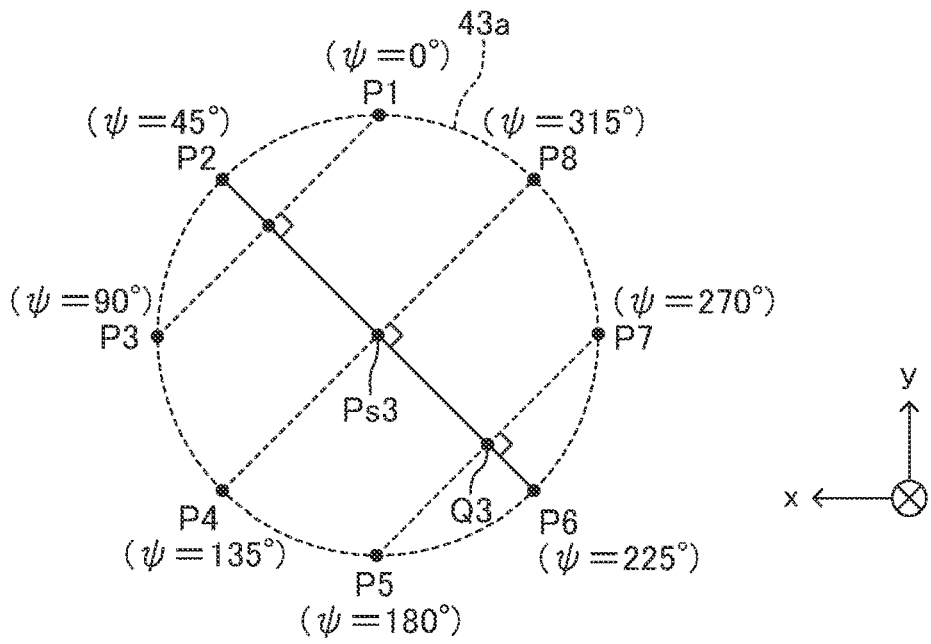
FIG. 32A is a partially enlarged view of the region R1 in FIG. 10 of an FIFO device according to a second embodiment of the present invention.

FIG. 32A is a partially enlarged view of the region R1 in FIG. 10 (a diagram for illustrating the lens 43 of the device 10). In the first embodiment, the lens 43 is moved in the z-axis direction and the x-axis direction to move the incident position Ps3. In this embodiment, however, the lens 43 is moved in the z-axis direction and in a "direction orthogonal to the radial direction" to move the incident position Ps3. Hereinafter, a direction of moving the lens 43 itself toward the point P8 from the incident position Ps3 is defined as the positive orthogonal direction, and a direction of moving the lens 43 toward the point P4 from the incident position Ps3 is defined as the negative orthogonal direction.

For example, when the lens 43 is moved in the −z-axis direction by 4.3 mm, the incident position Ps3 moves to a point Q3. The point Q3 is a foot of a perpendicular dropped from the point P5 or P7 onto the line segment P2P6. Then, when the lens 43 is moved in the negative orthogonal direction by 0.12 mm, the incident position Ps3 moves to the point P5. In this case, a moving distance in the orthogonal direction is extremely small compared to the moving distance in the z-axis direction, and thus in this calculation, the moving distance of the lens 43 in the orthogonal direction is ignored (in other words, downsizing of the coupling portion of the device 10 in the z-axis direction is prioritized). That is, $\Delta z$=4.3 mm. The same concept can be applied to the lenses 41, 42, and 44 as well.

Figure 32B:
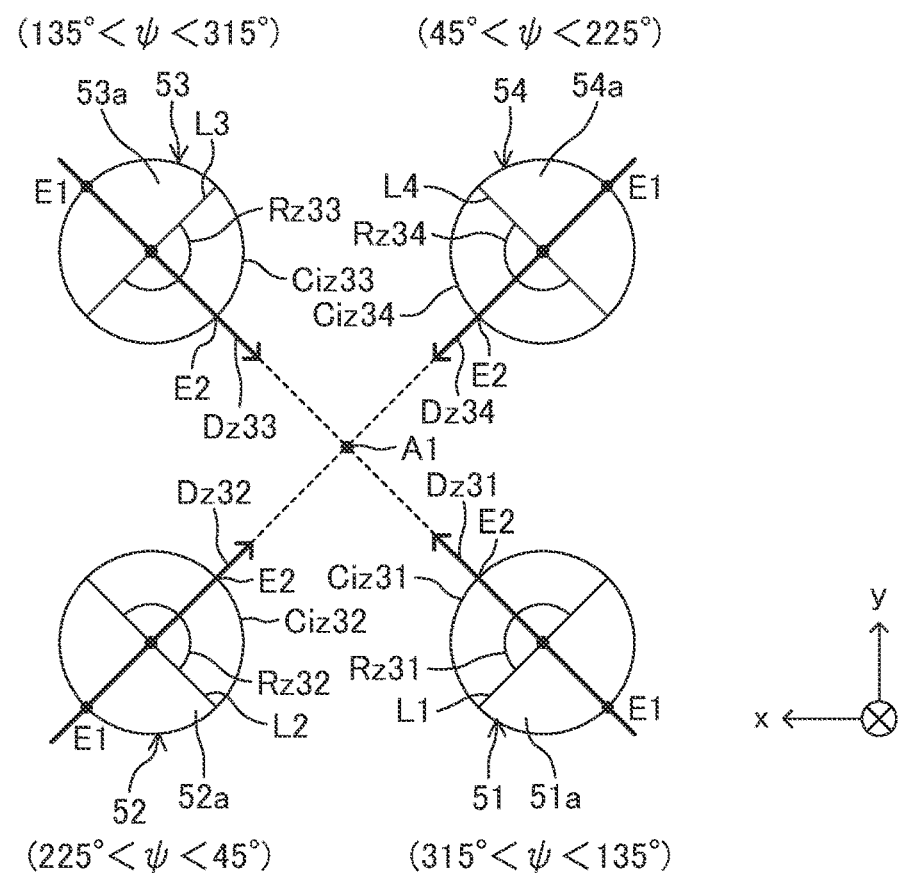
FIG. 32B is a front view of the single-mode optical fibers and is used to describe angle ranges of the oblique polishing rotation angles and the like at the time when a z-axis direction condition is satisfied.

FIG. 32B is a diagram for illustrating, in a front view of the end faces 51$a$ to 54$a$ of the respective SMFs 51 to 54, angle ranges Rz31 to Rz34 of the rotation angle $\Psi$ at the time when the z-axis direction condition is satisfied, and the oblique polishing directions Dz31 to Dz34 at the time when $\Delta z$ is minimized (maximized in the −z-axis direction). In FIG. 32B, illustration of the cores C is omitted (the same applies to FIG. 33B). As shown in FIG. 32B, the angle ranges Rz31 to Rz34 are angle ranges corresponding to outer circumferences Ciz31 to Ciz34. Here, the outer circumferences Ciz31 to Ciz34 are outer circumferences of the portions on the radially inward side (a side at which the axis A1 is located) with respect to the line segments L1 to L4 (refer to FIG. 13), respectively. The z-axis direction condition is satisfied when the rotation angles $\Psi$ of the SMFs 51 to 54 are included in the respective angle ranges Rz31 to Rz34. In other words, the z-axis direction condition is satisfied when the oblique polishing directions are set such that the proximal ends E2 of the major axes of the end faces 51*a* to 54*a* are located on the outer circumferences Ciz31 to Ciz34. The outer circumferences Ciz31 to Ciz34 correspond to an example of "fourth outer circumferences."

Furthermore, the oblique polishing directions Dz31 to Dz34 point to the radially inward direction, respectively, and are point-symmetric with respect to the axis A1. In other words, the orientations of the oblique polishing directions Dz31 to Dz34 are set such that the proximal ends E2 of the major axes of the end faces 51*a* to 54*a* are positioned at middle points of the respective outer circumferences Ciz31 to Ciz34.

Figure 33A:
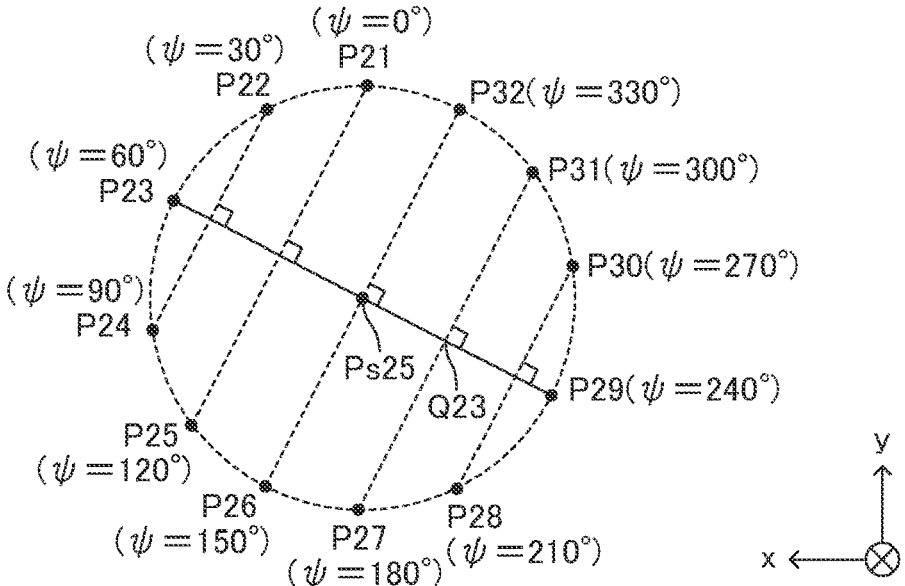
FIG. 33A is a partially enlarged view of the region R3 in FIG. 27, showing the FIFO device according to the second embodiment of the present invention.

FIG. 33A is a partially enlarged view of the region R3 in FIG. 27 (diagram for illustrating the lens 245 of the device 210). In this example, the positive orthogonal direction is a direction of moving the lens 245 itself toward the point P32 from the incident position Ps25, and the negative orthogonal direction is a direction of moving the lens 245 itself toward the point P26 from the incident position Ps25.

For example, when the lens 245 is moved in the −z-axis direction by 3.0 mm, the incident position Ps25 moves to a point Q23. The point Q23 is a foot of a perpendicular dropped onto the line segment P23P29 from the point P27 or P31. Then, when the lens 43 is moved in the positive orthogonal direction by 0.14 mm, the incident position Ps25 moves to the point P27. In this case, Δz is 3.0 mm. The same concept can be applied to the lenses 241 to 243 and 246 to 247 as well.

Figure 33B:
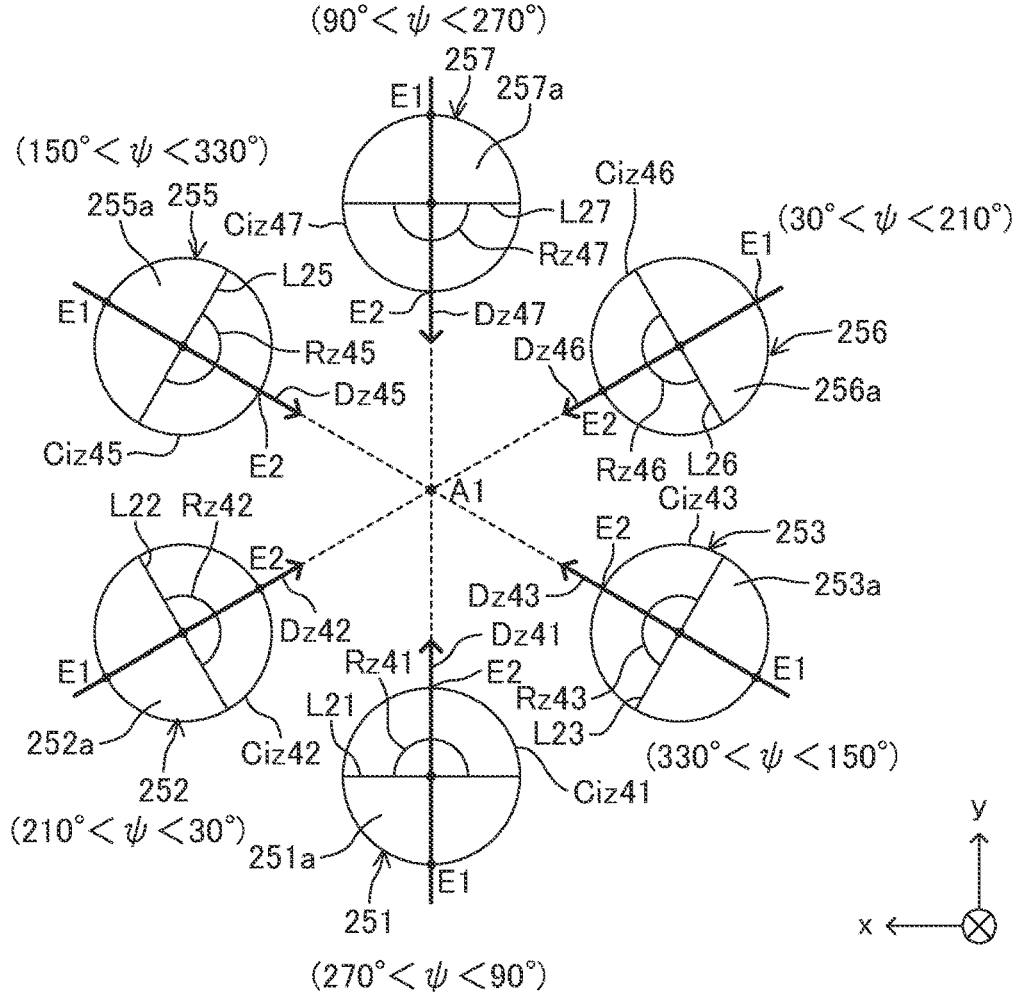
FIG. 33B is a front view of the single-mode optical fibers and is used to describe angle ranges of the oblique polishing rotation angles and the like at the time when a z-axis direction condition is satisfied.

FIG. 33B is a diagram for illustrating, in a front view of the end faces 251*a* to 253*a* and 255*a* to 257*a* of the surrounding SMFs, angle ranges Rz41 to Rz43 and Rz45 to Rz47 of the rotation angle Ψ at the time when the z-axis direction condition is satisfied, and the oblique polishing directions Dz41 to Dz43 and Dz45 to Dz47 at the time when Δz is minimized. As shown in FIG. 33B, the angle ranges Rz41 to Rz43 and Rz45 to Rz47 are angle ranges corresponding to outer circumferences Ciz41 to Ciz43 and Ciz45 to Ciz47. Here, these outer circumferences are outer circumferences of the portions on the radially inward side (a side at which the axis A1 is located) with respect to the line segments L21 to L23 and L25 to L27 (refer to FIG. 29). The z-axis direction condition is satisfied when the rotation angles Ψ of the surrounding SMFs are included in the respective angle ranges Rz41 to Rz43 and Rz45 to Rz47. In other words, the z-axis direction condition is satisfied when the oblique polishing directions are set such that the proximal ends E2 of the major axes of the end faces 251*a* to 253*a* and 255*a* to 257*a* are located on the respective outer circumferences Ciz41 to Ciz43 and Ciz45 to Ciz47. The aforementioned outer circumferences correspond to an example of the "fourth outer circumferences."

Furthermore, the oblique polishing directions Dz41 to Dz43 and Dz45 to Dz47 point to the radially inward direction and are point-symmetric with respect to the axis A1. In other words, the orientations of the oblique polishing directions Dz41 to Dz43 and Dz45 to Dz47 are set such that the proximal ends E2 of the major axes of the end faces 251*a* to 253*a* and 255*a* to 257*a* are positioned at middle points of the respective outer circumferences Ciz41 to Ciz43 and Ciz45 to Ciz47.

As described above, when the second lens is moved at least in the z-axis direction according to the method described in this embodiment, by setting the oblique polishing direction so that, when each surrounding SMF is viewed from its front, "the rotation angle LP is included in the angle range corresponding to the outer circumference of the portion on the radial inward side with respect to the first orthogonal line, which is a line segment passing through the center of the end face of each surrounding SMF and is orthogonal to the radial direction", it is possible to downsize the coupling portion of the FIFO device in the z-axis direction. Furthermore, by setting the oblique polishing direction so as to point to the radially inward direction, it is possible to minimize the coupling portion in the z-axis direction.

Third Embodiment

Figure 34A:
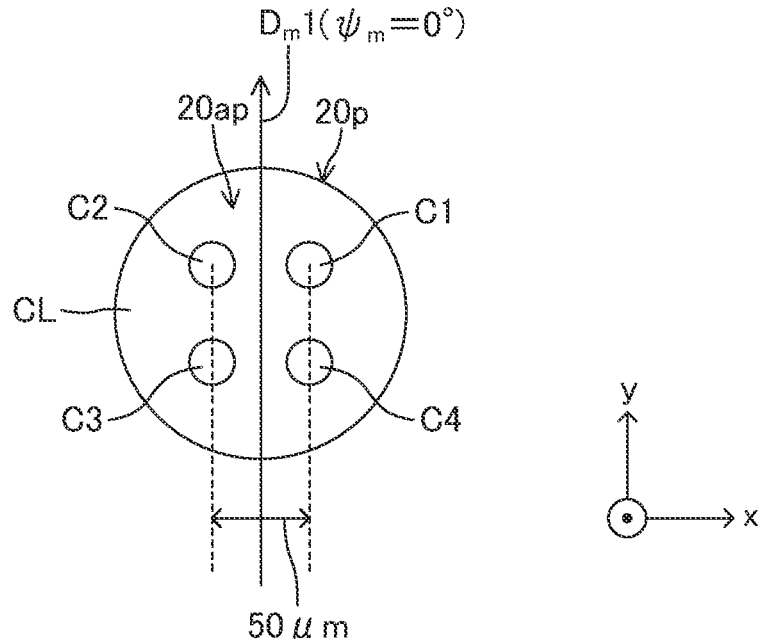
FIG. 34A is a diagram for illustrating an oblique polishing direction of a multi-core optical fiber included in an FIFO device according to a third embodiment of the present invention.
Figure 34B:
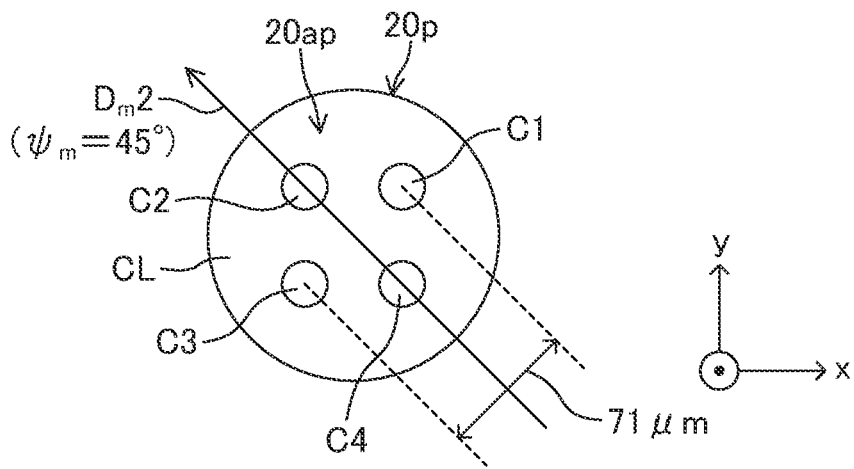
FIG. 34B is a diagram for illustrating another oblique polishing direction of a multi-core optical fiber.
Figure 35:
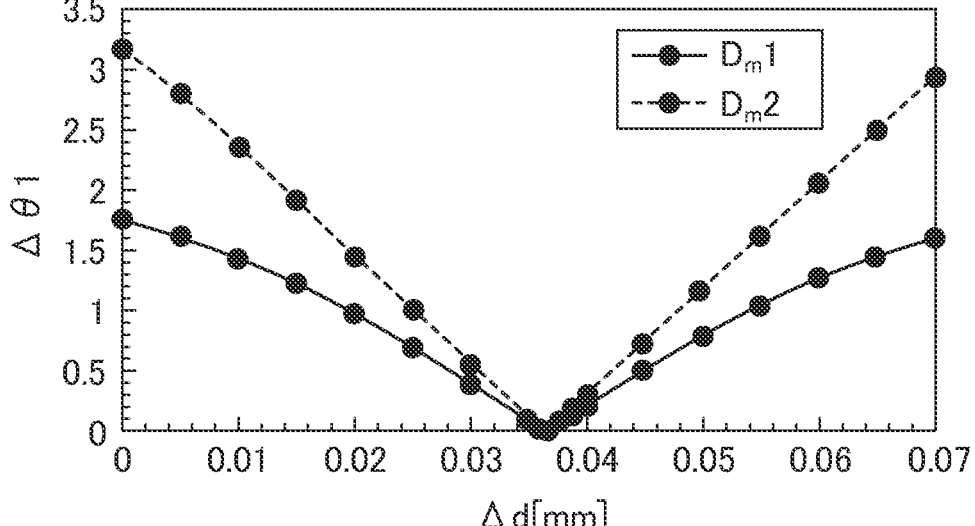
FIG. 35 is a graph for defining a relationship between an amount of positional deviation of the multi-core optical fiber and variations in light beam angles.

Next, with reference to FIG. 34A to FIG. 35, an FIFO device according to a third embodiment is described. In the third embodiment, similar to the modification, the FIFO device includes the MCF20*p* instead of the MCF20 (see FIG. 31A and FIG. 31B). In this case, as described above, the light beam angles θ1 of the principal rays B1 to B4 of the emission light beams exiting from the first lens 30 are made equal by moving the MCF20*p* in the −y-axis direction by a predetermined distance. In such an FIFO device, there may be a case where the MCF20*p* is displaced with respect to the first lens 30. This is attributed, for example, to thermal expansion of each member of the device due to temperature increase in the surroundings, and/or to chronological changes in a positional relationship of each member owing to continuous vibration of the device caused by external factors. When the MCF20*p* is displaced with respect to the first lens 30, a variation occurs in the light beam angles θ1 of the principal rays B1 to B4 of the light beams exiting from the first lens 30 as described above, which affects optical characteristics.

In view of the above, the inventors of the present application investigated, concerning two types of oblique polishing directions (oblique polishing rotation angles Wm) of the MCF20*p*, a relationship between the displacement amount Δd of the MCF20*p* and the variation Δθ1 of the light beam angle θ1 and thereby examined oblique polishing directions which can suppress the "increase in variation Δθ1 with the change in displacement amount Δd". FIG. 34A and FIG. 34B are diagrams for illustrating the end face 20*ap* of the MCF20*p* used for the investigation. In the example of FIG. 34A, the MCF20*p* is obliquely polished in an oblique polishing direction Dm1 with Ψm=0°. In the example of FIG. 34B, the MCF20*p* is obliquely polished in an oblique polishing direction Dm2 with Ψm=45°.

FIG. 35 is a graph for defining the relationship between the displacement amount Δd of the MCF20*p* and the variation Δθ1 of the light beam angle θ1. Ad is defined as a displacement amount along the oblique polishing direction from a state in which the MCF 20 is arranged so that the center axis of the MCF20*p* coincides with the axis A1 (see FIG. 31A). When the MCF20*p* is displaced in the opposite direction to the oblique polishing direction, Δd has a positive value. Δθ1 is defined as a difference between a minimum light beam angle θ1*min* and a maximum light beam angle θ1max among the light beam angles θ1 of each principal ray B1 to B4 (θ1max−θ1min). In this example, Δθ1 is a difference between a light beam angle θ1 of the principal ray B1 and a light beam angle θ1 of the principal ray B3.

As shown in FIG. 35, when the oblique polishing direction is the direction Dm1, the increase in variations Δθ1 with the change in displacement amount Δd can be suppressed compared to when the oblique polishing direction is the direction Dm2. For example, when Δd=0.07 mm, Δθ1 can be reduced by approximately 45% compared to when the oblique polishing direction is the direction Dm2. This is considered to be due to the relationship between the oblique polishing direction and the core arrangement of the MCF20$p$. A specific description is given in the following. First, when the end face 20$a$ is viewed from its front, a straight line passing through the center of the end face 20$a$ and extending in the oblique polishing direction is defined as a "reference axis," and a direction toward a left side of the paper with respect to the reference axis along an orthogonal axis orthogonal to both the center axis of the MCF20$p$ and the reference axis is defined as a "first orthogonal direction," and a direction toward a right side of the paper with respect to the reference axis along the orthogonal axis is defined as a "second orthogonal direction."

According to this definition, in the case of the example in FIG. 34A, the cores that are most separated away from the reference axis in the first orthogonal direction (i.e., −x-axis direction) are cores C2 and C3, and the cores that are most separated away from the reference axis in the second orthogonal direction (i.e., +x-axis direction) are cores C1 and C4. The sum (separation distance) of a distance from the reference axis to the cores C2 or C3 and a distance from the reference axis to the cores C1 or C4 is 50 μm. On the other hand, in the case of the example in FIG. 34B, the core that is most separated away from the reference axis in the first orthogonal direction is the core C3, and the core that is most separated away from the reference axis in the second orthogonal direction is the core C1. The sum (separation distance) of a distance from the reference axis to the core C3 and a distance from the reference axis to the core C1 is 71 μm. In other words, when the oblique polishing direction is the direction Dm1, the separation distance is shorter compared to when the oblique polishing direction is the direction Dm2.

The inventors of the present application conducted the above investigation on MCFs with various core arrangements. As a result, the following finding was obtained that by setting the oblique polishing direction of the MCF20$p$ so that the separation distance is minimized, it is possible to maximize the suppression of the "increase in variation Δθ1 with the change in displacement amount Δd." Therefore, in the FIFO device of this embodiment, by setting the oblique polishing direction to a direction in which the separation distance is minimized, it is possible to further reduce the reflected return light and realize an FIFO device with high robustness against thermal expansion and/or vibration.

Fourth Embodiment

Figure 36:
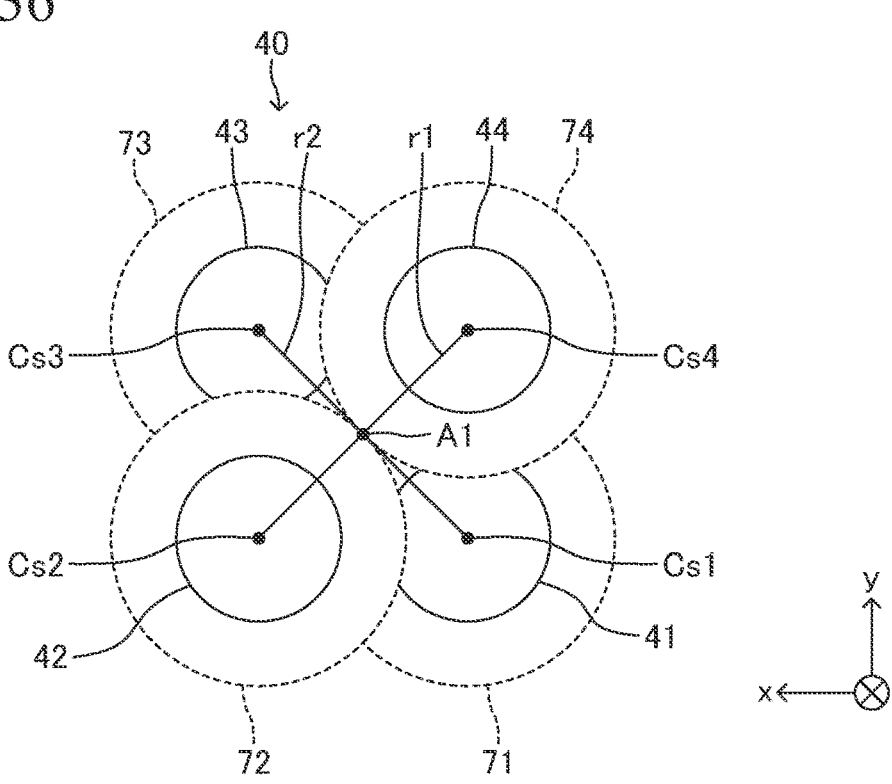
FIG. 36 is a front view of second lenses included in an FIFO device according to a fourth embodiment of the present invention.
Figure 37:
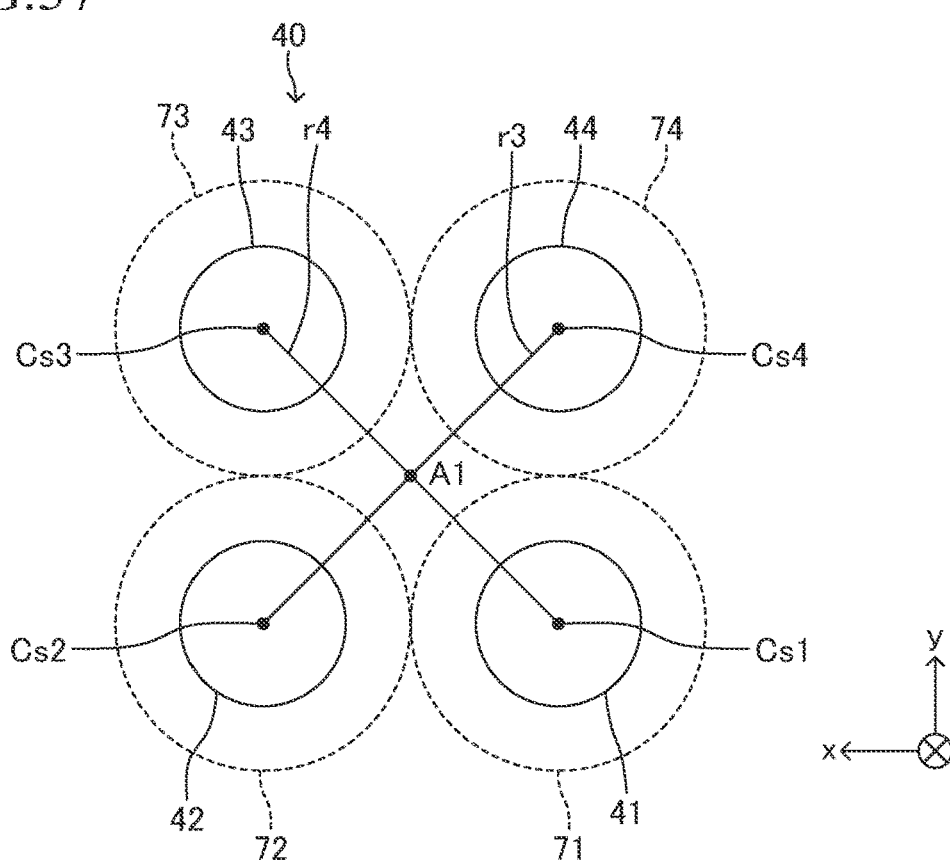
FIG. 37 is a front view of second lenses serving as a comparative example of the second lenses in FIG. 36.
Figure 38:
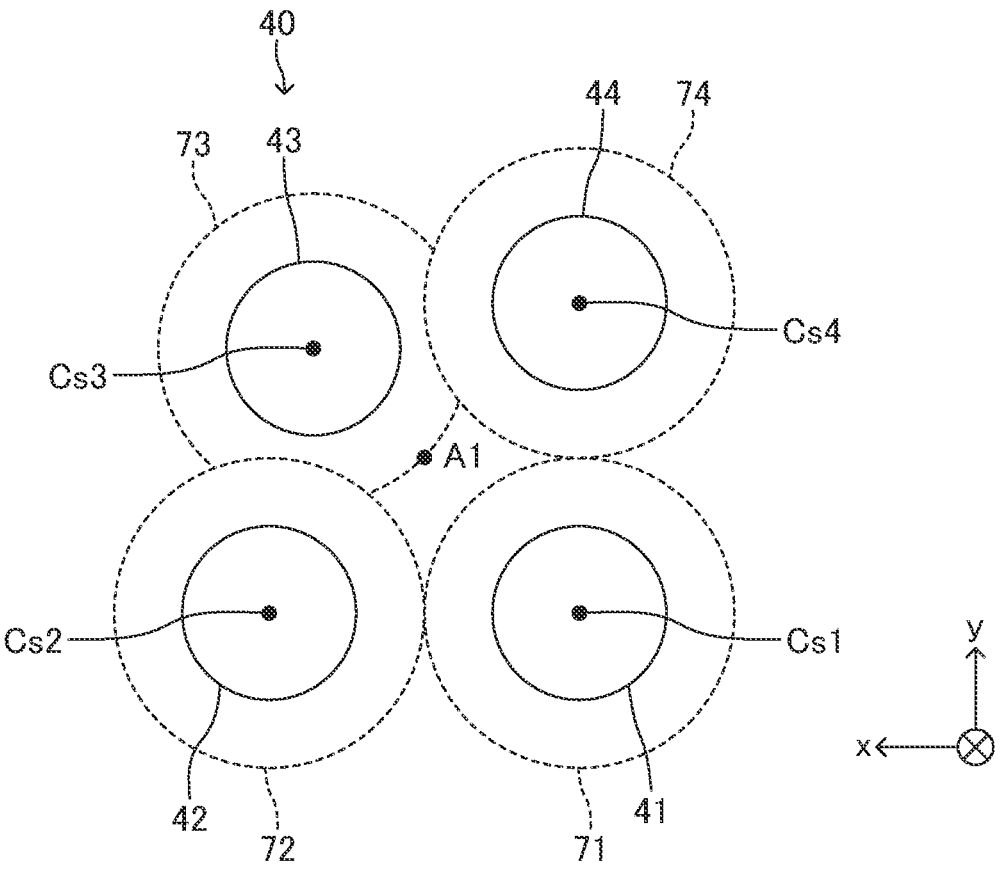
FIG. 38 is a front view for illustrating another layout of the second lenses in FIG. 36.

Next, with reference to FIG. 36 to FIG. 38, an FIFO device according to a fourth embodiment is described. In the fourth embodiment, a layout of the second lens differs from the first embodiment. In this embodiment, a description is given by taking the lenses 41 to 44 (lenses corresponding to the MCF20) of the FIFO device 10 for examples.

FIG. 36 is a diagram for showing a layout of the lenses 41 to 44 according to this embodiment, where the group of the second lenses 40 is minimized in the radial direction. FIG. 37 is a diagram for showing a layout of the lenses 41 to 44 according to the first embodiment, where the group of the second lenses is minimized in the radial direction. As shown in FIG. 36 and FIG. 37, the lenses 41 to 44 are each accommodated in accommodating members 71 to 74. The accommodating members 71 to 74 are cylindrical members with the same size, and each holds the respective lenses 41 to 44 inside.

As shown in FIG. 37, in the first embodiment, the principal points Cs1 to Cs4 of the lenses 41 to 44 are located on the same plane. Furthermore, the four lenses 41 to 44 are arranged such that their accommodating members 71 to 74 come into contact with each other in the x-axis and y-axis directions. When the lenses 41 to 44 are viewed along the axis A1, the principal points Cs1 to Cs4 are located at vertices of a square having the axis A1 as a center. Two diagonal lines r3 and r4 of this square are orthogonal to the axis A1 at the same positions on the axis A1.

In contrast, in this embodiment, as shown in FIG. 36, the principal points Cs1 and Cs3 of the lenses 41 and 43 (lenses sandwiching the axis A1) are located on a certain plane orthogonal to the axis A1, while the principal points Cs2 and Cs4 of the lenses 42 and 44 (lenses sandwiching the axis A1) are located on another plane orthogonal to the axis A1. The accommodating members 71 and 73 of the lenses 41 and 43 are in contact with each other, and the accommodating members 72 and 74 of the lenses 42 and 44 are in contact with each other. Additionally, the accommodating members 71 and 73 of a pair of the lenses 41 and 43 and the accommodating members 72 and 74 of a pair of the lenses 42 and 44 are also in contact with each other in the z-axis direction (not shown). When the lenses 41 to 44 are viewed along the axis A1, the principal points Cs1 to Cs4 are located at vertices of a square having the axis A1 as a center. Two diagonal lines r1 and r2 of this square are orthogonal to the axis A1 at different positions on the axis A1. The lengths of the diagonal lines r1 and r2 are shorter than the lengths of the diagonal lines r3 and r4 in FIG. 37.

The group of the second lenses 40 in FIG. 36 is downsized in the radial direction compared to the group of the second lenses 40 in FIG. 37. This is because, by arranging the pair of the lenses 41 and 43 and the pair of the lenses 42 and 44 such that they are shifted in the axial direction, the accommodating members of the two lenses positioned on each diagonal line of the square (lens 41 and 43, or lens 42 and 44) are allowed to come into contact with each other. In this case, the coupling portion of the FIFO device can be minimized in the z-axis direction as well. That is, since the incident angles of the light beams entering each lens 41 to 44 are constant, a shorter distance between the lenses (r1, r2<r3, r4) allows the light beams heading toward the lenses 41 to 44 to travel a shorter distance in the z-axis direction from the emission position to the incident position of the light beams.

With this configuration, it is possible to further downsize the coupling portion of the FIFO device. Note that the oblique polishing direction of the SMF corresponding to each of the lenses 41 to 44 may satisfy the radial direction condition or the z-axis direction condition. However, by using an SMF that satisfies the z-axis direction condition, it is possible to significantly downsize the coupling portion in both the radial and z-axis directions.

Furthermore, as shown in FIG. 38, the following configuration may be adopted in which three out of the four lenses 41 to 44, namely the lenses 41, 42, and 44 have their principal points Cs1, Cs2, and Cs4 located on the same plane while the principal point Cs3 of the remaining lens 43 is not on that plane. In this case, it is desirable that the principal point Cs3 of the lens 43 is positioned closer to the axis A1 compared to the principal point Cs3 of the lens 43 (not shown) obtained when assuming that "all the principal points Cs1 to Cs4 of the lenses 41 to 44 are positioned on the same plane." With this configuration as well, it is possible to downsize the coupling portion of the FIFO device by a distance that the lens 43 approaches the axis A1. Additionally, the focal lengths of the lenses do not necessarily have to be the same.

In the above description, the lenses corresponding to the MCF 20 were used as examples, but this configuration can also be applied to lenses corresponding to other MCFs.

In the above, the FIFO devices according to the embodiments and the modification example have been described, but the present invention is not limited to the above-mentioned embodiments and the modification example, and various changes are possible within the range not departing from the object of the present invention.

For example, instead of a group of single-mode optical fibers, a group of single-core optical fibers comprising a plurality of single-core optical fibers with multi-mode may be used. However, since the FIFO device according to the present invention is based on propagating light beams of a single mode, even in a case where a multi-mode single-core optical fiber is used, the light beams propagated by this optical fiber is any one mode out of multi modes.

Furthermore, the core arrangement of the MCF does not necessarily have to be symmetric. Even if the core arrangement is asymmetric, by placing the group of the second lenses 40, 140, or 240 at positions corresponding to the light beams exiting from the first lens 30, which have been emitted from the respective cores, the first lens 30 and the group of the second lenses 40, 140, or 240 can function properly as the FIFO device.

Additionally, the SMFs and the MCFs are not limited to a cylindrical shape, and each may have a pillar shape whose cross-section orthogonal to the axis is any shape (e.g., an ellipse or a polygon).

Furthermore, not all cores of the MCF need to be used for propagation of the light beams. For example, only the cores C1 to C3 of the MCF 20 may be used for light propagation, and the core C4 may not be used for light propagation. In this case, the group of the second lenses 40 and the group of the SMFs 50 may be configured to include three second lenses 41 to 43 and three SMFs 51 to 53 corresponding to the cores C1 to C3. In other words, the group of the second lenses and the group of the SMFs may include the same number of second lenses and the SMFs as the number of cores used for light propagation out of the cores of the MCF, and it is not necessary to always include the same number of second lenses and the SMFs as the number of cores of the MCF.

Furthermore, the center axis of each SMF in the group of the SMFs does not need to be parallel to the optical axis of the corresponding each lens in the group of the second lenses. A description is given using the FIFO device 10 as an example. As mentioned above, when the polishing angle of the end faces 51a to 54a of the SMFs 51 to 54 is 8° and the wavelength of the light beam is 1.55 µm, it is desirable for the principal rays B1 to B4 to enter the end faces 51a to 54a at an angle of 78.2° (hereinafter referred to as "incident angle θ2"). In the aforementioned embodiments, since the center axis of each SMF was parallel to the optical axis of the corresponding each lens, the light beam angle θ1 that achieves θ2=78.2° was 3.8°, and the radius of the circle 43a (see FIG. 10, FIG. 11A, and FIG. 11B) that realizes θ1=3.8° was 0.16 mm. However, as long as the incident angle θ2 is configured to satisfy θ2=78.2°, the center axis of each SMF does not need to be parallel to the optical axis of the corresponding lens.

For example, when enlarging the circle 43a and moving the lens 43 by 0.30 mm, it is expected that the light beam angle θ1 becomes larger than 3.8°. In this case, in order to ensure the incident angle θ2=78.2°, it is necessary to tilt the SMF 53 in a predetermined direction (described later), resulting in the center axis of the SMF 53 no longer being parallel to the optical axis of the lens 43. Thus, by releasing the constraint of "making the center axis of each SMF parallel to the optical axis of the corresponding each lenses," it becomes possible to freely control moving amount in the radial or z-axis directions of each lens, thereby improving the degree of freedom in downsizing the coupling portion of the FIFO device. Note that "predetermined direction" mentioned above refers to a direction in which the center axis of each SMF exists on a "plane including the oblique polishing reference axis of each SMF and the corresponding each principal ray". In other words, it does not mean that each SMF can be tilted in any direction as long as θ2=78.2° is ensured.

Furthermore, the FIFO devices 10, 110, and 210 of the above embodiments and modification example propagate the light beams from the MCFs 20, 120, and 220 through the first lens 30 and the group of the second lenses 40, 140, and 240 toward the group of the SMFs 50, 150, and 250. However, the configuration is not limited to this. That is, the FIFO devices may propagate the light beams from the group of the SMFs 50, 150, and 250 through the group of the second lenses 40, 140, and 240 and the first lens 30 toward the MCFs 20, 120, and 220. In this case, the number of the first cores of the MCFs can be equal to or greater than the number of the SMFs included in the group of the SMFs. Additionally, the number of the second lenses included in the group of the second lenses can be equal to the number of the SMFs.

REFERENCE SIGNS LIST

10: FIFO device, 20: multi-core optical fiber, 20a: end face, 30: first lens, 40: a group of second lenses, 41, 42, 43, 44: second lens, 50: a group of single-mode optical fibers, 51, 52, 53, 54: single-mode optical fiber

The invention claimed is:

1. A Fan-in/Fan-out device, comprising:
a multi-core optical fiber which has a pillar shape, and includes a plurality of first cores extending along an axial direction, and a common cladding surrounding the plurality of first cores;
a first lens having a first optical axis parallel to a center axis of the multi-core optical fiber and being arranged so as to correspond to the multi-core optical fiber, and from which light beams which have been emitted from the respective first cores and whose principal rays are parallel to each other exit so that the principal rays incline in predetermined directions, respectively;
a group of second lenses including a plurality of spatially separated second lenses each having a second optical axis parallel to the first optical axis, the group of second lenses being configured to converge each of the light beams exiting from the first lens, which have been emitted from the respective first cores with each of the corresponding second lenses; and
a group of single-core optical fibers including the same number of single-core optical fibers as the number of the second lenses, each single-core optical fiber having a pillar shape, and including one second core extending along the center axis and a cladding surrounding the second core, end faces of the respective single-core optical fibers being arranged at positions at which the light beams exiting from the corresponding second lenses, which have been emitted from the respective first cores converge on the respective second cores, wherein, the end face of each of the single-core optical fibers is obliquely polished so as to incline in a first inclination direction with respect to a plane orthogonal to the center axis thereof by a first polishing angle, wherein, oblique polishing directions of surrounding single-core optical fibers of the single-core optical fibers, where center axes of the surrounding single-core optical fibers are positioned at positions separated away from the first optical axis, are set so that the corresponding second lenses are positioned closer to the first optical axis or closer to the first lens compared to non-obliquely polished positions of the corresponding second lenses at the time when the surrounding single-core optical fibers are not obliquely polished, and wherein, the end face of freely-selected one of the surrounding single-core optical fibers not parallel to at least one end surface of the surrounding single-core optical fiber except the freely-selected surrounding single-core optical fiber.

2. The Fan-in/Fan-out device according to claim 1, wherein the center axes of the respective single-core optical fibers are parallel to the second optical axes of the corresponding second lenses.

3. The Fan-in/Fan-out device according to claim 1, wherein when it is defined that, when end faces of the respective surrounding single-core optical fibers are viewed along the center axes thereof, line segments passing through centers of the respective end faces and are orthogonal to respective line segments connecting the first optical axis and the centers of the respective end faces are first orthogonal lines of the respective single-core optical fibers, and when it is defined that out of outer circumferences of the respective end faces, outer circumferences of portions on a side opposite to a side at which the first optical axis is positioned with respect to the respective first orthogonal lines are first outer circumferences, the respective oblique polishing directions are set so that proximal ends of respective oblique polishing reference axes are positioned on the respective first outer circumferences.

4. The Fan-in/Fan-out device according to claim 3, wherein the respective oblique polishing directions are set so that the proximal ends of the respective oblique polishing reference axes are positioned at middle points of the respective first outer circumferences.

5. The Fan-in/Fan-out device according to claim 1, wherein in a first case in which, when end faces of the respective surrounding single-core optical fibers are viewed along the center axes thereof, a reference line which is a straight line orthogonal to the first optical axis and extending in any direction does not pass through centers of the respective single-core optical fibers, when it is defined that line segments passing through centers of the end faces of the respective surrounding single-core optical fibers and are parallel to the reference line are parallel lines of the respective surrounding single-core optical fibers, and when it is defined that out of outer circumferences of the respective end faces, outer circumferences of portions on a side at which the first optical axis is positioned with respect to the respective parallel lines are second outer circumferences, the respective oblique polishing directions are set so that proximal ends of respective oblique polishing reference axes are positioned on the respective second outer circumferences, and wherein in a second case in which, when end faces of the respective surrounding single-core optical fibers are viewed along the center axes thereof, the reference line passes through centers of the respective surrounding single-core optical fibers, when it is defined that line segments passing through centers of the end faces of the respective surrounding single-core optical fibers and are orthogonal to the reference line are second orthogonal lines of the respective surrounding single-core optical fibers, and when it is defined that out of outer circumferences of the respective end faces, outer circumferences of portions on a side at which the first optical axis is positioned with respect to the respective second orthogonal lines are third outer circumferences, the respective oblique polishing directions are set so that the proximal ends of the respective oblique polishing reference axes are positioned on the respective third outer circumferences.

6. The Fan-in/Fan-out device according to claim 5, wherein in the first case, the respective oblique polishing directions are set so that the proximal ends of the respective oblique polishing reference axes are positioned at middle points of the respective second outer circumferences, and wherein in the second case, the respective oblique polishing directions are set so that the proximal ends of the respective oblique polishing reference axes are positioned at middle points of the respective third outer circumferences.

7. The Fan-in/Fan-out device according to claim 1, wherein when it is defined that, when end faces of the respective surrounding single-core optical fibers are viewed along the center axes thereof, line segments passing through centers of the respective end faces and are orthogonal to respective line segments connecting the first optical axis and the centers of the respective end faces are first orthogonal lines of the respective surrounding single-core optical fibers, and when it is defined that out of outer circumferences of the respective end faces, outer circumferences of portions on a side at which the first optical axis is positioned with respect to the respective first orthogonal lines are fourth outer circumferences, the respective oblique polishing directions are set so that proximal ends of respective oblique polishing reference axes are positioned on the respective fourth outer circumferences.

8. The Fan-in/Fan-out device according to claim 7, wherein the respective oblique polishing directions are set so that the proximal ends of the respective oblique polishing reference axes are positioned at middle points of the respective fourth outer circumferences.

9. The Fan-in/Fan-out device according to claim 1, wherein an end face of the multi-core optical fiber is obliquely polished so as to incline in a second inclination direction with respect to a plane orthogonal to a center axis thereof by a second polishing angle, and wherein when a straight line passing through a center of the end face and extending along an oblique polishing direction is defined as a reference axis in a case when the end face of the multi-core optical fiber is viewed along the center axis thereof, and when a direction directed from the reference axis toward one side with respect to the reference axis along an orthogonal axis orthogonal to the center axis and the reference axis is defined as a first orthogonal direction, and a direction directed from the reference axis toward another side with respect to the reference axis along the orthogonal axis is defined as a second orthogonal direction, the oblique polishing direction of the multi-core optical fiber is set so that, when the end face of the multi-core optical fiber is viewed along the center axis thereof, a separation distance is minimized, the separation distance being a sum of a distance from the reference axis to a first core that is most separated away from the reference axis in the first orthogonal direction and a distance from the reference axis to a first core that is most separated away from the reference axis in the second orthogonal direction.

10. The Fan-in/Fan-out device according to claim 1, wherein principal points of remaining second lenses of the second lenses in which at least one second lens is excluded are positioned on the same plane, respectively, and wherein a principal point of the at least one second lens is positioned closer to the first optical axis compared to the principal point of the at least one second lens obtained when assuming that principal points of all of the second lenses are positioned on the same plane.

11. The Fan-in/Fan-out device according to claim 10 including 2n (n≥2) second lenses wherein, when the second lenses are viewed along the first optical axis, principal points of the second lenses are positioned at vertices of a regular polygon having the first optical axis as a center, respectively, n line segments each connecting principal points of a part of second lenses positioned on any one of diagonal lines of the regular polygon perpendicularly cross with the first optical axis at different positions on the first optical axis with each other, and lengths of the line segments are shorter than lengths of the line segments obtained when assuming that the n line segments perpendicularly cross with the first optical axis at the same position on the first optical axis with each other.

12. The Fan-in/Fan-out device, comprising:

the group of single-core optical fibers including the plurality of single-core optical fibers; the group of second lenses including the same number of the second lenses as the number of the single-core optical fibers; the first lens; and the multi-core optical fiber including the first cores whose number is at least more than or equal to the number of the single-core optical fibers, each being described in claim 1, wherein light beams are propagated in a direction opposite to a direction in which light beams are propagated by the Fan-in/Fan-out device of claim 1.

13. The Fan-in/Fan-out device according to claim 1, wherein the oblique polishing directions of the surrounding single-core optical fibers are set so as to satisfy at least one of a radially downsizing arrangement in which all of the corresponding second lenses are positioned closer to the first optical axis compared to the non-obliquely polished positions, and an optical-axis-direction downsizing arrangement in which all of the corresponding second lenses are positioned closer to the first lens compared to the non-obliquely polished positions.

* * * * *